US008504375B2

(12) United States Patent
Onishi

(10) Patent No.: US 8,504,375 B2
(45) Date of Patent: Aug. 6, 2013

(54) CONFERENCE SYSTEM, INFORMATION PROCESSOR, CONFERENCE SUPPORTING METHOD AND INFORMATION PROCESSING METHOD

(75) Inventor: Satoshi Onishi, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 120 days.

(21) Appl. No.: 13/035,631

(22) Filed: Feb. 25, 2011

(65) Prior Publication Data

US 2011/0213607 A1 Sep. 1, 2011

(30) Foreign Application Priority Data

Feb. 26, 2010 (JP) ................................ 2010-043163

(51) Int. Cl.

| | |
|---|---|
| ***G06F 17/28*** | (2006.01) |
| ***G06F 17/00*** | (2006.01) |
| ***G06F 17/20*** | (2006.01) |
| ***G06F 17/21*** | (2006.01) |
| ***G06F 17/22*** | (2006.01) |
| ***G06F 17/24*** | (2006.01) |
| ***G06F 17/25*** | (2006.01) |
| ***G06F 17/26*** | (2006.01) |
| ***G06F 17/27*** | (2006.01) |
| ***G10L 15/00*** | (2013.01) |
| ***G10L 21/00*** | (2013.01) |

(52) U.S. Cl.
USPC ............... 704/277; 704/2; 704/231; 704/235; 704/275; 704/3; 704/4; 704/5; 715/256; 715/264

(58) Field of Classification Search
USPC ................................................. 704/2, 3, 244
See application file for complete search history.

(56) References Cited

U.S. PATENT DOCUMENTS

| | | | | |
|---|---|---|---|---|
| 6,175,819 | B1 * | 1/2001 | Van Alstine | 704/235 |
| 6,243,559 | B1 | 6/2001 | Kurotaka et al. | |
| 6,651,039 | B1 | 11/2003 | Ikuta et al. | |
| 6,868,379 | B1 * | 3/2005 | Wutte | 704/235 |
| 7,130,790 | B1 * | 10/2006 | Flanagan et al. | 704/2 |
| 7,822,596 | B2 * | 10/2010 | Elgazzar et al. | 704/2 |
| 2007/0061152 | A1 * | 3/2007 | Doi | 704/277 |
| 2007/0130563 | A1 | 6/2007 | Elgazzar et al. | |

(Continued)

FOREIGN PATENT DOCUMENTS

| | | | |
|---|---|---|---|
| CN | 101322097 | A | 12/2008 |
| JP | 6-124302 | A | 5/1994 |
| JP | 07-087472 | * | 3/1995 |
| JP | 7-87472 | A | 3/1995 |
| JP | 9-106399 | A | 4/1997 |

(Continued)

*Primary Examiner* — Paras D Shah
*Assistant Examiner* — Anne Thomas-Homescu
(74) *Attorney, Agent, or Firm* — Birch, Stewart, Kolasch & Birch, LLP

(57) ABSTRACT

Speech given by a speaker in English is recognized. An upper half of a subtitle display area of a display used by a listener is used as a parallel area and a lower half thereof is used as an original area. In the parallel area, a parallel subtitle in which an original corresponding to a recognition result of the speech and a translation obtained by translating the original into Japanese are displayed in parallel is displayed. In this manner, the original and the translation are both displayed, and in addition, with respect to each word or phrase of the original, an expression obtained by translating the word or phrase is displayed as the translation, and hence, the listener can easily understand the translation and mistranslation can be easily found. Furthermore, in the original area, an original subtitle including an original not translated yet is displayed.

9 Claims, 31 Drawing Sheets

U.S. PATENT DOCUMENTS

2009/0048832 A1* 2/2009 Terao ............................ 704/235
2009/0240487 A1* 9/2009 Shen et al. ........................ 704/9
2009/0244372 A1* 10/2009 Petronelli et al. ............. 348/468
2009/0271191 A1* 10/2009 Marquette et al. ............ 704/235
2010/0036653 A1* 2/2010 Kim et al. ......................... 704/3
2011/0010162 A1* 1/2011 Elgazzar et al. .................. 704/2

FOREIGN PATENT DOCUMENTS

JP 10-307496 A 11/1998
JP 2001-350749 A 12/2001
JP 2003-122179 A 4/2003
JP 2003-242148 A 8/2003

* cited by examiner

441 — We will try and make a final hotels decision by the end of the calendar year.
442 — Currently all the hotels have a high room rate because they have not figured out their charges for 2010.

| ORIGINAL | aaa | 44 (441) |
|---|---|---|
| ORIGINAL SUBTITLE | AAA | 1T |
| TRANS-LATION | | |
| PARALLEL SUBTITLE | | |

| ORIGINAL | aaa<br>bbb | |
|---|---|---|
| ORIGINAL SUBTITLE | AAA<br>BBB | 1T — 441, 442 } 44 |
| TRANS-LATION | | |
| PARALLEL SUBTITLE | | |

| ORIGINAL | ORIGINAL SUBTITLE | AAA BBB | — 441 ⎫ 44
|          |                   |         | — 442 ⎭
| (aaa)*bbb | PARALLEL SUBTITLE | |
| TRANS-LATION | | |
| (あああ)* | | |

1T

| ORIGINAL | ORIGINAL SUBTITLE | BBB | — 44 (442)
| (aaa)*bbb | | |
| TRANS-LATION | PARALLEL SUBTITLE | ααα | — 431 ⎫ 43
| (あああ)* | | アアア | — 432 ⎭

1T

4

41

We will try and make a final hotel decision
~よう努める 意思決定をする 最終の ホテル by the end of the calender year.
~の終わりまでに 暦年 figured out their charges for 2010. ABC has agreed to host the 2009 conference and donate $5K to the conference. Marilyn will look for a few other industrial sponsors to get some more donations, say about $12K, to lower the registration fee and fund more local scholar

44

45

4

CONFERENCE SYSTEM, INFORMATION PROCESSOR, CONFERENCE SUPPORTING METHOD AND INFORMATION PROCESSING METHOD

CROSS-REFERENCE TO RELATED APPLICATIONS

This Nonprovisional application claims priority under 35 U.S.C. §119(a) on Patent Application No. 2010-43163 filed on Feb. 26, 2010, the entire contents of which are hereby incorporated by reference.

BACKGROUND

1. Technical Field

The present invention relates to a conference system, an information processor, a conference supporting method and an information processing method to be employed for supporting implementation of a conference.

2. Description of Related Art

In accordance with development of technologies such as communication technologies and image processing technologies, a conference system by which a conference can be smoothly held even when conferees of the conference are in places away from one another has been realized. In such a conference system, a plurality of terminal units are connected to a network, so as to display a common image in display sections of the respective terminal units. As a result, the conferees using the terminal units can be commonly provided with information necessary for the conference.

Hereinafter, a conferee in a position to give speech is designated as a speaker, a conferee in a position to listen to the speech of the speaker is designated as a listener, and when there is no need to distinguish a speaker from a listener, he/she is simply designated as a conferee.

Recently, a technique to recognize speech given by a speaker so as to display a result of speech recognition (hereinafter referred to as the original) is known. Furthermore, a technique to support a conference, such as one held between different countries or one whose members are different in the mother tongue, by displaying a result of translation of the original into a desired language (hereinafter referred to as the translation) is known (see Japanese Patent Application Laid-Open No. 7-87472 (1995)).

As a result, the contents of speech given in a language that a listener cannot understand or has much difficulty in understanding can be displayed after translating the contents into a language that the listener can easily understand. Accordingly, the convenience for conferees can be improved.

SUMMARY

In the conventional conference system, however, either the original or the translation alone is displayed.

Therefore, when the original alone is displayed, a listener can not understand the contents of speech given by a speaker.

On the other hand, when the translation alone is displayed, it is apprehended that a listener may misunderstand the contents of speech given by a speaker if the original is mistranslated.

The present invention was devised to overcome the aforementioned problems, and a principal object of the invention is providing a conference system, an information processor, a conference supporting method and an information processing method in which a translation subtitle for displaying both a recognition result obtained by recognizing speech in one language and a translation result obtained by translating the recognition result are displayed so that a listener can easily and accurately understand the contents of speech given by a speaker.

The conference system of this invention includes recognition means for recognizing speech in a first language; translation means for translating a recognition result recognized by the recognition means into a second language different from the first language; and generation means for generating a translation subtitle for displaying the recognition result and a translation result translated by the translation means.

In the conference system of this invention, the translation subtitle is a parallel subtitle in which the recognition result and translation result are displayed in parallel.

In the conference system of this invention, each word or each phrase included in the recognition result is displayed in the parallel subtitle in parallel to an expression included in the translation result and corresponding to the word or the phrase.

The conference system of this invention further includes a display section for displaying the translation subtitle generated by the generation section.

In the conference system of this invention, the translation subtitle is a parallel subtitle in which the recognition result and the translation result are displayed in parallel, the generation means further generates a recognition result subtitle for displaying the recognition result, and the display section displays the parallel subtitle and the recognition result subtitle generated by the generation means.

In the conference system of this invention, a recognition result included in the parallel subtitle is excluded in the recognition result included in the recognition result subtitle generated by the generation means.

In the conference system of this invention, the display section performs scroll display of the recognition result subtitle and the parallel subtitle.

In the conference system of this invention, the recognition means recognizes the speech in the first language at least twice, the conference system further includes recognition determination means for determining whether or not a recognition obtained in the first recognition by the recognition means should be replaced with a recognition result obtained in the second or later recognition; and area determination means for determining, when it is determined by the recognition determination means that the recognition result obtained in the first recognition should be replaced, whether or not a displayable area capable of displaying a replace portion of the recognition result obtained in the second or later recognition is generated in the translation subtitle by erasing a replaced portion of the recognition result obtained in the first recognition in the translation subtitle displayed in the display section, the generation means corrects, when it is determined by the recognition determination means that the recognition result obtained in the first recognition should be replaced, the translation subtitle to a translation subtitle in which the recognition result obtained in the second or later recognition and a translation result translated from the recognition result obtained in the second or later recognition by the translation means are displayed, the display section includes means for erasing the replaced portion when it is determined by the recognition determination means that the recognition result obtained in the first recognition should be replaced; means for scrolling, when it is determined by the area determination means that a displayable area is not generated, a portion of the translation subtitle following the replaced portion in a direction toward an end for providing the displayable area; and means for displaying the replace portion in the displayable area.

In the conference system of this invention, the display section displays the replace portion emphatically as compared with the other portion of the translation subtitle for prescribed time in displaying the replace portion in the displayable area.

In the conference system of this invention, a central unit is connected to a plurality of terminal units in such a manner as to be able to communicate with each other, each of the terminal units includes the display section and the generation means, the central unit includes the recognition means; the translation means; and delivery means for delivering data corresponding to the recognition result and the translation result to each of the terminal units, and the generation means of each of the terminal units executes generation processing on the basis of the received data.

The information processor of this invention includes receiving means for receiving data corresponding to an original in a first language and a translation of the original in a second language different from the first language; and generation means for generating, on the basis of the data received by the receiving means, a translation subtitle in which the original and the translation are displayed.

The information processor of this invention further includes a display section for displaying the translation subtitle generated by the generation section.

The conference supporting method of this invention for supporting implementation of a conference by using a conference system, includes steps of recognizing speech in a first language; translating a recognition result obtained by recognizing the speech into a second language different from the first language; and generating a translation subtitle in which the recognition result and a translation result obtained by translating the recognition result are displayed.

The conference supporting method of this invention further includes a step of displaying the translation subtitle in a display section included in the conference system.

The information processing method of this invention for processing information by using an information processor, includes steps of receiving data corresponding to an original in a first language and a translation of the original in a second language different from the first language; and generating a translation subtitle in which the original and the translation are displayed on the basis of the received data.

The information processing method of this invention further includes a step of displaying the translation subtitle in the display section included in the information processor.

In a non-transitory computer readable recording medium of this invention storing a computer program, the computer program includes a step of causing the computer to generate, on the basis of data corresponding to an original in a first language and a translation of the original in a second language different from the first language, a translation subtitle in which the original and the translation are displayed.

In the non-transitory computer readable recording medium of this invention, the computer program further includes a step of causing the computer to display the translation subtitle in a display section included the computer.

According to the invention, the conference system includes the recognition means, the translation means and the generation means. Such a conference system realizes the conference supporting method of the invention.

A speaker gives speech in a first language. At this point, the first language is a language that the speaker can easily understand.

The speech given by the speaker is recognized by the recognition means in the first language.

The recognition result recognized by the recognition means (i.e., the original) is translated into a second language by the translation means. At this point, the second language is a language that a listener can easily understand.

The generation means generates the translation subtitle in which the original and the translation result translated by the translation means (i.e., the translation) are displayed.

When the translation subtitle, namely, a subtitle in which the original and the translation are displayed is displayed, the listener reads the displayed translation subtitle and understands the contents of the speech given by the speaker. At this point, the listener can read the translation or the original alone, or can read both the original and the translation in comparison with each other.

In general, a conference system includes a plurality of terminal units individually used by a plurality of conferees. In such a conference system, each terminal unit includes a display section. On the other hand, a part or the whole of the recognition means, the translation means and the generation means may be included in each terminal unit, in a typical terminal unit or in a central unit communicating with the respective terminal units.

Incidentally, when the conferees are assembled in one place, a single display section may be provided.

According to the invention, the generation means generates the parallel subtitle. In the parallel subtitle, an original and a translation are displayed in parallel, and therefore, a listener can read the original and the translation easily in comparison with each other as compared with a translation subtitle other than the parallel subtitle (such as a translation subtitle simply displaying the original and the translation). Accordingly, the listener can easily find if there is mistranslation. As a result, the listener can easily and accurately understand the contents of the speech given by the speaker.

Incidentally, in the case where the parallel subtitle alone is displayed in the conference system instead of displaying both the parallel subtitle and the recognition result subtitle as described later, a display area in which subtitles are displayed can be occupied by the parallel subtitle alone. Therefore, it is possible to prevent inconvenience that a part of the display area is occupied by the recognition result subtitle useless for the listener if he/she does not understand the original and hence the parallel subtitle cannot be displayed in that part.

According to the invention, the generation means generates the parallel subtitle in which each word or phrase of the original is displayed in parallel to an expression obtained by translating the word or phrase.

It is easier to accurately translate a word or a phrase included in an original than to accurately translate a whole sentence included in the original. Accordingly, a possibility of mistranslation of the original can be reduced.

Furthermore, the listener can easily compare the original with the translation with respect to each word or phrase. Therefore, the listener can easily found if there is mistranslation. As a result, the listener can easily and accurately understand the contents of the speech given by the speaker.

According to the invention, the generation means generates the parallel subtitle and the recognition result subtitle, and the display section displays the parallel subtitle and the recognition result subtitle generated by the generation means.

The display section displays the parallel subtitle for displaying the original and the translation in parallel in, for example, one of areas obtained by halving the display area (hereinafter referred to as the parallel area) and displays a subtitle including the original (namely, the recognition result subtitle) in the other area (hereinafter referred to as the original area). Therefore, although the parallel subtitle and the recognition result subtitle are both displayed in the display area, the parallel subtitle and the recognition result subtitle can be respectively easily read by the listener. Specifically, the readability of these subtitles can be improved.

Incidentally, time elapsed after the speech is given by the speaker until the original is obtained is shorter than time elapsed until the translation of the original is obtained. In other words, time elapsed after the speech is given by the speaker until the translation is obtained is longer.

According to the invention, however, the recognition result subtitle alone can be displayed priorly before obtaining the translation from the original. As a result, as compared with the case where the parallel subtitle alone is displayed, it is not apprehended that the listener is unnecessarily kept waiting.

In addition, apart from the recognition result subtitle already displayed in the original area, the parallel subtitle is displayed afterword in the parallel area, and therefore, there is no need to correct the already displayed recognition result subtitle for obtaining the parallel subtitle. In other words, processing for respectively displaying the recognition result subtitle and the parallel subtitle can be simply performed.

According to the invention, the recognition result subtitle is appropriately erased. This is because the parallel subtitle also includes the original. More specifically, it is not largely profitable to display both the parallel subtitle and the recognition result subtitle including the same original, and on the other hand, there arises a disadvantage that redundant originals wastefully occupy the display area of the display section.

Therefore, the recognition result subtitle corresponding to the original from which a portion of the original included in the parallel subtitle is excluded is generated, and the generated recognition result subtitle is displayed in the original area. As a result, the recognition result subtitle is successively erased generally from a portion displayed earlier.

In other words, the recognition result subtitle can be appropriately erased. As a result, the original and the translation can be efficiently displayed without spoiling the convenience for the conferees.

According to the invention, the parallel subtitle is scrolled for display in the parallel area, and the recognition result subtitle is scrolled for display in the original area.

Each of the parallel area and the original area is an area obtained by halving the display area of the display section, and hence, the volume of the parallel subtitle (or the recognition result subtitle) to be displayed simultaneously in the parallel area (or the original area) is smaller than the volume of subtitles displayable in the whole display area.

In the case where the parallel subtitle (or the recognition result subtitle) is automatically scrolled for display, however, the listener can successively read the whole of the parallel subtitle (or the recognition result subtitle).

Furthermore, in the case where the parallel subtitle (or the recognition result subtitle) can be manually scrolled, the listener can appropriately read a desired portion of the parallel subtitle (or the recognition result subtitle) by scrolling up or scrolling down the parallel subtitle (or the recognition result subtitle).

In this manner, the readability of these subtitles may be improved.

Incidentally, when the time elapsed until the translation is obtained from the original is excessively long, before displaying, in the parallel area, a parallel subtitle corresponding to the recognition result subtitle displayed in the original area, a new recognition result subtitle should be displayed in the original area. In such a case, the recognition result subtitle already displayed is automatically scrolled out from the original area, so that the new recognition result subtitle may be displayed in the original area. Furthermore, in this case, a symbol, a message or the like corresponding to the scroll out display of the recognition result subtitle may be additionally displayed in the original area.

According to the invention, the conference system further includes the recognition determination means and the area determination means.

In general, it takes a long time to perform calculation for obtaining a highly accurate speech recognition result. Accordingly, it is apprehended that the listener may be kept waiting for a long time before displaying the highly accurate speech recognition result. However, if the calculation time is reduced by sacrificing the accuracy in obtaining the speech recognition result, a mistaken speech recognition result may be displayed.

Therefore, the recognition means recognizes the speech in the first language again after once recognizing the speech in the first language. In this case, the recognition means recognizes the speech so that a more accurate recognition result may be obtained in the second recognition than in the first recognition. At this point, it takes long time to perform calculation for the speech recognition, but the listener is not kept waiting for a long time before displaying the speech recognition result. This is because the speech to be recognized in the second recognition by the recognition means has been already recognized, and hence, the speech recognition result obtained in the first recognition may be displayed without waiting until the second speech recognition is completed.

In the following description, the first recognition result recognized by the recognition means is designated as a first original and the second recognition result is designated as a high accuracy original.

It is apprehended that the first original may include a mistake. Therefore, the recognition determination means determines whether or not there is a replaced portion of the first original to be replaced with a replace portion of the high accuracy original. Since the accuracy in recognizing speech is higher in the high accuracy original than in the first original, if there is a difference between the first original and the high accuracy original, a different portion of the first original is the replaced portion and a different portion of the high accuracy original is the replace portion. When the replaced portion is replaced with the replace portion, the first original accords with the high accuracy original. In other words, the mistake in the first original can be thus corrected.

When there are the replace portion and the replaced portion, namely, when the first original includes a mistake, the generation means corrects a translation subtitle for displaying the first original and a corresponding translation to a translation subtitle for displaying the high accuracy original and a corresponding translation.

When a translation subtitle not displayed includes a mistake, the display section may display a translation subtitle having been corrected by the generation means in displaying the translation subtitle not displayed.

On the other hand, when a translation subtitle already displayed includes a mistake, a special care should be taken. This is because when the number of characters corresponding to the replaced portion is, for example, smaller than the number of characters corresponding to the replace portion, the replaced portion displayed in the display section cannot be simply replaced with the replace portion.

If a character size or a pitch between characters of the replace portion is reduced to be smaller than a character size or a pitch between characters of the replaced portion, the replaced portion may be replaced with the replace portion. In this case, however, the character size or the pitch between characters is partially changed in the translation subtitle, and hence, the appearance may be easily spoiled or the listener may feel it difficult to read the translation subtitle.

Alternatively, the high accuracy original may be displayed after erasing the first original (namely, the original may be wholly replaced), but in this case, it is difficult for the listener to find which portion has been corrected.

Furthermore, owing to, for example, the difference in the number of characters between the replace portion and the replaced portion, there is a high possibility that the same expression is disposed in different positions in the first original and the high accuracy original. Therefore, if the first original is erased while the listener is reading the first original, the listener may be easily confused up to which portion he/she has read even though the high accuracy original is displayed again.

In other words, the replacement of the whole original causes a problem that the usability of the conference system may be degraded.

Therefore, when the first original includes a mistake, the area determination means determines whether or not a displayable area capable of displaying the replace portion is generated in the translation subtitle by erasing the replaced portion from the translation subtitle displayed in the display section.

When the displayable area is generated by erasing the replaced portion, the display section erases the replaced portion and displays the replace portion in the displayable area.

When the displayable area is not generated by erasing the replaced portion, the display section erases the replaced portion and provides the displayable area before displaying the replace portion in the displayable area. At this point, for providing the displayable area, the display section scrolls a portion of the translation subtitle following the replaced portion in a direction toward the end.

In this manner, the first original displayed can be corrected to the high accuracy original without changing the character size or the pitch between the characters or without replacing the whole original. In this case, the degradation of the usability of the conference system can be suppressed.

In order to further reduce change in the displayed contents, the display section may precedently provide a margin between expressions in displaying the first original. In this case, for example, a blank corresponding to a prescribed number N ($N \geqq 2$) of characters is provided between English words, where a blank corresponding to one character is generally provided. In this case, it tends to be determined that a displayable area is generated by erasing the replaced portion, and hence, there is a higher possibility that it is not necessary to scroll the translation subtitle for providing the displayable area. In other words, the change in the displayed contents may be reduced.

According to the invention, when the replace portion is displayed in the displayable area, the display section displays the replace portion emphatically for prescribed time as compared with the other portion of the translation subtitle. In this case, the listener can easily grasp whether or not the displayed original has been corrected or which portion of the original has been corrected if the displayed original has been corrected.

In addition, after the prescribed time, the emphatic display of the replace portion is halted, and hence, the replace portion is not continuously emphatically displayed so as not to spoil the appearance or so as not to make it difficult for the listener to read the translation subtitle.

According to the invention, the conference system is constructed by using a central unit and a plurality of terminal units. The central unit is connected to the terminal units so as to be able to communicate with each other. Each terminal unit is used by a conferee.

In the central unit, the recognition means recognizes the speech in the first language. As a result, the original is obtained in the central unit. Furthermore, in the central unit, the translation means translates the original into the second language. As a result, the translation is obtained in the central unit.

Moreover, in the central unit, the delivery means delivers data corresponding to the original and the translation to the plural terminal units.

In each terminal unit, the generation means generates the translation subtitle for displaying the original and the translation on the basis of the received data. Furthermore, in each terminal unit, the display section displays the translation subtitle generated by the generation means.

Such a terminal unit is constructed as the information processor of this invention and realizes the information processing method of this invention. Furthermore, the computer program stored in the non-transitory computer readable recording medium of this invention realizes the various means of the information processor of this invention as software by using hardware elements of a computer.

In general, complicated processing is required for realizing the speech recognition and the translation by using a computer. Accordingly, if each terminal unit includes the recognition means and the translation means, it is apprehended that very long processing time is necessary from the speech recognition to the subtitle display unless the calculation power of each terminal unit is high. On the other hand, when the calculation power of each terminal unit is increased, the fabrication cost for the conference system is increased.

Therefore, the central unit executes the complicated processing. In this case, the calculation power of the central unit alone is increased, and hence, the processing time necessary from the speech recognition to the subtitle display may be reduced while reducing the fabrication cost of the conference system.

In the conference system, the information processor, the conference supporting method and the information processing method of this invention, the speaker can make speech in the first language that he/she can easily understand. At this point, there arises no problem even if he/she does not understand the second language at all.

On the other hand, the listener can read the contents of the speech given by the speaker in the second language that he/she can easily understand. At this point, there arises no problem even if he/she does not understand the first language at all. Accordingly, the listener can more easily understand the contents of the speech given by the speaker than the case where he/she listens to the speech given in the first language and than the case where he/she reads the contents of the speech written in the first language.

Furthermore, even when the listener cannot sufficiently understand the first language, he/she can easily find if there is mistranslation by comparatively reading the contents of the speech written in the first language (namely, the original) and the contents of the speech written in the second language (namely, the translation). Accordingly, the listener can easily and accurately understand the contents of the speech given by the speaker.

As described so far, the convenience for all conferees of a conference can be improved no matter whether the conferee is a speaker or a listener.

The above and further objects and features will more fully be apparent from the following detailed description with accompanying drawings.

DETAILED DESCRIPTION

Now, the present invention will be described in detail on the basis of accompanying drawings illustrating embodiments thereof.

Embodiment 1

Figure 1:
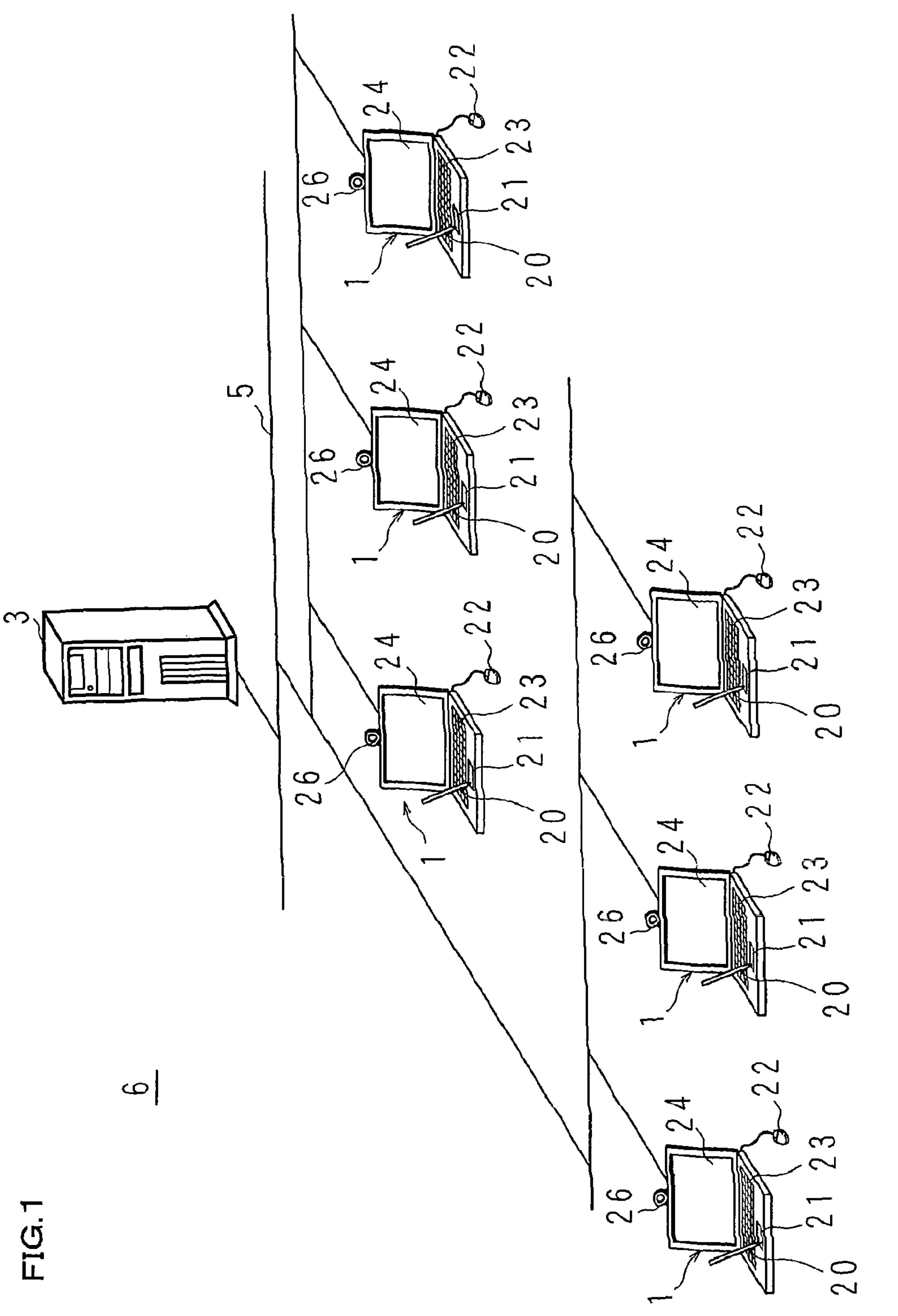
FIG. 1 is a schematic diagram illustrating the structure of a conference system of Embodiment 1 of the invention.

FIG. 1 is a schematic diagram illustrating the structure of a conference system 6 of Embodiment 1 of the invention.

In the conference system 6 of Embodiment 1, for supporting implementation of a conference held among a plurality of conferees, information necessary to the conference is commonly provided to a plurality of terminal units 1, 1 . . . . Therefore, the conference system 6 includes terminal units 1, 1 . . . used by the conferees in number equal to the number of conferees, and further includes one central unit 3 and a network 5.

The information necessary to the conference are information such as speech given by conferees, dynamic images of the conferees, still images of materials used in the conference and subtitles corresponding to contents of speech given by the conferees.

The network 5 is constructed by using a network of an in-house LAN of a company where the conference is held and/or a public communication network such as the Internet.

Each terminal unit 1 is connected to the central unit 3 through the network 5 so as to be able to communicate with each other. Therefore, each terminal unit 1 is authenticated for connection to the central unit 3, so that information such as speech and subtitles to be commonly provided are transmitted/received between the authenticated terminal unit 1 and the central unit 3. For example, speech data corresponding to speech is delivered from the central unit 3 to authenticated terminal units 1, 1 . . . , and each terminal unit 1 having received the speech data outputs speech from a loudspeaker 28 described later on the basis of the received speech data. As a result, the same speech is output from the loudspeaker 28 of each of the authenticated terminal units 1, 1 . . . , namely, the same speech is commonly provided to the terminal units 1, 1 . . . .

In the following description, an authenticated terminal unit 1 is simply designated as a terminal unit 1 unless otherwise mentioned.

Figure 2:
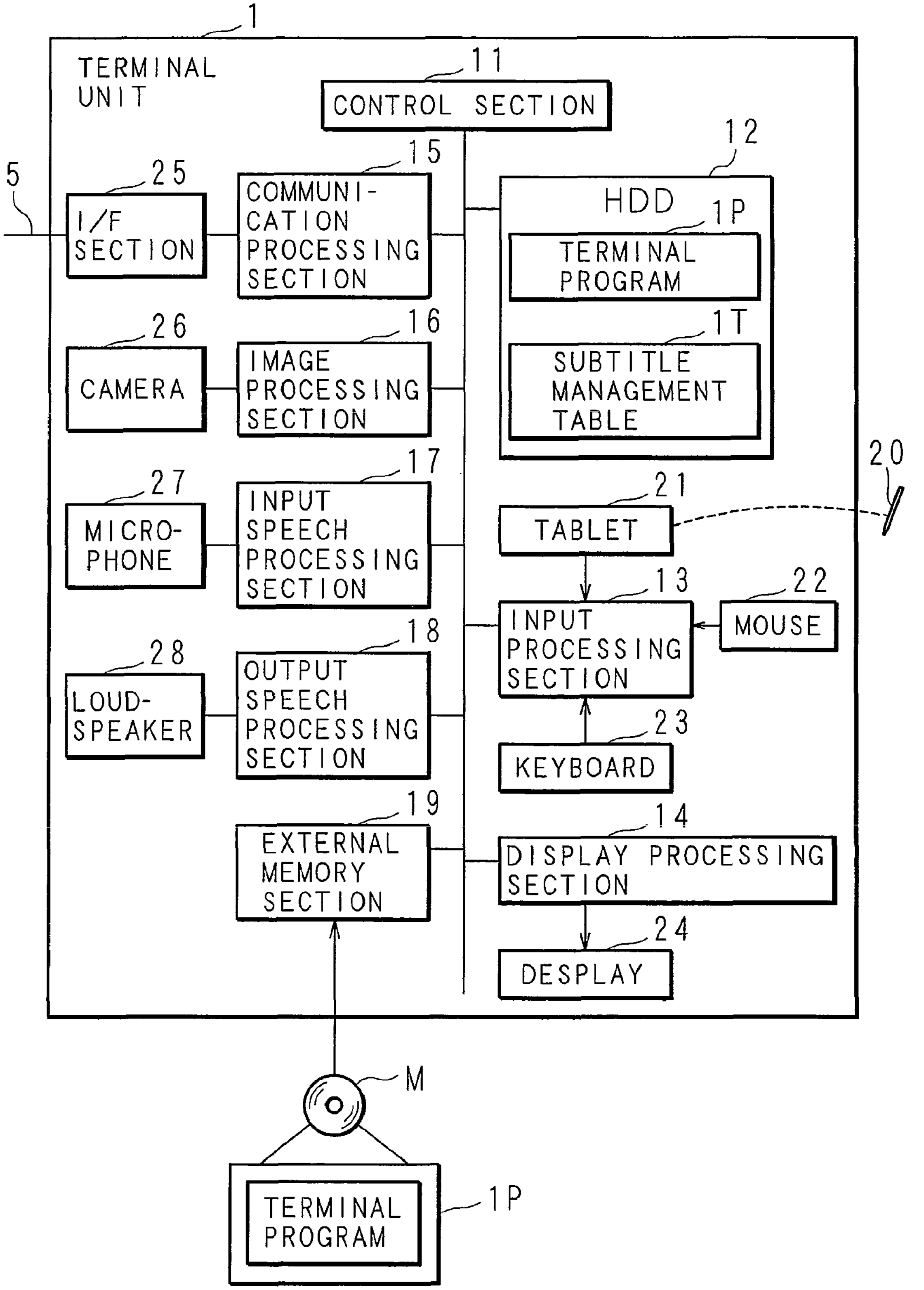
FIG. 2 is a block diagram illustrating the structure of a principal part of a terminal unit included in the conference system of Embodiment 1 of the invention.

FIG. 2 is a block diagram illustrating the structure of a principal part of the terminal unit 1.

The terminal unit 1 is constructed by using a personal computer, and includes a control section 11, an HDD (Hard Disk Drive) 12, an input processing section 13, a display processing section 14, a communication processing section 15, an image processing section 16, an input speech processing section 17, an output speech processing section 18 and an external memory section 19 mutually connected through buses or signal lines.

The terminal unit 1 further includes a tablet 21, a mouse 22, a keyboard 23, a display 24, an I/F section 25, a camera 26, a microphone 27 and a loudspeaker 28 fitted therein or externally connected thereto.

The control section 11 includes a ROM corresponding to a main memory section, a CPU for executing various processing in accordance with a computer program stored in the ROM and a RAM used by the CPU as a work area, and functions as a control center of the terminal unit 1.

The HDD 12 is an auxiliary memory section. The HDD 12 stores a computer program (hereinafter referred to as the terminal program) 1P for the terminal unit 1. The terminal program 1P functions as a computer program in embodiments of the invention. It is noted that the HDD 12 may store a computer program other than the terminal program 1P.

When the control section 11 controls the respective sections of the terminal unit 1 in accordance with the terminal program 1P stored in the HDD 12, the terminal unit 1 functions as an information processor in embodiments of the invention.

Furthermore, the HDD 12 stores a subtitle management table 1T (see FIGS. 8A, 8B, 9A and 9B) described later.

The tablet 21, the mouse 22 and the keyboard 23 are connected to the input processing section 13 as user interfaces for input. The tablet 21 is operated by using a pen 20.

In the following description, the tablet 21, the mouse 22 and the keyboard 23 are not particularly distinguished from one another but mentioned simply as operation sections 21 through 23.

The display 24 is connected to the display processing section 14 as a user interface for output. The display 24 is constructed by using a liquid crystal display and functions as a display section in embodiments of the invention.

The control section 11 causes the display processing section 14 to display a subtitle display screen 241 (see FIG. 4) described later on the display 24. In the subtitle display screen 241, a subtitle display area 4 for displaying subtitles to be commonly provided to the terminal units 1, 1 . . . is provided.

The communication processing section 15 is constructed by using a network card, and the I/F section 25 corresponding to an interface between the terminal unit 1 and the network 5 is connected to the communication processing section 15. The communication processing section 15 performs processing for packetizing digital data transmitted/received through the network 5, reading digital data from a packet and the like. A communication protocol used by the communication processing section 15 for transmitting/receiving data such as speech data and dynamic image data of dynamic images is, for example, a communication protocol such as H.323, SIP (Session Initiation Protocol) or HTTP (Hypertext Transfer Protocol) but is not limited to them.

The control section 11 transmits/receives various data to/from the central unit 3 by using the communication processing section 15.

The camera 26 is connected to the image processing section 16. The camera 26 takes images of the conferee using the terminal unit 1, so that dynamic images of the conferee are given to the image processing section 16. The image processing section 16 includes an encoder, and converts the dynamic images given from the camera 26 into dynamic image data according to image standards such as H.264 or MPEG and outputs the converted dynamic image data.

The control section 11 transmits the dynamic image data output from the image processing section 16 to the central unit 3. The dynamic image data transmitted from one terminal unit 1 to the central unit 3 is delivered from the central unit 3 to the other terminal units 1, 1 . . . .

Figure 4:
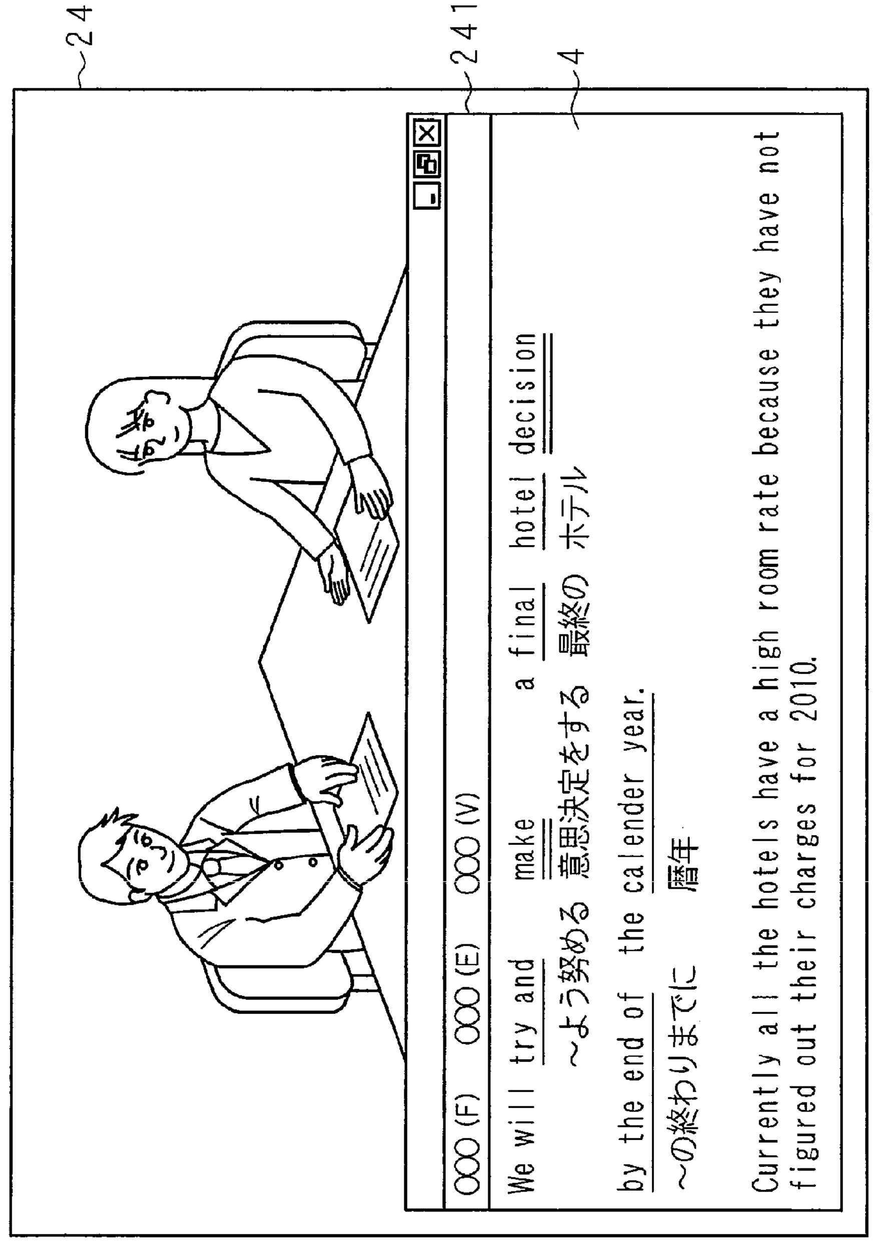
FIG. 4 is a schematic diagram illustrating an example of a subtitle display screen displayed on a display of each of terminal units in the conference system of Embodiment 1 of the invention.

The terminal unit 1 having received the dynamic image data displays dynamic images obtained on the basis of the received dynamic image data in a prescribed display area on the display 24 (such as a dynamic image display screen disposed in the vicinity of the subtitle display screen 241 of FIG. 4).

The microphone 27 is connected to the input speech processing section 17. The microphone 27 collects speech given by the conferee using the terminal unit 1, so as to give analog speech signals to the input speech processing section 17. The input speech processing section 17 has an A/D conversion function, and converts the given speech signals into digital speech data through sampling the speech signals and outputs the converted speech data. It is noted that the input speech processing section 17 may include an echo canceller.

The control section 11 transmits the speech data output from the input speech processing section 17 to the central unit 3. The speech data transmitted from one terminal unit 1 to the central unit 3 is delivered from the central unit 3 to the other terminal units 1, 1 . . . .

The terminal unit 1 having received speech data inputs the received speech data to the output speech processing section 18.

The loudspeaker 28 is connected to the output speech processing section 18. The output speech processing section 18 has a D/A conversion function, and converts the digital speech data input thereto into analog speech signals and gives the converted speech signals to the loudspeaker 28. At this point, the loudspeaker 28 outputs speech.

The external memory section 19 is controlled by the control section 11 so as to read, from a portable recording medium M, the terminal program 1P recorded in the recording medium M. The read terminal program 1P is written in the HDD 12.

As the recording medium M, a recording medium such as a CD-ROM, a DVD, a Blu-ray disk or a flexible disk is used.

Although the terminal program 1P is recorded in the recording medium M for distribution in Embodiment 1, the invention is not limited to this. The terminal program 1P may be, for example, distributed through the network 5 or precedently stored in the ROM included in the control section 11.

Furthermore, although the terminal program 1P is executed after being installed in the terminal unit 1 in Embodiment 1, the invention is not limited to this. The terminal program 1P may be read from the recording medium M or a distributor to be directly executed.

In the following description, when the plurality of terminal units 1, 1 . . . are to be distinguished from one another, the terminal units 1, 1 . . . are designated for convenience as terminal units A1, B1, C1 . . . (see FIG. 7 described later). Furthermore, conferees respectively using the terminal units A1, B1, C1 . . . are designated as conferees Pa, Pb, Pc . . . . Moreover, the conferee Pa may be designated as a speaker Pa and the conferees Pb, Pc . . . may be designated as listeners Pb, Pc . . . .

Figure 3:
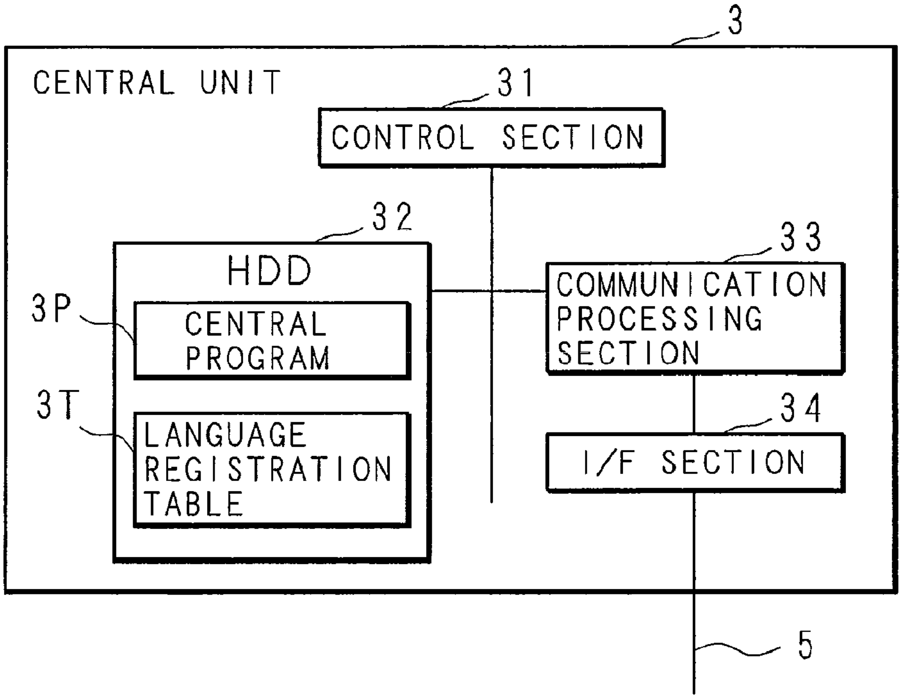
FIG. 3 is a block diagram illustrating the structure of a principal part of a central unit included in the conference system of Embodiment 1 of the invention.

FIG. 3 is a block diagram illustrating the structure of a principal part of the central unit 3.

The central unit 3 is constructed by using a server computer, and includes a control section 31, an HDD 32 and a communication processing section 33 mutually connected through buses or signal lines. The central unit 3 further includes an I/F section 34.

The control section 31 includes a ROM corresponding to a main memory section, a CPU for executing various processing in accordance with a computer program stored in the ROM and a RAM used by the CPU as a work area, and functions as a control center of the central unit 3.

The HDD 32 is an auxiliary memory section.

The HDD 32 stores a computer program (hereinafter referred to as the central program) 3P for the central unit 3. The control section 31 executes various processing in accordance with the central program 3P stored in the HDD 32, so as to control the respective sections of the central unit 3. The central program 3P includes computer programs such as a computer program for speech recognition and a computer program for translation. It is noted that the HDD 32 may store a computer program other than the central program 3P.

Furthermore, the HDD 32 stores user data used for authenticating the terminal units 1, 1 . . . although the user data is not illustrated in the drawing. Moreover, the HDD 32 stores a language registration table 3T described later.

The communication processing section 33 is constructed by using a network card, and the I/F section 34 corresponding to an interface between the central unit 3 and the network 5 is connected to the communication processing section 33. The communication processing section 33 performs processing for packetizing digital data transmitted/received through the network 5, reading digital data from a packet and the like. A communication protocol used by the communication processing section 33 for transmitting/receiving data such as speech data and dynamic image data is a communication protocol such as H.323, SIP or HTTP, but is not limited to them.

The control section 31 transmits/receives various data to/from the terminal units 1, 1 . . . by using the communication processing section 33.

It is noted that the terminal unit 1 (or the central unit 3) may include, instead of the auxiliary memory section including the HDD 12 (or the HDD 32), an auxiliary memory section including a flash memory such as an SSD.

The conference system 6 having the aforementioned structure is what is called a videoconference system, and owing to the conference system 6, the conferees can hold an electronic conference on a real-time basis.

For this purpose, each conferee uses one terminal unit 1, so as to start conference application software (hereinafter referred to as the conference application) on the basis of the terminal program 1P by operating the operation sections 21 through 23.

When the conference application is started, an authentication screen where the conferee inputs user information such as a user ID and a password is displayed on the display 24. While visually checking the authentication screen displayed on the display 24, the conferee inputs the user information in the authentication screen by operating the operation sections 21 through 23.

The input processing section 13 outputs user data corresponding to the user information input in the authentication screen to the control section 11. The control section 11 transmits the input user data to the central unit 3. At this point, an IP address allocated to the terminal unit 1 is also transmitted to the central unit 3 in association with the user data.

The central unit 3 receives the user data and the IP address.

The control section 31 compares the received user data with user data stored in the HDD 32, so as to determine whether or not the user is permitted to login. Subsequently, the control section 31 transmits authentication result data corresponding to the result of the determination to the terminal unit 1 identified by the received IP address.

When the user is permitted to login, the control section 31 issues terminal identification data for identifying each of the terminal units 1, 1 . . . . The authentication result data corresponding to permission to login includes the terminal identification data. Thereafter, the control section 31 identifies each of the terminal units 1, 1 . . . by using the terminal identification data.

In the terminal unit 1 having received the authentication result data corresponding to the permission to login (namely, the authenticated terminal unit 1), various screens (such as a dynamic image display screen and the subtitle display screen 241) of the conference application are displayed on the display 24. Thereafter, the conferee can use the terminal unit 1 as a conference terminal unit of the conference system 6. Furthermore, in transmitting desired data to the central unit 3, the terminal unit 1 simultaneously transmits also the terminal identification data included in the authentication result data to the central unit 3.

On the other hand, in the terminal unit 1 having received the authentication result data corresponding to rejection of login (namely, the terminal unit 1 not authenticated), a screen including an error message is displayed on the display 24. In this case, the conferee can not use the terminal unit 1 as a conference terminal unit of the conference system 6.

FIG. 4 is a schematic diagram illustrating an example of the subtitle display screen 241 displayed on the display 24 of each of the terminal units B1 and C1.

The subtitle display screen 241 is an application window of the conference application, and the subtitle display area 4 in a rectangular shape is provided at the center of the subtitle display screen 241.

Assuming that the mother tongue of the speaker Pa is English, that the mother tongue of the listeners Pb and Pc is Japanese and that the mother tongue of the listener Pd is German, it is more convenient for the speaker Pa to use English than to use a language such as Japanese or German, it is more convenient for the listeners Pb and Pc to use Japanese and it is more convenient for the listener Pd to use German.

Therefore, the conference system 6 recognizes speech given by the speaker Pa in English, translates the recognized speech into Japanese, and displays a translation subtitle including English sentences (namely, the original) and Japanese sentences (namely, the translation) corresponding to the contents of the speech and an original subtitle including the original alone in the subtitle display area 4 of the display 24 of each of the terminal units B1 and C1. Similarly, the conference system 6 displays a translation subtitle including the original and German sentences corresponding to the translation and the original subtitle in the subtitle display area 4 of the display 24 of the terminal unit D1.

As an example of such a translation subtitle, a parallel subtitle in which the original and the translation are displayed in parallel will be exemplarily described in Embodiment 1. Furthermore, the original subtitle functions as a recognition result subtitle in embodiments of the invention.

Figure 5:
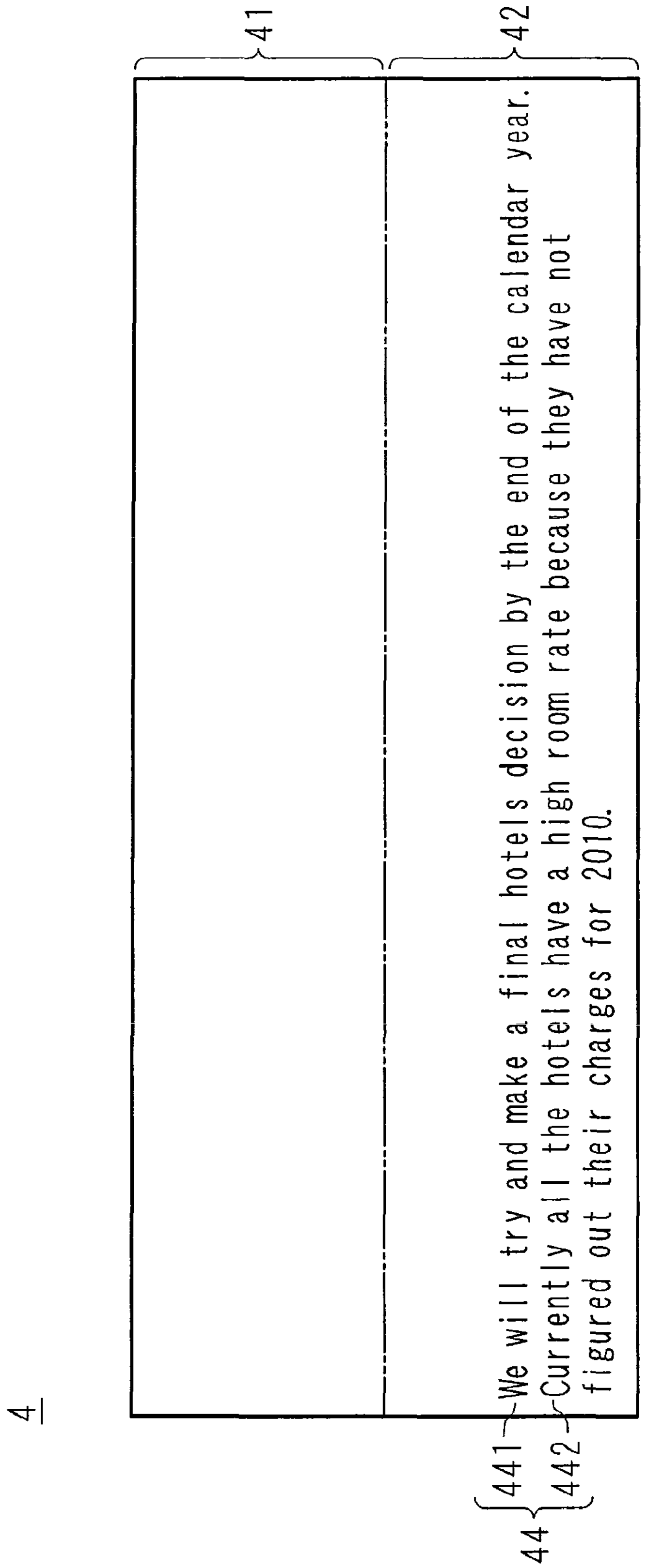
FIG. 5 is a schematic diagram illustrating an example of an original subtitle displayed in a subtitle display area of the subtitle display screen in the conference system of Embodiment 1 of the invention.
Figure 6:
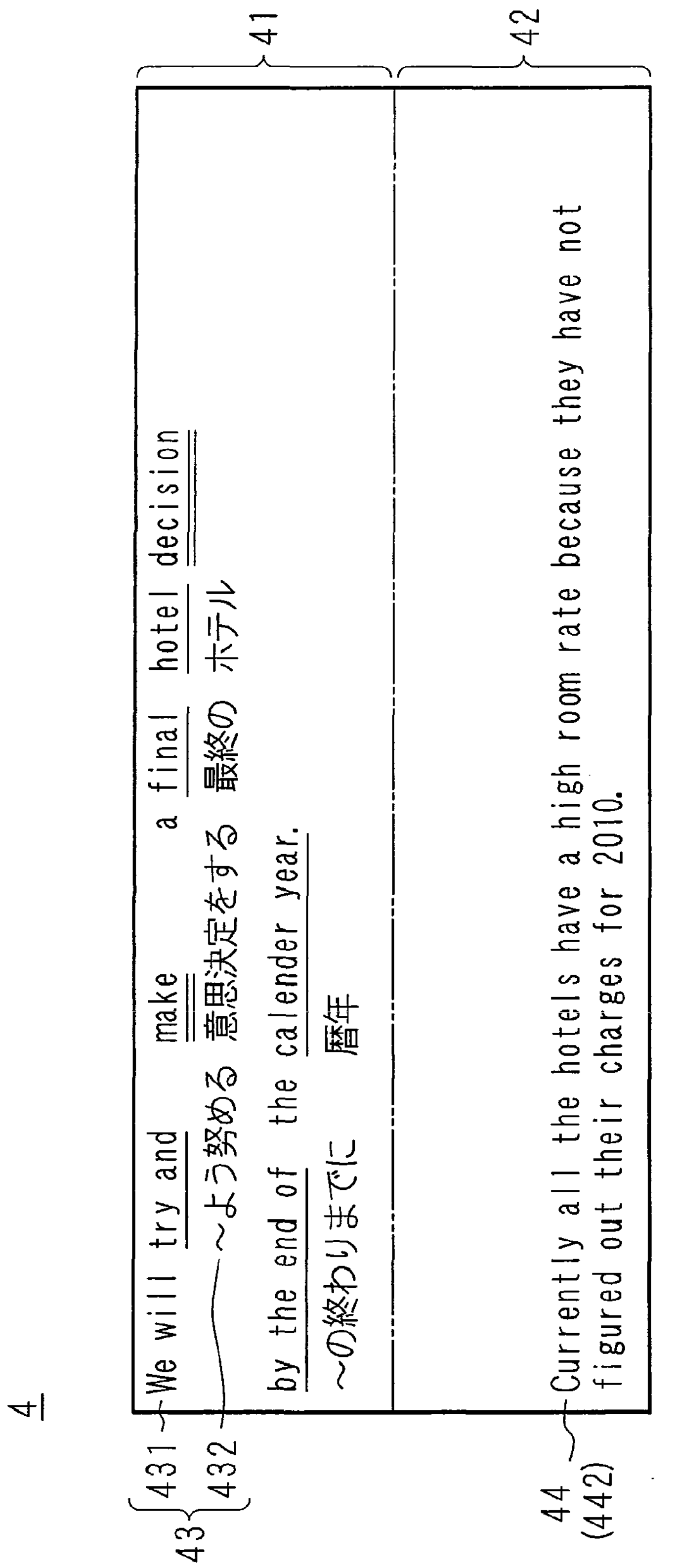
FIG. 6 is a schematic diagram illustrating an example of a parallel subtitle and an original subtitle displayed in the subtitle display area in the conference system of Embodiment 1 of the invention.

FIG. 5 is a schematic diagram illustrating an example of an original subtitle 44 displayed in the subtitle display area 4. Also, FIG. 6 is a schematic diagram illustrating an example of a parallel subtitle 43 and the original subtitle 44 displayed in the subtitle display area 4.

The subtitle display area 4 is virtually halved into upper and lower parts, and the upper part is used as a parallel area 41 for displaying the parallel subtitle and the lower part is used as an original area 42 for displaying the original subtitle. Accordingly, the subtitle display area 4, and the parallel area 41 and the original area 42 respectively function as a display area of a display section in embodiments of the invention, and one part and the other part obtained by halving the display area. It is noted that a border line may be provided between the parallel area 41 and the original area 42.

FIG. 5 illustrates a case where the original subtitle 44 including originals 441 and 442 are displayed laterally in the original area 42 and nothing is displayed in the parallel area 41. Since translation processing takes a long time in general, the original subtitle 44 including the originals 441 and 442 is displayed until translations of the originals 441 and 442 are obtained.

At this point, for the listeners Pb and Pc visually checking the original area 42, the original 441 is first automatically displayed so as to move upward from the lower end of the original area 42 (namely, the original 441 is automatically scrolled up), and thereafter, the original 442 is automatically displayed so as to push up the original 441 (namely, the originals 441 and 442 are automatically scrolled up).

FIG. 6 illustrates a case where a translation 432 of the original 441 (see FIG. 5) is obtained. In this case, the parallel subtitle 43 including an original 431 and a translation 432 displayed in parallel is laterally displayed in the parallel area 41, and the original subtitle 44 is laterally displayed in the original area 42.

At this point, for the listeners Pb and Pc visually checking the parallel area 41, the first line of the original 431 is automatically displayed so as to move upward from the lower end of the original area 42, and subsequently, the first line of the translation 432 is automatically displayed so as to push up the original 441, and similarly, the second lines of the original 431 and the translation 432 are automatically displayed so as to push up the first lines of the original 431 and the translation 432.

At this point, the original 431 corresponds to the original 441 of FIG. 5. Therefore, the original subtitle 44 of FIG. 6 includes the original 442 of FIG. 5 but do not include the original 441. In other words, a portion of the original subtitle 44 corresponding to the original 431 included in the parallel subtitle 43 displayed in the parallel area 41 is erased from the original area 42. Therefore, the originals 441 and 431 with the completely same contents are not redundantly displayed in the parallel subtitle 43 and the original subtitle 44. Specifically, the original subtitle 44 includes merely the original 442 not translated yet.

Accordingly, for the listeners Pb and Pc visually checking the original area 42, at the same time as the original 431 and the translation 432 are displayed, the original 441 is erased with merely the original 442 remained.

As illustrated in FIG. 6, in the parallel subtitle 43 of Embodiment 1, with respect to each of words and phrases included in the original 431 (such as "try and", "make . . . decision", "final" and "hotel"), an expression obtained by translating the word or phrase (such as "~よう努める", "意思決定をする", "最終の" or "ホテル" in this exemplary case) is displayed as the translation 432 in parallel. At this point, each word or phrase is distinguished from the other words or phrases in accordance with an underline, a display color or the like provided thereto.

In the exemplary case illustrated in FIG. 6, the lateral length of each word or phrase included in the original 431 is shorter than the lateral length of a corresponding expression obtained by translating the word or phrase and included in the translation 432. Therefore, spaces between adjacent words or phrases are set to be longer in the original 431 in accordance with the lengths of the translated expressions than those in the original 441 illustrated in FIG. 5.

For displaying subtitles, the conferees Pa, Pb, Pc . . . precedently register languages to be used by them. For this purpose, a language registration screen is displayed on the display 24. For example, the conferee Pa operates the operation sections 21 through 23 while visually checking the language registration screen displayed on the display 24, so as to input English, that is, a desired language, as the language to be used in the language registration screen.

Thereafter, data corresponding that the language to be used is English and the terminal identification data are transmitted from the terminal unit A1 to the central unit 3.

The central unit 3 having received the data corresponding to the language to be used and the terminal identification data stores, in the HDD 32, the language registration table 3T in which the terminal identification data of the terminal units A1, B1, C1 . . . and the languages to be used by the conferees Pa, Pb, Pc . . . are associated with each other.

It is noted that the parallel subtitle and the original subtitle may be displayed also on the display 24 of the terminal unit A1 in the conference system 6. In the case where at least the original subtitle is displayed on the display 24 of the terminal unit A1, the speaker Pa can read the displayed original subtitle and check whether or not the speech given by himself/herself has been accurately recognized.

Figure 7:
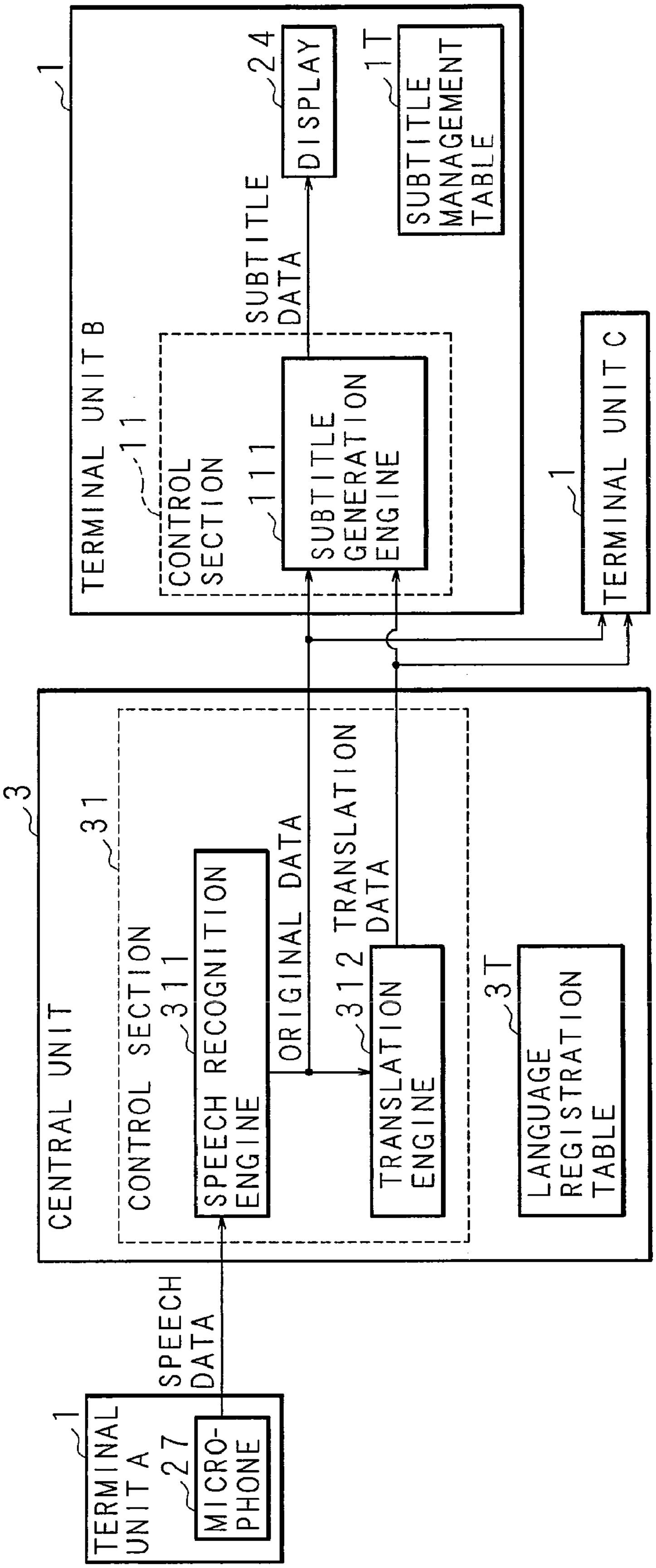
FIG. 7 is a functional block diagram for explaining a mechanism of commonly providing subtitles to terminal units in the conference system of Embodiment 1 of the invention.

FIG. 7 is a functional block diagram for explaining the mechanism of commonly providing subtitles to the terminal units 1, 1 . . . (see FIGS. 2 and 3).

The speech given by the speaker Pa in English is collected by the microphone 27 of the terminal unit A1 and converted into speech data by the input speech processing section 17 of the terminal unit A1. The speech data obtained through the conversion, namely, speech data corresponding to the speech given by the speaker Pa, is transmitted from the terminal unit A1 to the central unit 3 together with the terminal identification data of the terminal unit A1.

When the speech data and the terminal identification data are received, the control section 31 of the central unit 3 determines a language for the original and a language for the translation by referring to the language registration table 3T on the basis of the received terminal identification data.

In the exemplary case of Embodiment 1, since the terminal identification data received by the central unit 3 is data corresponding to the terminal unit A1, it is determined that the language for the original is English. Furthermore, it is determined that the language for translation for the terminal units B1 and C1 is Japanese and that the language for translation for the terminal unit D1 is German.

In the following, translation of English into Japanese will be exemplarily described.

The control section 31 of the central unit 3 functions as a speech recognition engine 311 for recognizing speech in English in accordance with a computer program for recognizing speech in English included in the central program 3P. Furthermore, the control section 31 functions as a translation engine 312 for translating English into Japanese in accordance with a computer program for translating English into Japanese included in the central program 3P.

The speech recognition engine 311 executes speech recognition processing on the speech data received from the terminal unit A1, so as to generate original data corresponding to the recognition result (namely, the original). Such a speech recognition engine 311 functions as a recognition section in this embodiment of the invention.

Furthermore, the speech recognition engine 311 delivers the generated original data to the terminal units B1 and C1.

The translation engine 312 executes translation processing on the original data generated by the speech recognition engine 311, so as to generate translation data corresponding to the translation result (namely, the translation). Such a translation engine 312 functions as a translation section in this embodiment of the invention. It is noted that the translation data includes words or phrases of the original and expressions obtained by translating the words or the phrases respectively in association with each other.

Furthermore, the translation engine 312 delivers the generated translation data to the terminal units B1 and C1.

The speech recognition processing performed by the speech recognition engine 311 and the translation processing performed by the translation engine 312 are executed as multitasking. Since the speech recognition processing and the translation processing have large calculation load, the calculation power of the control section 31 is preferably larger at least than that of the control section 11 of the terminal unit 1. It is noted that the control section 31 may include an MPU for devotedly executing the speech recognition processing and an MPU for devotedly executing the translation processing.

After one speech recognition processing is completed, next speech recognition processing may be completed before completing the translation processing following the former speech recognition processing. In such a case, original data of, for example, one original 441 is delivered, and original data of the next original 442 is delivered before delivering translation data of the translation 432 corresponding to the original 441 (the original 431) (see FIGS. 5 and 6).

Incidentally, in the case where the original is a long sentence, the original may be divided and each divided portion may be translated, so that translation data may be delivered successively from a portion completed in the translation. In this case, original data of one original 441 and the next original 442 included in a divided long sentence is delivered and the translation data of the translation 432 corresponding to the original 441 translated first is delivered before delivering the translation data of the translation corresponding to the remaining original 442.

FIGS. 8A, 8B, 9A and 9B are schematic diagrams illustrating an example of the subtitle management table 1T used for managing the original, the translation and the various subtitles. More specifically, the subtitle management table 1T is used for managing, in the terminal unit 1, received original data, an original subtitle currently displayed, received translation data and a parallel subtitle currently displayed.

In FIGS. 8A, 8B, 9A and 9B, the original data of the originals 441 and 442 are respectively expressed as "aaa" and "bbb", and the originals 441 and 442 included in the original subtitle 44 are respectively expressed as "AAA" and "BBB". Furthermore, in FIGS. 9A and 9B, the translation data of the translation 432 is expressed as "あああ" and the original 431 and the translation 432 included in the parallel subtitle 43 are respectively expressed as "aaa" and "アア ア". Moreover, correspondence between the original data of the original 441 and the translation data of the translation 432 is expressed by using a symbol "*".

As illustrated in FIG. 7, the control section 11 of each of the terminal units B1 and C1 functions as a subtitle generation engine 111 by operating in accordance with the terminal program 1P.

When the original data of the original 441 is received, the subtitle generation engine 111 of each of the terminal units B1 and C1 first registers the original data of the original 441 in the subtitle management table 1T.

Next, the subtitle generation engine 111 generates original subtitle data for displaying the original subtitle 44 including the original 441 on the display 24 on the basis of the received original data. Furthermore, the subtitle generation engine 111 gives the generated original subtitle data to the display processing section 14, so as to display the original subtitle 44 on the display 24. Then, the subtitle generation engine 111 registers the original subtitle 44 including the original 441 in the subtitle management table 1T.

Figure 8A:
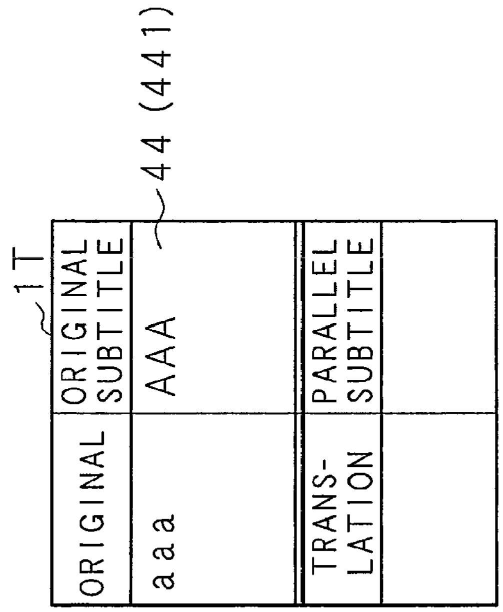
FIGS. 8A and 8B are schematic diagrams illustrating an example of a subtitle management table used for managing original, translation and various subtitles in the conference system of Embodiment 1 of the invention.

As a result, the subtitle management table 1T as illustrated in FIG. 8A is obtained.

Furthermore, when the original data of the original 442 is received, the subtitle generation engine 111 registers the original data of the original 442 in the subtitle management table 1T.

Next, the subtitle generation engine 111 generates original subtitle data for displaying the original subtitle 44 including the originals 441 and 442 on the display 24 on the basis of the received original data. Moreover, the subtitle generation engine 111 gives the generated original subtitle data to the display processing section 14, so as to display the original subtitle 44 on the display 24.

Then, the subtitle generation engine 111 registers the original subtitle 44 including the originals 441 and 442 in the subtitle management table 1T.

Figure 8B:
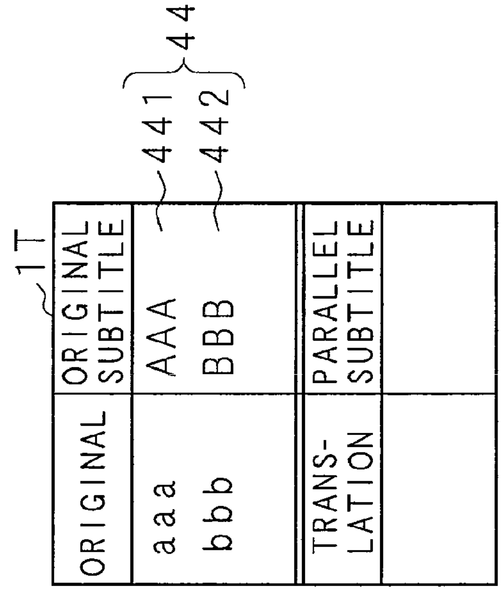

As a result, the subtitle management table 1T as illustrated in FIG. 8B is obtained. Accordingly, it is understood by referring to this subtitle management table 1T that the subtitle display area 4 as illustrated in FIG. 5 is displayed on the display 24.

Furthermore, when the translation data of the translation 432 is received, the subtitle generation engine 111 registers the translation data of the translation 432 in the subtitle management table 1T.

Moreover, the subtitle generation engine 111 checks, on the basis of a word or a phrase of the original included in the translation data of the translation 432, correspondence between the translation 432 and the original corresponding to the original data already received. In the exemplary case of Embodiment 1, since the translation 432 corresponds to the original 441, the subtitle generation engine 111 registers the correspondence between the original data of the original 441 and the translation data of the translation 432 in the subtitle management table 1T.

Figure 9B:
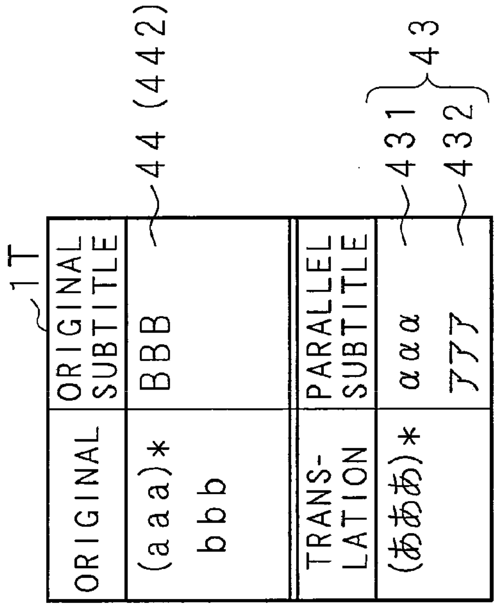
FIGS. 9A and 9B are schematic diagrams illustrating the example of the subtitle management table used for managing original, translation and various subtitles in the conference system of Embodiment 1 of the invention.
Figure 9A:
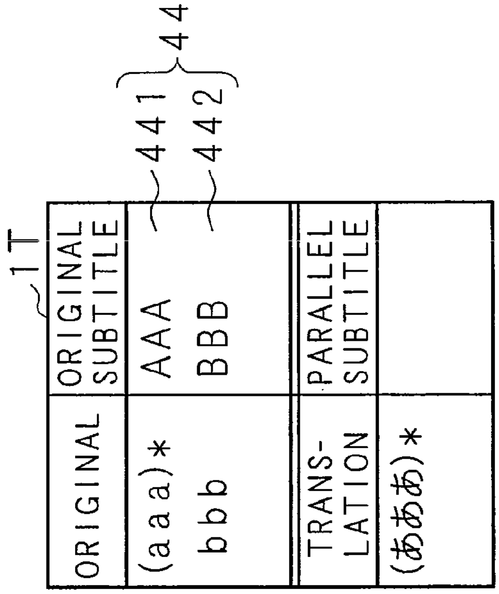

As a result, the subtitle management table 1T as illustrated in FIG. 9A is obtained.

Next, the subtitle generation engine 111 generates parallel subtitle data for displaying the parallel subtitle 43 including the original 431 corresponding to the original 441 and the translation 432 on the display 24 on the basis of the received translation data.

Furthermore, the subtitle generation engine 111 alters the current original subtitle data, namely, the original subtitle data for displaying the original subtitle 44 including the originals 441 and 442 on the display 24, to original subtitle data for displaying the original subtitle 44 including the original 442 on the display 24. This is because the original 431 corresponding to the original 441 is included in the parallel subtitle 43. The original 441 is erased in the original subtitle 44 displayed on the basis of the original subtitle data thus corrected.

Furthermore, the subtitle generation engine 111 gives the generated parallel subtitle data and the altered original subtitle data to the display processing section 14, so as to display the parallel subtitle 43 and the original subtitle 44 on the display 24.

Then, the subtitle generation engine 111 registers, in the subtitle management table 1T, the parallel subtitle 43 including the original 431 and the translation 432 and the original subtitle 44 including the original 442.

As a result, the subtitle management table 1T as illustrated in FIG. 9B is obtained. Accordingly, it is understood by referring to this subtitle management table 1T that the subtitle display area 4 as illustrated in FIG. 6 is displayed on the display 24.

The subtitle generation engine 111 described so far functions as a generation section in this embodiment of the invention.

The volume of the originals 441 and 442 (or the original 442) included in the original subtitle 44 is so small that the originals may be wholly displayed in the original area 42 in the exemplary case illustrated in FIG. 5 (or FIG. 6). In the case where new original data is delivered before delivering translation data from the central unit 3, however, the volume of the originals included in the original subtitle 44 may become too large to display in the original area 42.

In such a case, portions at the head of the original included in the original subtitle 44 are automatically successively erased and portions at the end of the original included in the original subtitle 44 are automatically successively scrolled up in the original area 42. In addition, an omission symbol 45 (see FIG. 10 referred to next) corresponding to omission of the portions at the head of the original included in the original subtitle 44 is displayed.

Figure 10:
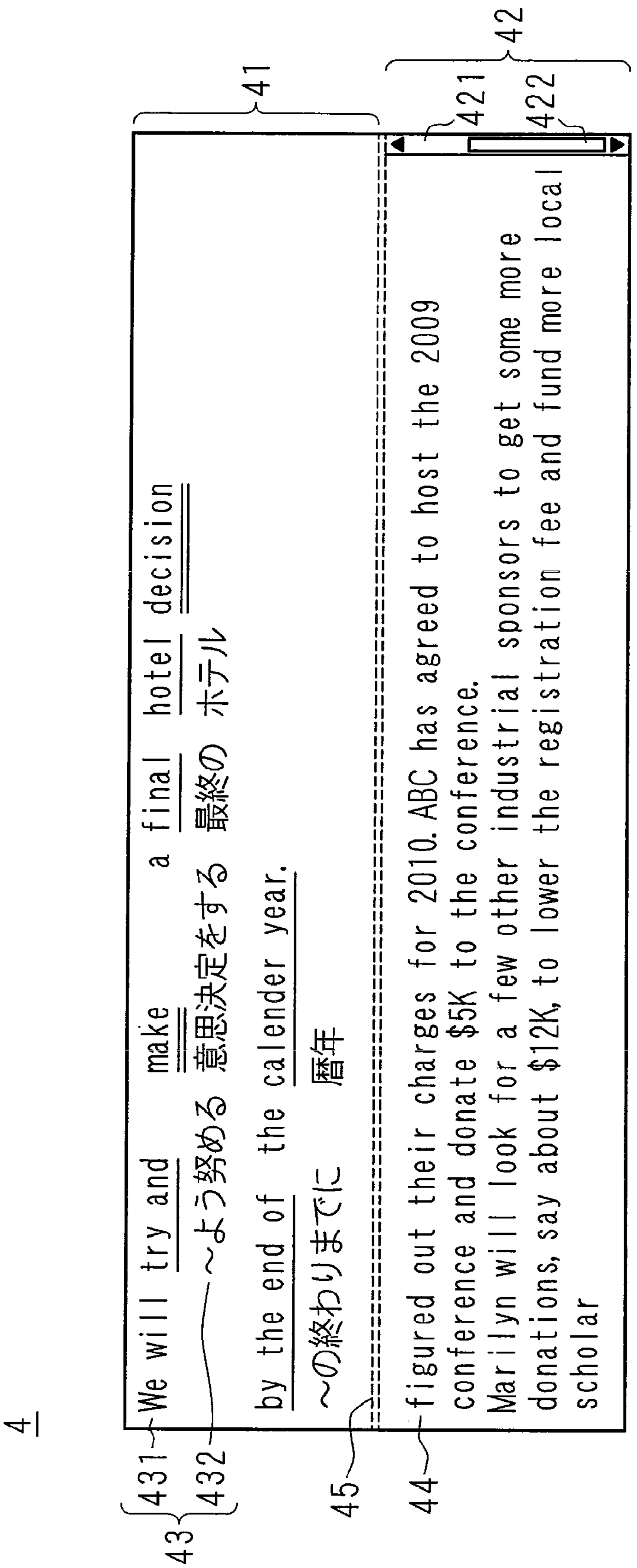
FIG. 10 is a schematic diagram illustrating another example of the parallel subtitle and the original subtitle displayed in the subtitle display area in the conference system of Embodiment 1 of the invention.

FIG. 10 is a schematic diagram illustrating another example of the parallel subtitle 43 and the original subtitle 44 displayed in the subtitle display area 4. Although the subtitle display area 4 of FIG. 10 corresponds to the subtitle display area 4 of FIG. 6, the omission symbol 45, and a scroll bar 421 and a scroll box 422 described later are additionally displayed.

For the listeners Pb and Pc visually checking the original area 42, the original included in the original subtitle 44 is automatically scrolled up from the head portion to the end portion, and after a while, the head portion of the original is automatically pushed out of the original area 42 (namely, automatically scrolled out). Furthermore, for the listeners Pb and Pc, at the same time as the original is scrolled out, the omission symbol 45 is displayed between the parallel area 41 and the original area 42 so as to partition these areas.

In Embodiment 1, when the listener Pb or Pc manually scrolls the original subtitle 44, an erased portion of the original included in the original subtitle 44 is displayed with a displayed portion erased instead. For this purpose, the scroll bar 421 and the scroll box 422 to be used for manually scrolling the original subtitle 44 are displayed in the original area 42 together with the omission symbol 45.

In this case, since the listener Pb or Pc can display an arbitrary portion of the original subtitle 44 by operating the scroll box 422 by using the operation sections 21 through 23, the convenience for the listeners Pb or Pc is improved.

The volume of the original 431 and the translation 432 included in the parallel subtitle 43 is so small that they can be wholly displayed in the parallel area 41 in the exemplary case illustrated in FIG. 6. In the case where new translation data is delivered from the central unit 3, however, the volume of the original and the translation included in the parallel subtitle 43 may become too large to display in the parallel area 41.

In such a case, portions at the head of the original and the translation included in the parallel subtitle 43 are automatically successively erased and portions at the end of the original and the translation included in the parallel subtitle 43 are automatically successively scrolled up in the parallel area 41.

Therefore, for the listeners Pb and Pc visually checking the parallel area 41, the original and the translation included in the parallel subtitle 43 are automatically scrolled up from their head portions to their end portions, and after a while, the head portions of the original and the translation are automatically scrolled out.

At this point, erased portions of the original and the translation may be never displayed again, or the erased portions of the original and the translation included in the parallel subtitle 43 may be displayed with displayed portions erased instead through manual scroll of the parallel subtitle 43 by the listener Pb or Pc.

Figure 11:
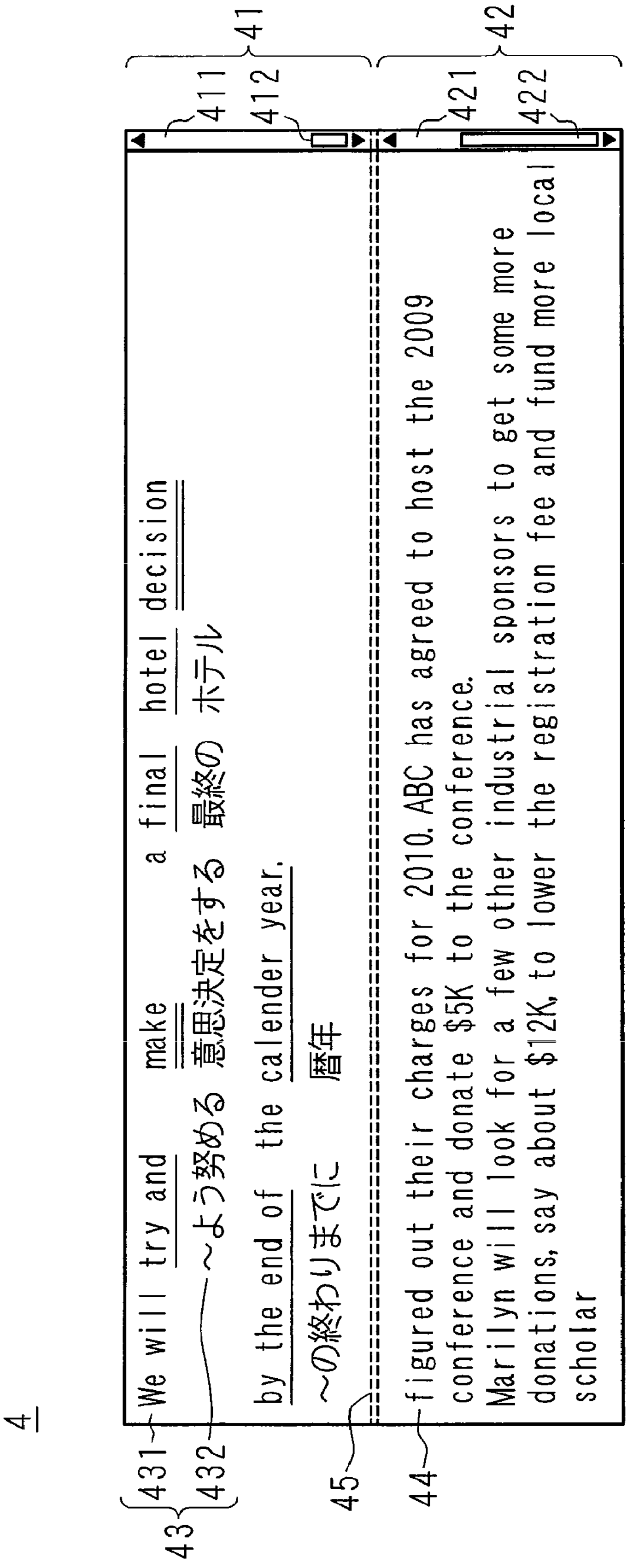
FIG. 11 is a schematic diagram illustrating still another example of the parallel subtitle and the original subtitle displayed in the subtitle display area in the conference system of Embodiment 1 of the invention.

FIG. 11 is a schematic diagram illustrating still another example of the parallel subtitle 43 and the original subtitle 44 displayed in the subtitle display area 4. Although the subtitle display area 4 of FIG. 11 corresponds to the subtitle display area 4 of FIG. 10, a scroll bar 411 and a scroll box 412 for manually scrolling the parallel subtitle 43 are additionally displayed in the parallel area 41.

In this case, the listener Pb or Pc can operate the scroll box 412 by using the operation sections 21 through 23 so as to display an arbitrary portion of the parallel subtitle 43 in the parallel area 41. As a result, the listener Pb or Pc can arbitrarily read a missed portion of the original or a portion of the translation desired to read again, and thus, the convenience for the listeners Pb and Pc is improved.

Incidentally, the vertical length of each of the parallel area 41 and the original area 42 may be variable in accordance with the volume of the original and the translation included in the parallel subtitle 43 and the volume of the original included in the original subtitle 44. In this case, for example, the parallel area 41 of FIG. 6 has a smaller empty space and the original area 42 has a larger empty space, and hence, the vertical length of the parallel area 41 is increased and the vertical length of the original area 42 is reduced accordingly.

Figure 12:
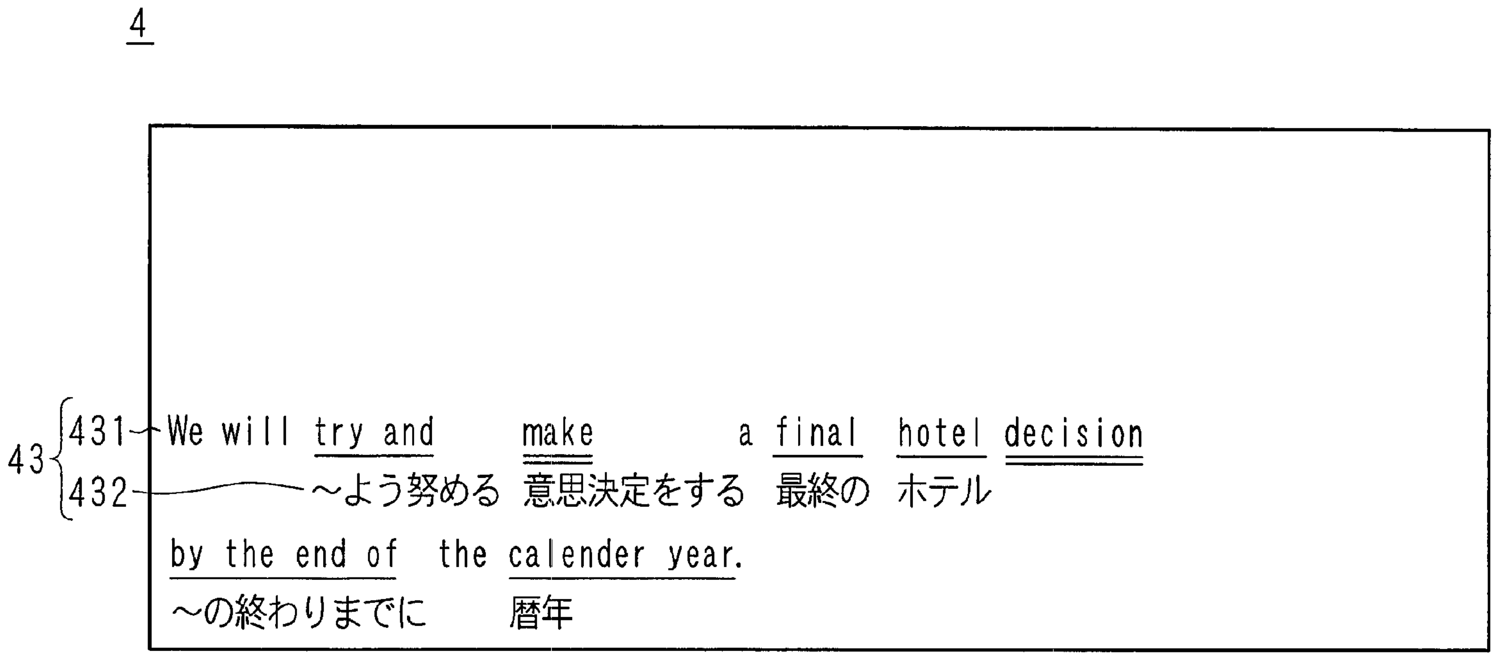
FIG. 12 is a schematic diagram illustrating an example of the parallel subtitle displayed in the subtitle display area in the conference system of Embodiment 1 of the invention.

FIG. 12 is a schematic diagram illustrating an example of the parallel subtitle 43 displayed in the subtitle display area 4.

Although the subtitle display area 4 includes the parallel area 41 and the original area 42 in the exemplary cases of FIGS. 5, 6, 10 and 11, the subtitle display area 4 of FIG. 12 is not provided with an area corresponding to the original area 42 but the subtitle display area 4 wholly corresponds to the parallel area 41.

Therefore, in the subtitle display area 4 of FIG. 12, the parallel subtitle 43 is scrolled for display, but the original subtitle 44 is not displayed at all. In other words, in this subtitle display area 4, merely original already translated is displayed but untranslated original is not displayed.

Accordingly, the parallel subtitle 43 alone can occupy the subtitle display area 4.

It is noted that a translation subtitle in which the original and the translation are simply arranged may be displayed in the subtitle display area 4 instead of the parallel subtitle 43.

In the following description, the case where the parallel subtitle 43 and the original subtitle 44 are automatically scrolled for display will be described, and the description of manual scroll will be omitted.

Smooth scroll display (hereinafter simply referred to as the scroll display) is performed on the parallel subtitle 43 and the original subtitle 44.

The scroll speed of the original subtitle 44 is set to such a speed that a space corresponding to one line is generated under one given line after displaying the given line (for example, the first line) and before displaying a next line (for example, the second line).

On the other hand, the scroll speed of the parallel subtitle 43 is set to such a speed that a space corresponding to two lines is generated under one given pair of lines after displaying the given pair of lines (for example, the first and second lines) and before displaying a next pair of lines (for example, the third and fourth lines). This is because two lines of original and translation displayed in parallel to the original are paired in the parallel subtitle 43.

Such a scroll speed of the original subtitle 44 depends upon the volume of the original included in the original data and the frequency of receiving the original data. In the case where the volume of the original included in the original data is large or the frequency of receiving the original data is high (hereinafter referred to as the case where an original acquisition speed is high), the scroll speed is set to be high. On the contrary, in the case where the original acquisition speed is low, the scroll speed is set to be low. However, the setting of the scroll speed is changed as smoothly as possible in consideration of readability of an original scrolled for display.

Similarly, the scroll speed of the parallel subtitle 43 depends upon the volume of the original and the translation included in translation data and the frequency of receiving the translation data. In the case where the volume of the original and the translation included in the translation data is large or the frequency of receiving the translation data is high (hereinafter referred to as the case where a translation acquisition speed is high), the scroll speed is set to be high. On the contrary, in the case where the translation acquisition speed is low, the scroll speed is set to be low. However, the setting of the scroll speed is changed as smoothly as possible in consideration of readability of an original and a translation scrolled for display.

Figure 13:
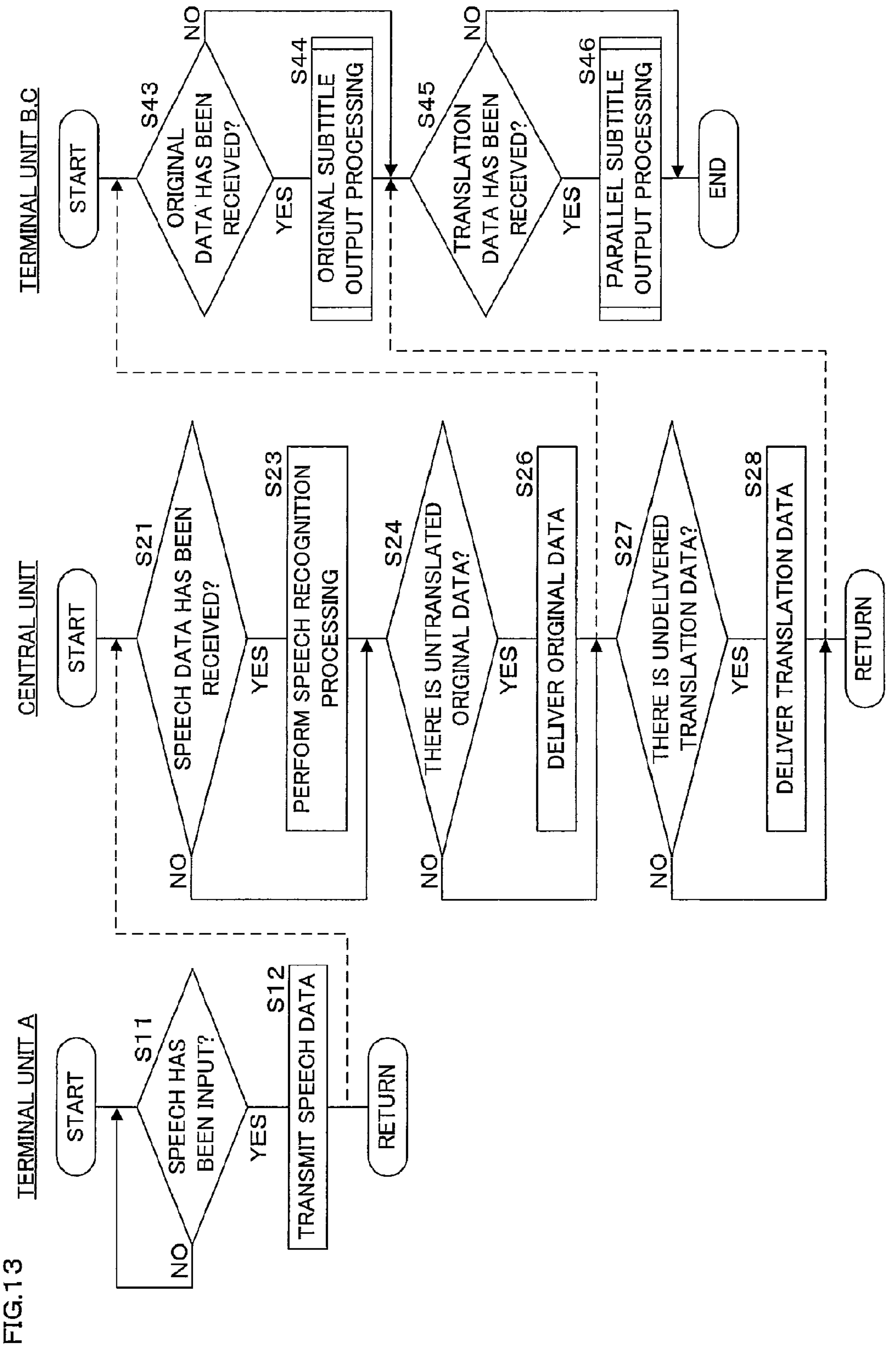
FIG. 13 is a flowchart illustrating procedures in speech transmission processing, data delivery processing and subtitle display processing executed in the conference system of Embodiment 1 of the invention.

FIG. 13 is a flowchart illustrating procedures in speech transmission processing, data delivery processing and subtitle display processing executed in the conference system 6. FIG. 13 illustrates procedures selected from the data delivery processing illustrated in FIG. 14 and the subtitle display processing illustrated in FIGS. 15 and 16.

Figure 14:
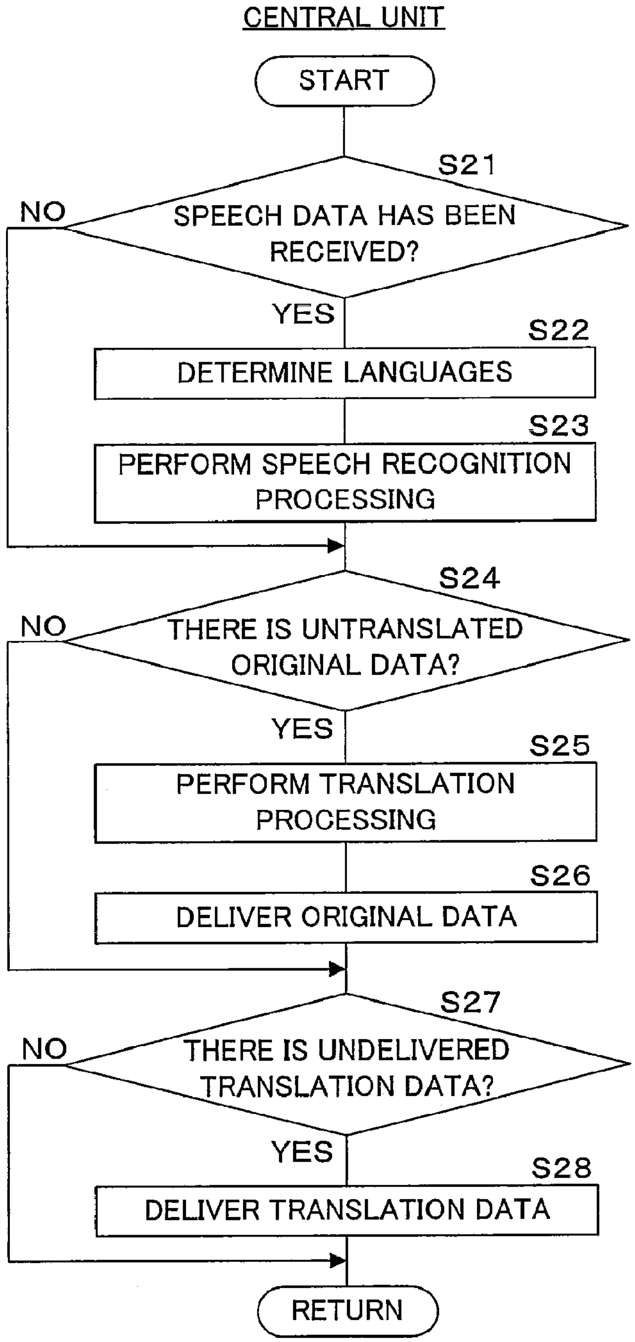
FIG. 14 is a flowchart illustrating procedures in the data delivery processing executed by the central unit included in the conference system of Embodiment 1 of the invention.
Figure 15:
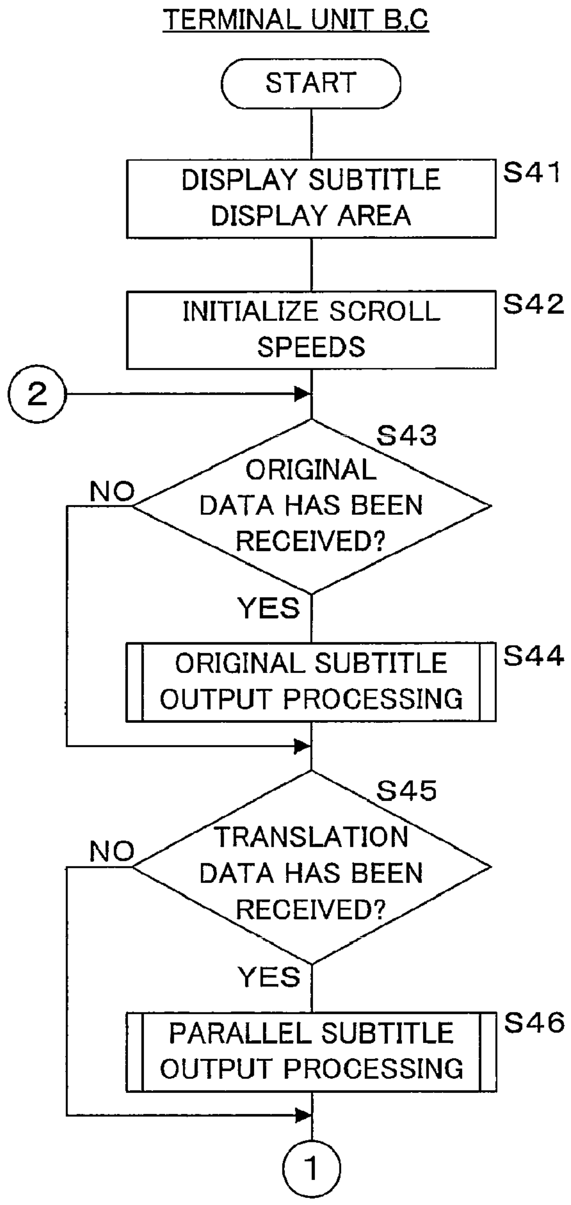
FIG. 15 is a flowchart illustrating procedures in the subtitle display processing executed by each of terminal units included in the conference system of Embodiment 1 of the invention.
Figure 16:
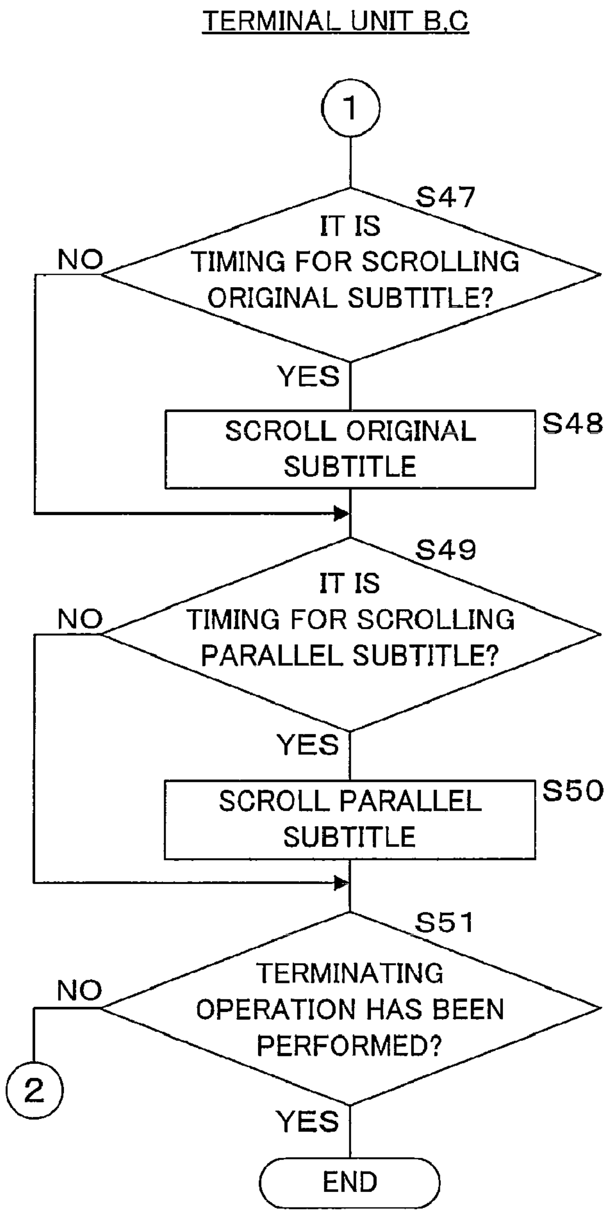
FIG. 16 is a flowchart illustrating procedures in the subtitle display processing executed by each of terminal units included in the conference system of Embodiment 1 of the invention.

FIG. 14 is a flowchart illustrating procedures in the data delivery processing executed by the central unit 3. FIGS. 15 and 16 are flowcharts illustrating procedures in the subtitle display processing executed by each of the terminal units B1 and C1.

The speech transmission processing of FIG. 13 is executed by the terminal unit A1.

The control section 11 of the terminal unit A1 determines whether or not the speaker Pa has input speech to the microphone 27 (S11), and when the speech has not been input yet (i.e., when NO in S11), the procedure of S11 is repeatedly executed. In S11, the control section 11 determines whether or not, for example, the input speech processing section 17 has output speech data, and when the speech data has been output (or has not been output), the control section 11 determines that the speaker Pa has input (or has not input) speech.

When the speaker Pa has input speech (i.e., when YES in S11), the control section 11 transmits speech data corresponding to the speech of the speaker Pa to the central unit 3 together with the terminal identification data of the terminal unit A1 (S12).

After the procedure of S12, the control section 11 returns the processing to S11.

The data delivery processing illustrated in FIGS. 13 and 14 is executed by the central unit 3.

The control section 31 of the central unit 3 determines whether or not speech data has been received together with the terminal identification data from any of the terminal units 1, 1 . . . (S21).

When the speech data has not been received (i.e., when NO in S21), the control section 31 proceeds the processing to S24 described later.

When the speech data has been received (i.e., when YES in S21), the control section 31 determines a language for original and a language for translation by referring to the language registration table 3T (S22). Next, the control section 31 performs the speech recognition processing on the speech data received in S21 on the basis of the determination result for the language for original determined in S22 (S23). In S23, the control section 31 functions as the speech recognition engine 311.

The control section 31 proceeds the processing to S24 while executing the speech recognition processing of S23 as multitasking.

The control section 31 determines whether or not there is original data not subjected to the translation processing yet (hereinafter simply referred to as untranslated original data) (S24), and when there is no untranslated original data (i.e., when NO in S24), the control section 31 proceeds the processing to S27 described later.

When there is untranslated original data (i.e., YES in S24), namely, when the result of the speech recognition processing has been obtained but the obtained result has not been translated yet, the control section 31 performs the translation processing on the untranslated original data (S25). In S25, the control section 31 functions as the translation engine 312.

The control section 31 proceeds the processing to S26 while executing the translation processing of S25 as multitasking.

The control section 31 delivers the original data having been subjected to the translation processing in S25 to the terminal units 1, 1 . . . (S26), and subsequently proceeds the processing to S27 described later. At this point, the control section 31 stores the original data having been subjected to the translation processing in the HDD 32 as original data of translated original or erases the original data.

The control section 31 determines whether or not there is undelivered translation data (S27), and when there is no undelivered translation data (i.e., when NO in S27), it returns the processing to S21.

When there is undelivered translation data (i.e., when YES in S27), the control section 31 delivers the undelivered translation data to the terminal units 1, 1 . . . (S28), and subsequently returns the processing to S21. At this point, the control section 31 stores the delivered translation data in the HDD 32 as delivered translation data or erases the delivered translation data. Assuming that the determination result for the language for translation determined in S22 is Japanese, the terminal units 1, 1 . . . to which the translation data should be delivered in the procedure of S28 are the terminal units B1 and C1.

In S26 and S28, the control section 31 functions as a delivery section in embodiments of the invention.

The subtitle display processing illustrated in FIGS. 13, 15 and 16 is executed by each of the terminal units B1 and C1.

As illustrated in FIG. 15, the control section 11 of each of the terminal units B1 and C1 displays the subtitle display area 4 on the display 24 (S41). When the procedure of S41 is executed, none of the parallel subtitle 43 and the original subtitle 44 is displayed in the subtitle display area 4.

Furthermore, the control section 11 initializes the scroll speed for the parallel area 41 and the scroll speed for the original area 42 to “0” (S42) and proceeds the processing to S43.

As illustrated in FIGS. 13 and 15, the control section 11 determines whether or not original data has been received (S43), and when the original data has not been received (i.e., when NO in S43), the control section 11 proceeds the processing to S45 described later.

When the original data has been received (i.e., when YES in S43), the control section 11 executes original subtitle output processing (see FIG. 17) described later (S44).

The control section 11 proceeds the processing to S45 described later while executing the original subtitle output processing of S44 as multitasking.

Figure 17:
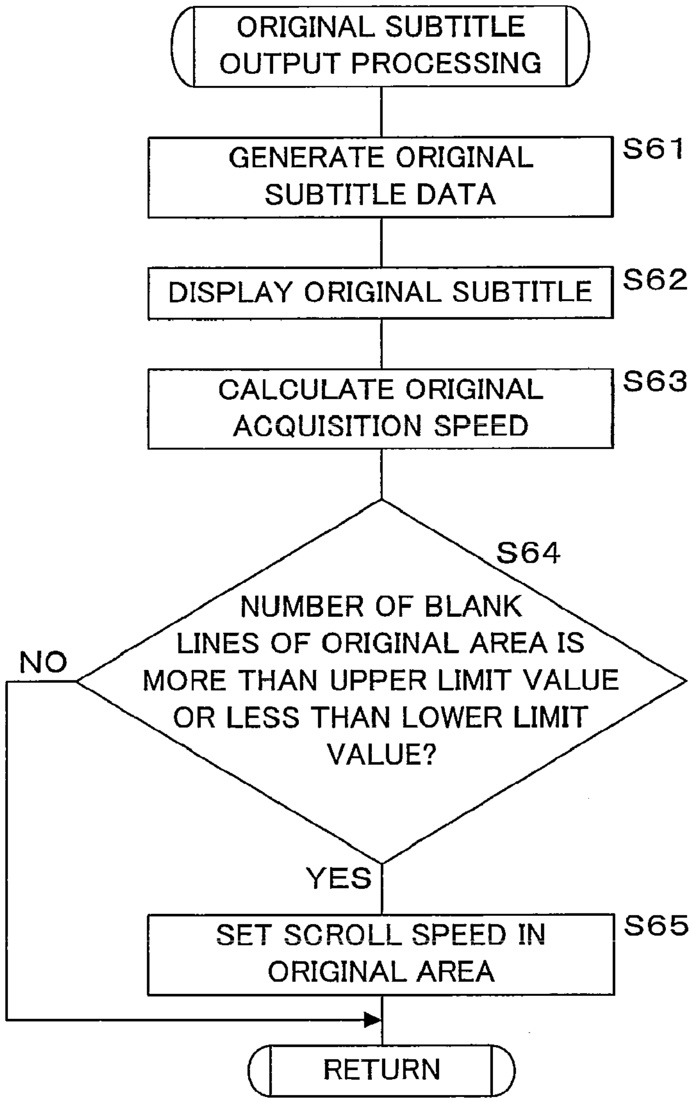
FIG. 17 is a flowchart illustrating detailed procedures in original subtitle output processing executed by each terminal unit included in the conference system of Embodiment 1 of the invention.

FIG. 17 is a flowchart illustrating detailed procedures in the original subtitle output processing executed by each terminal unit 1.

The control section 11 generates original subtitle data on the basis of the original data received in S43 (S61). Next, the control section 11 displays the original subtitle 44 in the original area 42 on the basis of the original subtitle data generated in S61 (S62). In S61 and S62, the control section 11 functions as the subtitle generation engine 111.

Furthermore, the control section 11 calculates an original acquisition speed (S63).

Next, the control section 11 determines whether the number of blank lines of the original area 42 is more than an upper limit value (of, for example, 2 lines) or less than a lower limit value (of, for example, 1 line) (S64). At this point, the blank line of the original area 42 means a blank line generated under the lowermost line of the original subtitle 44 when the original subtitle 44 displayed in the original area 42 is scrolled up.

When the number of blank lines of the original area 42 exceeds the lower limit value and is less than the upper limit value (namely, when it is, for example, 1.5 lines) (i.e., when NO in S64), the control section 11 completes the original subtitle output processing with the current scroll speed kept and returns the processing to the pristine subtitle display processing.

When the number of blank lines of the original area 42 is more than the upper limit value or less than the lower limit value (i.e., when YES in S64), the control section 11 sets a scroll speed on the basis of the current scroll speed and the number of blank lines of the original area 42 (S65).

Specifically, when the number of blank lines of the original area 42 is less than the lower limit value, the control section 11 increases the scroll speed in S65. At this point, the control section 11 sets the scroll speed to be continuously changed from the current scroll speed. For example, assuming that the current scroll speed is “0”, the control section 11 changes a scroll speed to a speed corresponding to 1 dot per unit time, a speed corresponding to 2 dots per unit time, etc., so as to be gradually increased in the future. In this case, the ultimate scroll speed is set to a speed at which one or a little over one blank line may be generated at timing when one line of the original included in the original subtitle 44 is completely drawn in the original area 42.

On the other hand, when the number of blank lines of the original area 42 is more than the upper limit value, the control section 11 reduces the scroll speed in S65. At this point, the control section 11 sets the scroll speed to be continuously changed from the current scroll speed (namely, so as to gradually reduce the scroll speed in the future). When the current scroll speed is “0”, however, the current scroll speed is kept in S65.

After completing the procedure of S65, the control section 11 completes the original subtitle output processing and returns the processing to the pristine subtitle display processing.

As illustrated in FIGS. 13 and 15, the control section 11 determines whether or not translation data has been received (S45), and when translation data has not been received (i.e., when NO in S45), the control section 11 proceeds the processing to S47 described later.

When translation data has been received (i.e., when YES in S45), the control section 11 executes parallel subtitle output processing (see FIG. 18) described later (S46).

The control section 11 proceeds the processing to S47 described later while executing the parallel subtitle output processing of S46 as multitasking.

Figure 18:
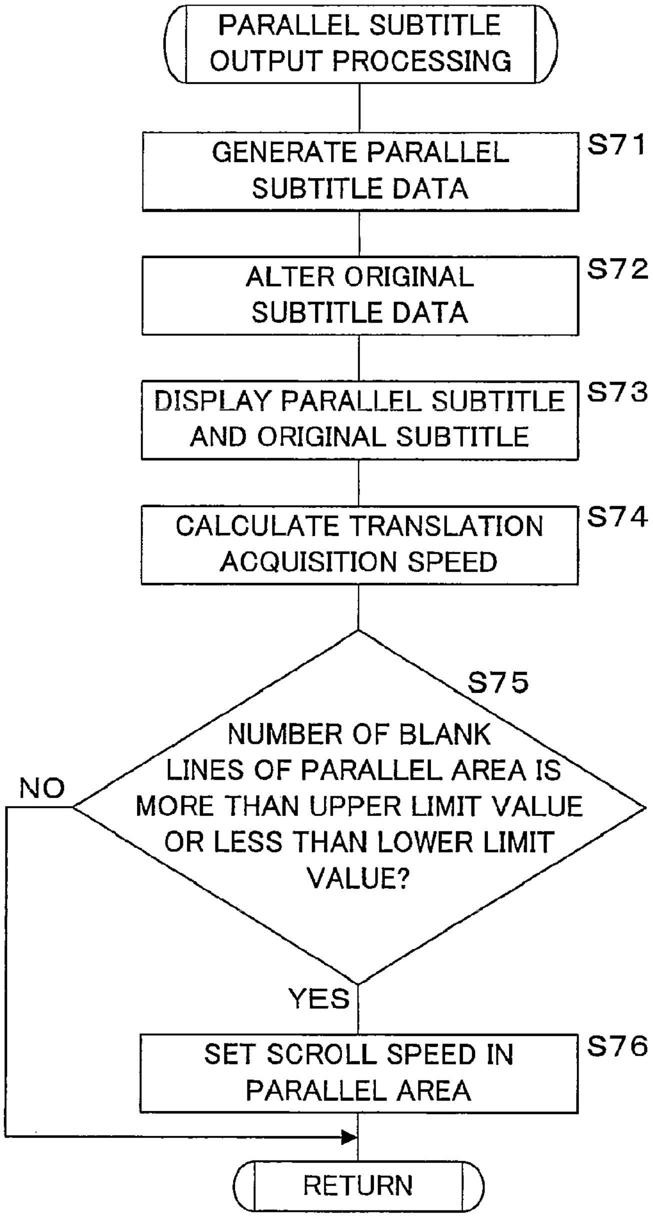
FIG. 18 is a flowchart illustrating detailed procedures in parallel subtitle output processing executed by each terminal unit included in the conference system of Embodiment 1 of the invention.

FIG. 18 is a flowchart illustrating detailed procedures in the parallel subtitle output processing executed by each terminal unit 1.

The control section 11 generates parallel subtitle data on the basis of the translation data received in S45 (S71). Next, the control section 11 alters the original subtitle data generated in S61 for erasing a redundant original on the basis of the translation data received in S45 (S72). The control section 11 displays the parallel subtitle 43 in the parallel area 41 and the original subtitle 44 in the original area 42 on the basis of the parallel subtitle data generated in S71 and the original subtitle data altered in S72 (S73). In S71 through S73, the control section 11 functions as the subtitle generation engine 111.

In the case where the whole original scrolled out through the procedure of S48 described later is erased as a result of the procedure of S72, the control section 11 erases the omission symbol 45, the scroll bar 421 and the scroll box 422 from the original area 42 in S73.

Furthermore, the control section 11 calculates a translation acquisition speed (S74).

Next, the control section 11 determines whether the number of blank lines of the parallel area 41 is more than an upper limit value (of, for example, 4 lines) or less than a lower limit value (of, for example, 2 lines) (S75). At this point, a blank line of the parallel area 41 means a blank line generated under the lowermost line of the parallel subtitle 43 when the parallel subtitle 43 displayed in the parallel area 41 is scrolled up.

When the number of blank lines of the parallel area 41 exceeds the lower limit value and is less than the upper limit value (namely, when it is, for example, 3 lines) (i.e., when NO in S75), the control section 11 completes the parallel subtitle output processing with the current scroll speed kept and returns the processing to the pristine subtitle display processing.

When the number of blank lines of the parallel area 41 is more than the upper limit value or less than the lower limit value (i.e., when YES in S75), the control section 11 sets a scroll speed on the basis of the current scroll speed and the number of blank lines of the parallel area 41 (S76).

When the number of blank lines of the parallel area 41 is less than the lower limit value, the control section 11 increases the scroll speed in S76. At this point, the control section 11 sets the scroll speed to be continuously changed from the current scroll speed. For example, assuming that the current scroll speed is "0", the control section 11 changes a scroll speed to a speed corresponding to 1 dot per unit time, a speed corresponding to 2 dots per unit time, etc., so as to be gradually increased in the future. In this case, the ultimate scroll speed is set to a speed at which two or a little over two blank lines may be generated at timing when one line of the translation included in the parallel subtitle 43 is completely drawn in the parallel area 41.

On the other hand, when the number of blank lines of the parallel area 41 is more than the upper limit value, the control section 11 reduces the scroll speed in S76. At this point, the control section 11 sets the scroll speed to be continuously changed from the current scroll speed (namely, so as to be gradually reduced in the future). When the current scroll speed is "0", however, the current scroll speed is kept also in S76.

After completing the procedure of S76, the control section 11 completes the parallel subtitle output processing and returns the processing to the pristine subtitle display processing.

As illustrated in FIG. 16, the control section 11 determines whether or not it is timing for scrolling the original subtitle 44 (S47), and when it is timing for scrolling the original subtitle 44 (i.e., when YES in S47), the control section 11 scrolls the original subtitle 44 at the scroll speed for the original area 42 (S48). If the original included in the original subtitle 44 is scrolled out as a result of the procedure of S48, the control section 11 displays the omission symbol 45, the scroll bar 421 and the scroll box 422 in the original area 42.

After completing the procedure of S48, or when it is not timing for scrolling the original subtitle 44 (i.e., when NO in S47), the control section 11 determines whether or not it is timing for scrolling the parallel subtitle 43 (S49), and when it is timing for scrolling the parallel subtitle 43 (i.e., when YES in S49), the control section 11 scrolls the parallel subtitle 43 at the scroll speed for the parallel area 41 (S50).

After completing the procedure of S50 or when it is not timing for scrolling the parallel subtitle 43 (i.e., when NO in S49), the control section 11 determines whether or not an operation for terminating the display of the subtitle display screen 241 (hereinafter referred to as the terminating operation) has been performed by using the operation sections 21 through 23 (S51).

When the terminating operation has not been performed (i.e., when NO in S51), the control section 11 returns the processing to S43.

When the terminating operation has been performed (i.e., when YES in S51), the control section 11 terminates the subtitle display processing.

When the aforementioned conference system 6 is used, the contents of speech given by the speaker Pa in English can be read in Japanese and easily and accurately understood by the listeners Pb and Pc.

Furthermore, since Japanese expressions are displayed in parallel to English words or phrases, mistranslation can be easily found.

In addition, the parallel subtitle 43 and the original subtitle 44 are individually displayed in the parallel area 41 and the original area 42. The parallel subtitle 43 and the original subtitle 44 are automatically individually scrolled for display. Therefore, it is easy for the listeners Pb and Pc to read the contents of the parallel subtitle 43 and the original subtitle 44. Furthermore, the scroll speeds for the parallel subtitle 43 and the original subtitle 44 are appropriately set respectively in accordance with the original acquisition speed and the translation acquisition speed. The scroll speeds are smoothly changed. Therefore, degradation in readability derived from a too high or too low scroll speed or abrupt change of the scroll speed can be suppressed.

Moreover, since the original included in the parallel subtitle 43 and the original included in the original subtitle 44 are not redundant, the subtitle display area 4 can be efficiently used. In addition, there is no possibility that the listeners Pb and Pc are compelled to make an unnecessary effort to repeatedly read the same original.

Embodiment 2

The hardware structure of a conference system 6 according to Embodiment 2 is the same as the hardware structure of the conference system 6 of Embodiment 1. Therefore, like reference numerals are used to refer to like elements described in Embodiment 1 so as to omit the description.

In order to smoothly advance a conference, it is preferred that the original subtitle 44 as illustrated in FIG. 5 of Embodiment 1 is rapidly displayed after the speaker Pa gives speech with the parallel subtitle 43 as illustrated in FIG. 6 rapidly displayed thereafter.

When the accuracy in the speech recognition is low, however, the original subtitle 44 and the parallel subtitle 43 thus displayed may be mistaken. Still, it generally takes a long time to perform the speech recognition with high accuracy.

Accordingly, in the conference system 6 of Embodiment 2, the original subtitle is displayed by recognizing speech given by the speaker Pa in a short time (namely, rapidly), and the parallel subtitle is displayed on the basis of the result of the rapid recognition. In parallel to such rapid processing of speech recognition, translation and display (hereinafter together referred to as the high speed processing), the conference system 6 corrects a mistake of the original subtitle already displayed by recognizing the speech with high accuracy, so as to correct a mistake of the parallel subtitle already displayed on the basis of the result of the high accuracy recognition. Such accurate processing of speech recognition, translation and correction is hereinafter together referred to as the high accuracy processing.

Figure 19:
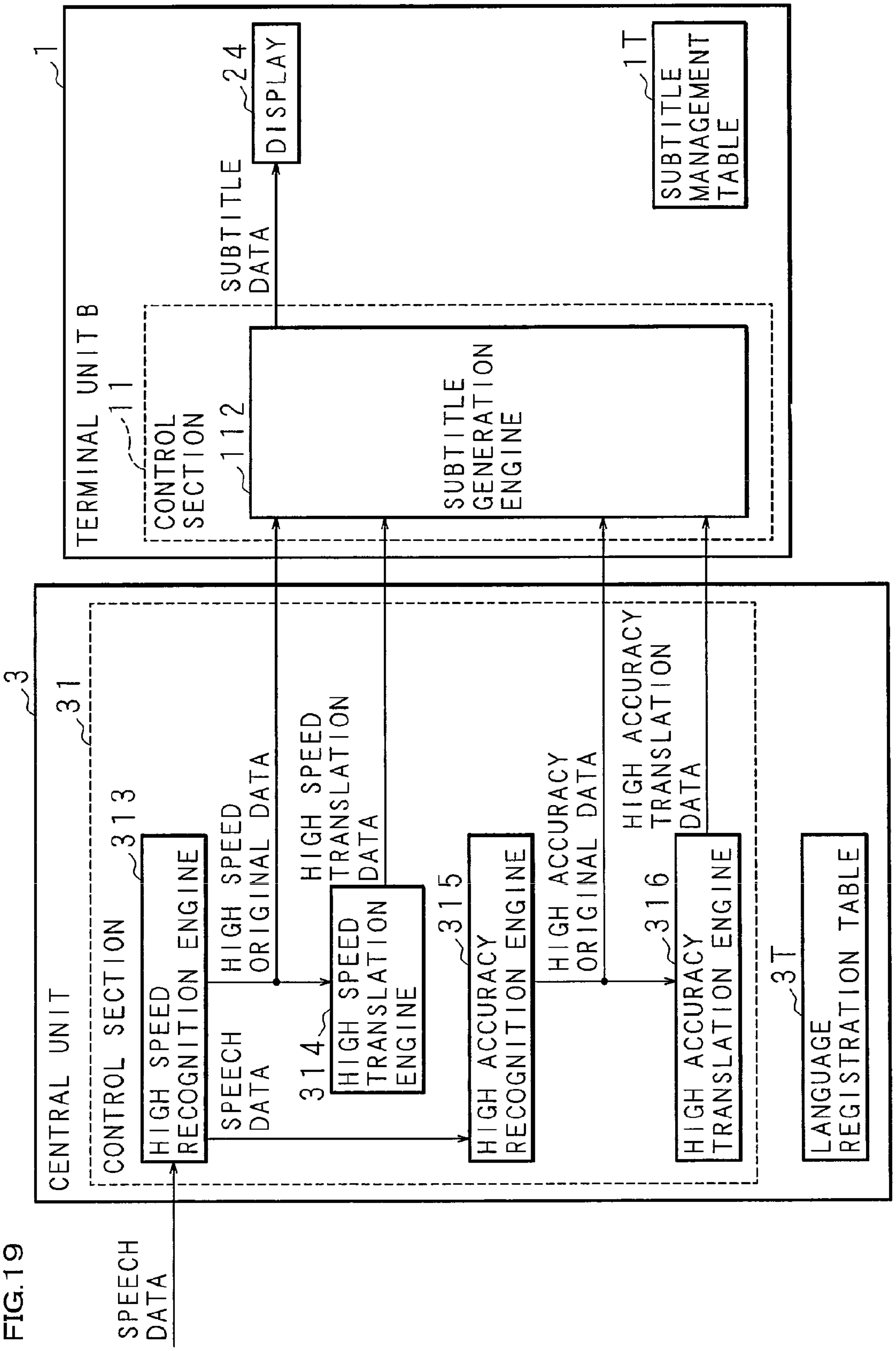
FIG. 19 is a functional block diagram for explaining a mechanism of high speed processing and high accuracy processing performed in a conference system of Embodiment 2 of the invention.

FIG. 19 is a functional block diagram for explaining the mechanism of the high speed processing and the high accuracy processing performed in the conference system 6 of Embodiment 2 of the invention. FIG. 19 corresponds to FIG. 7 of Embodiment 1, and the terminal units A1 and C1 are omitted in FIG. 19.

The control section 31 of the central unit 3 functions as a high speed recognition engine 313 and a high accuracy recognition engine 315 in accordance with a computer program for speech recognition included in the central program 3P (see FIG. 3). Furthermore, the control section 31 functions as a high speed translation engine 314 and a high accuracy translation engine 316 in accordance with a computer program for translation included in the central program 3P.

The high speed recognition engine 313 immediately executes first speech recognition processing on speech data received from the terminal unit A1, so as to rapidly generate original data corresponding to the recognition result. Such a high speed recognition engine 313 functions as a recognition section in this embodiment of the invention. The original data generated by the high speed recognition engine 313 is hereinafter designated as the high speed original data.

The high speed recognition engine 313 delivers the generated high speed original data to the terminal units B1 and C1.

In the high speed recognition engine 313, the first speech recognition processing is immediately executed. Therefore, the speech data to be subjected to the speech recognition processing by the high speed recognition engine 313 is speech data corresponding to speech of, for example, several seconds through ten-odd seconds, namely, speech data with a small data amount. Accordingly, although the accuracy in the speech recognition is low, the speech recognition result can be obtained in a short time. There is a possibility that the original corresponding to the high speed original data (hereinafter referred to as the high speed original) may be different from the actual contents of the speech.

The speech data having been recognized by the high speed recognition engine 313 is stored in the HDD 32 (see FIG. 3).

The high speed translation engine 314 performs translation processing on the high speed original data generated by the high speed recognition engine 313, so as to generate translation data corresponding to the translation result. Such a high speed translation engine 314 functions as a translation section in this embodiment of the invention. The translation data generated by the high speed translation engine 314 is hereinafter designated as the high speed translation data.

The high speed translation engine 314 delivers the generated high speed translation data to the terminal units B1 and C1.

The high speed translation data is obtained on the basis of the high speed original data with the low accuracy in the speech recognition, and hence, there is a high possibility that the translation corresponding to the high speed translation data (hereinafter referred to as the high speed translation) may include a mistake.

The high accuracy recognition engine 315 performs second speech recognition processing on the speech data stored in the HDD 32, namely, the speech data having been subjected to the speech recognition by the high speed recognition engine 313, so as to generate original data corresponding to the recognition result. Such a high accuracy recognition engine 315 also functions as the recognition section in this embodiment of the invention. The original data generated by the high accuracy recognition engine 315 is hereinafter designated as the high accuracy original data.

The high accuracy recognition engine 315 delivers the generated high accuracy original data to the terminal units B1 and C1.

The high accuracy recognition engine 315 performs the speech recognition processing again on the speech data once stored. At this point, the speech data to be subjected to the speech recognition processing by the high accuracy recognition engine 315 is speech data corresponding to speech of, for example, several tens seconds through several minutes, namely, speech data with a large data amount. Accordingly, it takes a long time to obtain the speech recognition result but the accuracy in the speech recognition is high. There is a high possibility that the original corresponding to the high accuracy original data (hereinafter referred to as the high accuracy original) accords with the actual contents of the speech.

This is for the following reason: In the speech recognition, the accuracy of the recognition is higher in execution on speech data with a large data amount (for example, speech data corresponding to the whole of speech) than in execution on speech data with a small data amount (for example, speech data corresponding to a part of speech).

It is noted that the method for improving the accuracy in the speech recognition is not limited to the increase of the data amount of speech data.

The high accuracy translation engine 316 performs the translation processing on the high accuracy original data generated by the high accuracy recognition engine 315, so as to generate translation data corresponding to the translation result. The translation data generated by the high accuracy translation engine 316 is hereinafter designated as the high accuracy translation data.

The high accuracy translation engine 316 delivers the generated high accuracy translation data to the terminal units B1 and C1.

The high accuracy translation data is based on the high accuracy original data obtained with high accuracy in the speech recognition, and therefore, there is a small possibility that the translation corresponding to the high accuracy translation data (hereinafter referred to as the high accuracy translation) may include a mistake.

The speech recognition processing performed by the high speed recognition engine 313 and the high accuracy recognition engine 315 and the translation processing performed by the high speed translation engine 314 and the high accuracy translation engine 316 are executed as multitasking.

In Embodiment 2, the following case is exemplarily described: Although the speaker Pa said "We will try and make a final hotel decision by the end of the calendar year.", as a result of the speech recognition performed by the high speed recognition engine 313 on the basis of speech data corresponding to a part of the speech, "We will try and", high speed original data corresponding to a high speed original having a mistake of "We will try a" is generated.

When the original data corresponding to the original "We will try and" is subjected to the translation processing, the high speed translation engine 314 considers the two words "try and" as a phrase with any verb following "and", and hence translates the two words "try and" as "～よう努める".

When the high speed original data corresponding to the mistaken high speed original "We will try a" is subjected to the translation processing, however, the high speed translation engine 314 translates the verb "try" as "試す", and considers the indefinite article "a" as a word unnecessary to particularly translate and ignores the indefinite article "a".

Figure 20:
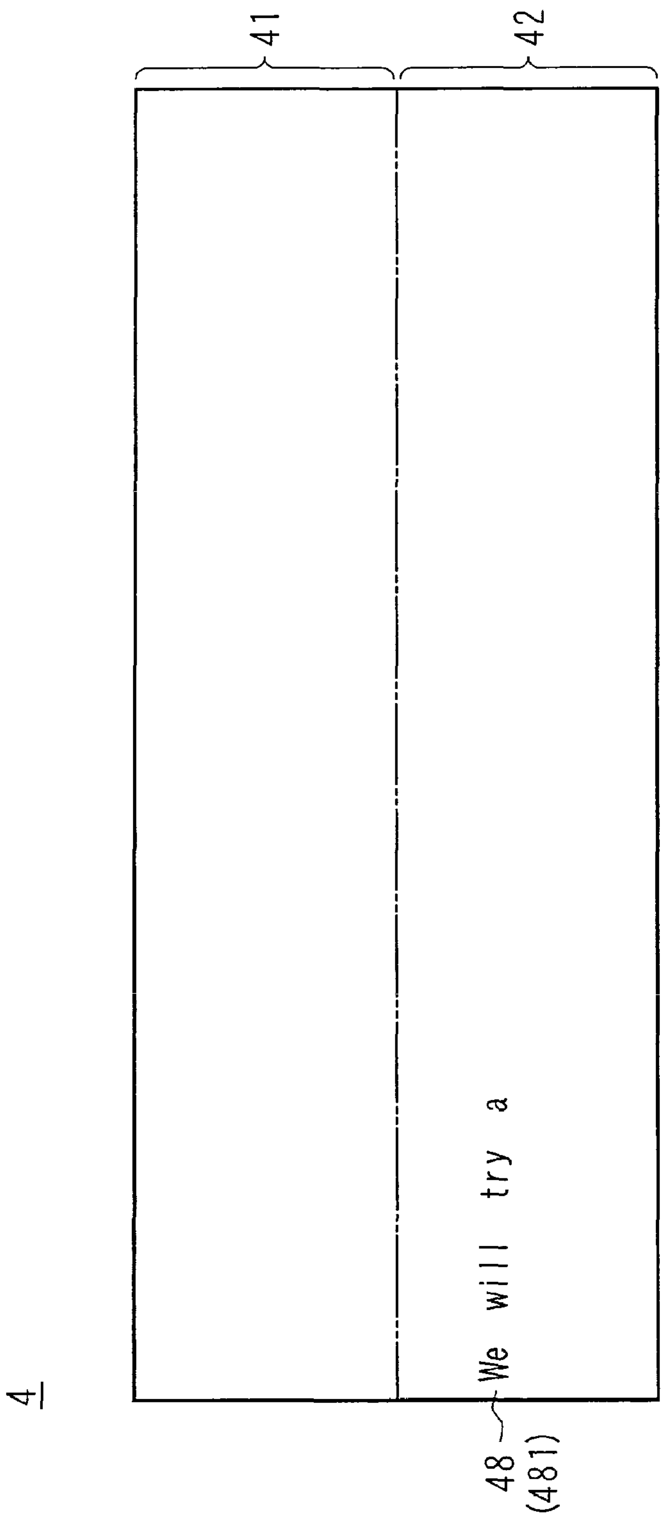
FIG. 20 is a schematic diagram illustrating an example of a high speed original subtitle displayed in a subtitle display area of a subtitle display screen in the conference system of Embodiment 2 of the invention.

FIG. 20 is a schematic diagram illustrating an example of a high speed original subtitle 48 displayed in the subtitle display area 4 of the subtitle display screen 241 (see FIG. 4) in the conference system 6. FIG. 20 exemplarily illustrates a case where the high speed original subtitle 48 including a mistaken high speed original 481 of "We will try a" is displayed in the original area 42 and nothing is displayed yet in the parallel area 41.

Figure 21:
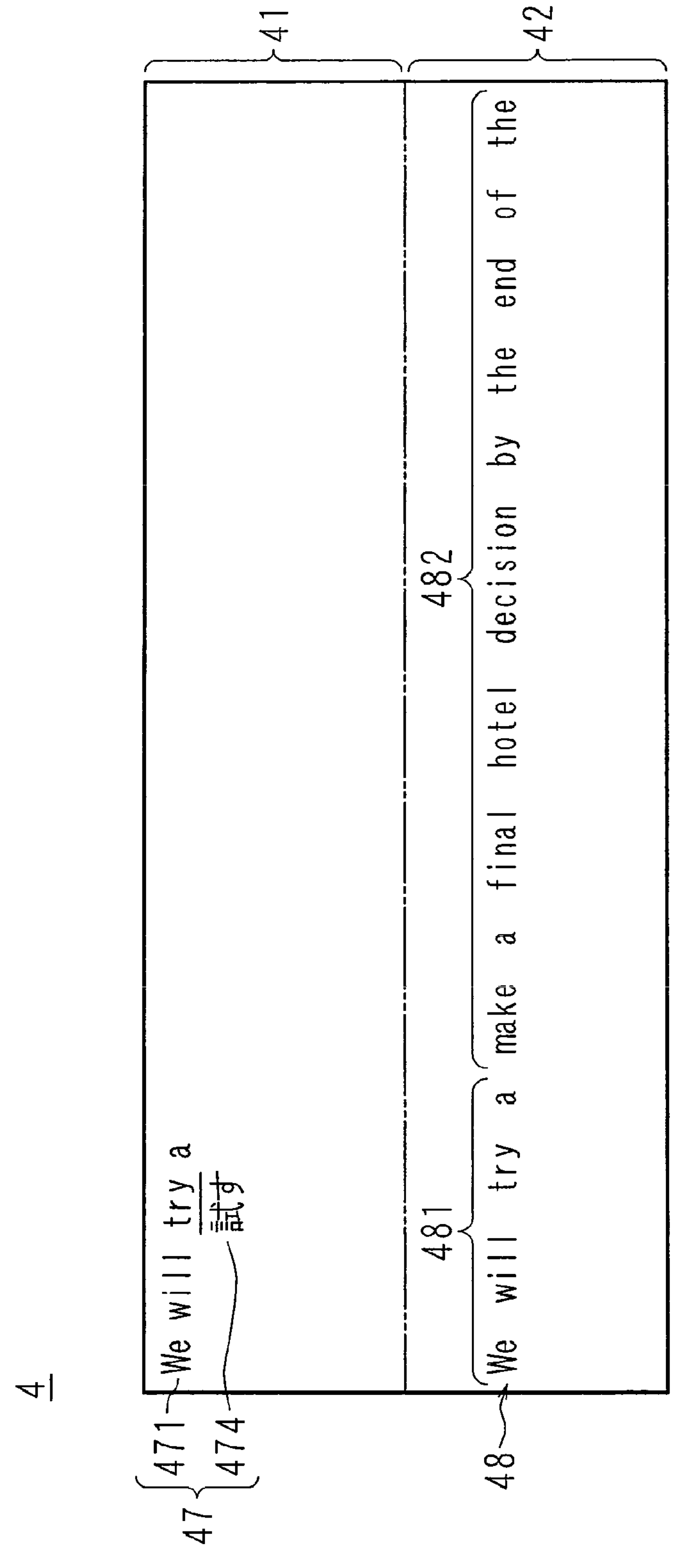
FIG. 21 is a schematic diagram illustrating an example of a high speed parallel subtitle and a high speed original subtitle displayed in the subtitle display area in the conference system of Embodiment 2 of the invention.

FIG. 21 is a schematic diagram illustrating an example of a high speed parallel subtitle 47 and the high speed original subtitle 48 displayed in the subtitle display area 4. As illustrated in FIG. 21, the high speed original subtitle 48 including the mistaken high speed original 481 and a correct high speed original 482 is displayed in the original area 42. Furthermore, the high speed parallel subtitle 47 including a high speed original 471 identical to the mistaken high speed original 481 and a mistaken high speed translation 474 corresponding to the mistaken high speed original 471 is displayed in the parallel area 41. In this manner, it is assumed in Embodiment 2 that the high speed original 481 is continuously displayed in the high speed original subtitle 48 although the high speed original 471 is displayed in the high speed parallel subtitle 47. Incidentally, in the same manner as in Embodiment 1, the high speed original 481 included in the high speed original subtitle 48 may be erased when the high speed original 471 is displayed in the high speed parallel subtitle 47.

Figure 22:
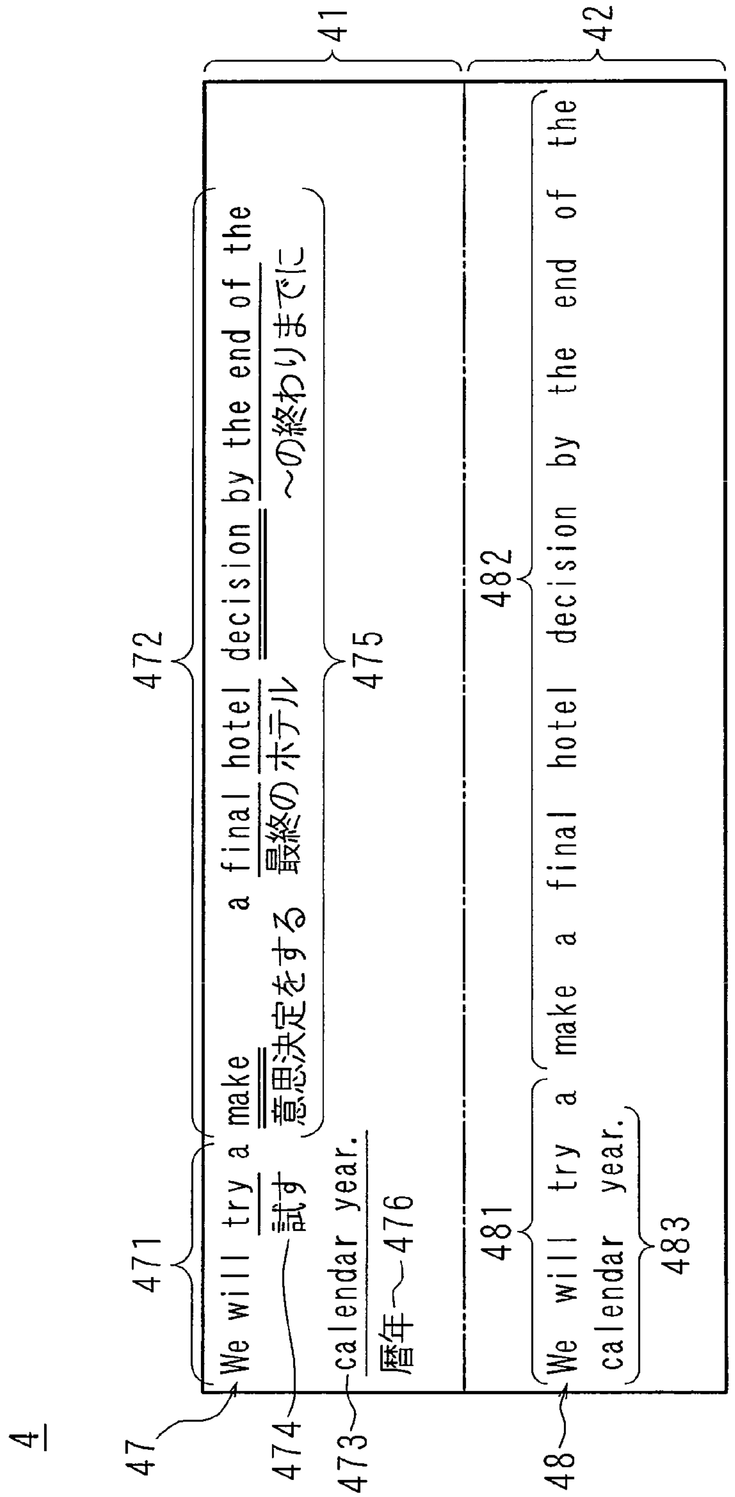
FIG. 22 is a schematic diagram illustrating another example of the high speed parallel subtitle and the high speed original subtitle displayed in the subtitle display area in the conference system of Embodiment 2 of the invention.

FIG. 22 is a schematic diagram illustrating another example of the high speed parallel subtitle 47 and the high speed original subtitle 48 displayed in the subtitle display area 4. As illustrated in FIG. 22, the high speed original subtitle 48 including the mistaken high speed original 481 and correct high speed originals 482 and 483 is displayed in the original area 42. Furthermore, the high speed parallel subtitle 47 including the high speed original 471, correct high speed originals 472 and 473 identical to the correct high speed originals 482 and 483, the high speed translation 474 and correct high speed translations 475 and 476 corresponding to the correct high speed originals 472 and 473 is displayed in the parallel area 41.

As illustrated in FIG. 19, the control section 11 of each of the terminal units B1 and C1 functions as a subtitle generation engine 112 in accordance with the terminal program 1P (see FIG. 2).

When high speed original data of the high speed original 481 is received, the subtitle generation engine 112 first registers the received high speed original data in the subtitle management table 1T (see FIG. 8).

Furthermore, on the basis of the received high speed original data, the subtitle generation engine 112 generates original subtitle data for displaying the high speed original subtitle 48 (see FIG. 20) including the high speed original 481 on the display 24.

The original subtitle data generated by the subtitle generation engine 112 at this point includes, however, at least two blank characters between adjacent English words so as to provide a margin between the English words included in the high speed original 481. Incidentally, the number of blank characters disposed between the words is not limited to two but may be three or more as far as the number of characters excluding the blank characters of the high speed original subtitle 48 displayable in the original area 42 is not largely reduced. Alternatively, the number of blank characters to be disposed between the words may be one.

Furthermore, the subtitle generation engine 112 gives the generated original subtitle data to the display processing section 14 (see FIG. 2), so as to display the high speed original subtitle 48 on the display 24. Then, the subtitle generation engine 112 registers the original subtitle data of the high speed original subtitle 48 including the high speed original 481 in the subtitle management table 1T.

Similarly, every time high speed original data is received, the subtitle generation engine 112 registers the received high speed original data in the subtitle management table 1T. Furthermore, the subtitle generation engine 112 generates original subtitle data for displaying the high speed original subtitle 48 (see FIG. 21) including the high speed originals 481 and 482 on the display 24 on the basis of the received high speed original data, and generates original subtitle data for displaying the high speed original subtitle 48 (see FIG. 22) including the high speed originals 481 through 483 on the display 24 on the basis of high speed original data received next. Moreover, the subtitle generation engine 112 gives the generated original subtitle data to the display processing section 14, so as to display the high speed original subtitle 48 on the display 24. Then, the subtitle generation engine 112 registers the original subtitle data of the high speed original subtitle 48 in the subtitle management table 1T.

When high speed translation data of the high speed translation 474 is received, the subtitle generation engine 112 registers the high speed translation data of the high speed translation 474 in the subtitle management table 1T.

Next, the subtitle generation engine 112 generates parallel subtitle data for displaying the high speed parallel subtitle 47 (see FIG. 21) including the high speed original 471 and the high speed translation 474 on the display 24 on the basis of the received high speed translation data.

The parallel subtitle data generated by the subtitle generation engine 112 at this point includes, however, a minimum number of (at least one) blank characters disposed between adjacent English words included in the high speed original 471. Incidentally, blank characters corresponding to two or more characters may be disposed for providing a margin between the English words as far as the number of characters excluding the blank characters of the high speed parallel subtitle 47 displayable in the parallel area 41 is not largely reduced.

Furthermore, the subtitle generation engine 112 gives the generated parallel subtitle data to the display processing section 14, so as to display the high speed parallel subtitle 47 on the display 24.

Then, the subtitle generation engine 112 registers the parallel subtitle data of the high speed parallel subtitle 47 including the high speed original 471 and the high speed translation 474 in the subtitle management table 1T (see FIGS. 9A and 9B).

Such a subtitle generation engine 112 functions as a generation section in this embodiment of the invention.

Similarly, every time high speed translation data is received, the subtitle generation engine 112 registers the received high speed translation data in the subtitle management table 1T.

Next, the subtitle generation engine 112 generates parallel subtitle data for displaying the high speed parallel subtitle 47 (see FIG. 22) including the high speed originals 471 through 473 and the high speed translations 474 through 476 on the display 24 on the basis of the received translation data.

Furthermore, the subtitle generation engine 112 gives the generated parallel subtitle data to the display processing section 14, so as to display the high speed original subtitle 48 on the display 24.

Then, the subtitle generation engine 112 registers, in the subtitle management table 1T, the parallel subtitle data of the high speed parallel subtitle 47 including the high speed originals 471 through 473 and the high speed translations 474 through 476.

In Embodiment 2, a case where the subtitle generation engine 112 receives high accuracy original data and high accuracy translation data after displaying the high speed parallel subtitle 47 and the high speed original subtitle 48 as illustrated in FIG. 22 will be exemplarily described.

It is assumed that high accuracy original data corresponding to the correct high accuracy original of "We will try and make a final hotel decision by the end of the calendar year." is generated as a result of the speech recognition of the high accuracy recognition engine 315 performed on the basis of speech data corresponding to the whole sentence of the speech given by the speaker Pa.

As a result of the translation processing performed on this high accuracy original data, the high accuracy translation engine 316 considers the two words "try and" as a phrase with a verb "make" following "and", and hence translates the two words "try and" as "よう努める".

The subtitle generation engine 112 compares the received high accuracy original data with the high speed original data registered in the subtitle management table 1T, so as to determine whether or not there is any replaced portion of the high speed original to be replaced with a replace portion of the high accuracy original. Such a subtitle generation engine 112 functions as a recognition determination section in embodiments of the invention.

When a high speed original includes no mistake, the high speed original corresponding to the data recognized at high speed is identical to the high accuracy original corresponding to the highly accurately recognized data. In this case, there is no replaced and replace portions. Accordingly, high speed original data, original subtitle data of the high speed original subtitle and parallel subtitle data of the high speed parallel subtitle registered in the subtitle management table 1T are respectively considered as high accuracy original data, original subtitle data of the high accuracy original subtitle and parallel subtitle data of high accuracy parallel subtitle.

On the other hand, when high speed original includes a mistake, the high speed original corresponding to the data recognized at high speed is different from the high accuracy original corresponding to the highly accurately recognized data. More specifically, a portion of the high speed original different from a corresponding portion of the high accuracy original is a mistake. Specifically, in Embodiment 2, "a" of the high speed original " . . . try a . . . " is a mistake, and "and" of the high accuracy original " . . . try and . . . " is a replace portion to be replaced with the mistake of the high speed original. In this case, the mistake "a" included in the high speed original is a replaced portion.

Therefore, the subtitle generation engine 112 replaces the replaced portion with the replace portion, so as to correct the high speed original data, the original subtitle data of the high speed original subtitle and the parallel subtitle data of the high speed parallel subtitle registered in the subtitle management table 1T respectively to the high accuracy original data, the original subtitle data of the high accuracy original subtitle and the parallel subtitle data of the high accuracy parallel subtitle.

When the high speed parallel subtitle including a mistake is not displayed in the parallel area 41, the subtitle generation engine 112 may display, on the display 24, the high accuracy parallel subtitle obtained on the basis of the parallel subtitle data corresponding to the high accuracy parallel subtitle at appropriate timing. At this point, a minimum number of blank characters may be disposed between adjacent English words included in the high accuracy parallel subtitle.

Similarly, when the high speed original subtitle including a mistake is not displayed in the original area 42, the subtitle generation engine 112 may display, on the display 24, the high accuracy original subtitle obtained on the basis of the original subtitle data corresponding to the high accuracy original subtitle at appropriate timing. At this point, a minimum number of blank characters may be disposed between adjacent English words included in the high accuracy original subtitle.

In the following description, it is assumed that both the displayed high speed parallel subtitle and the displayed high speed original subtitle include a mistake.

Figure 23:
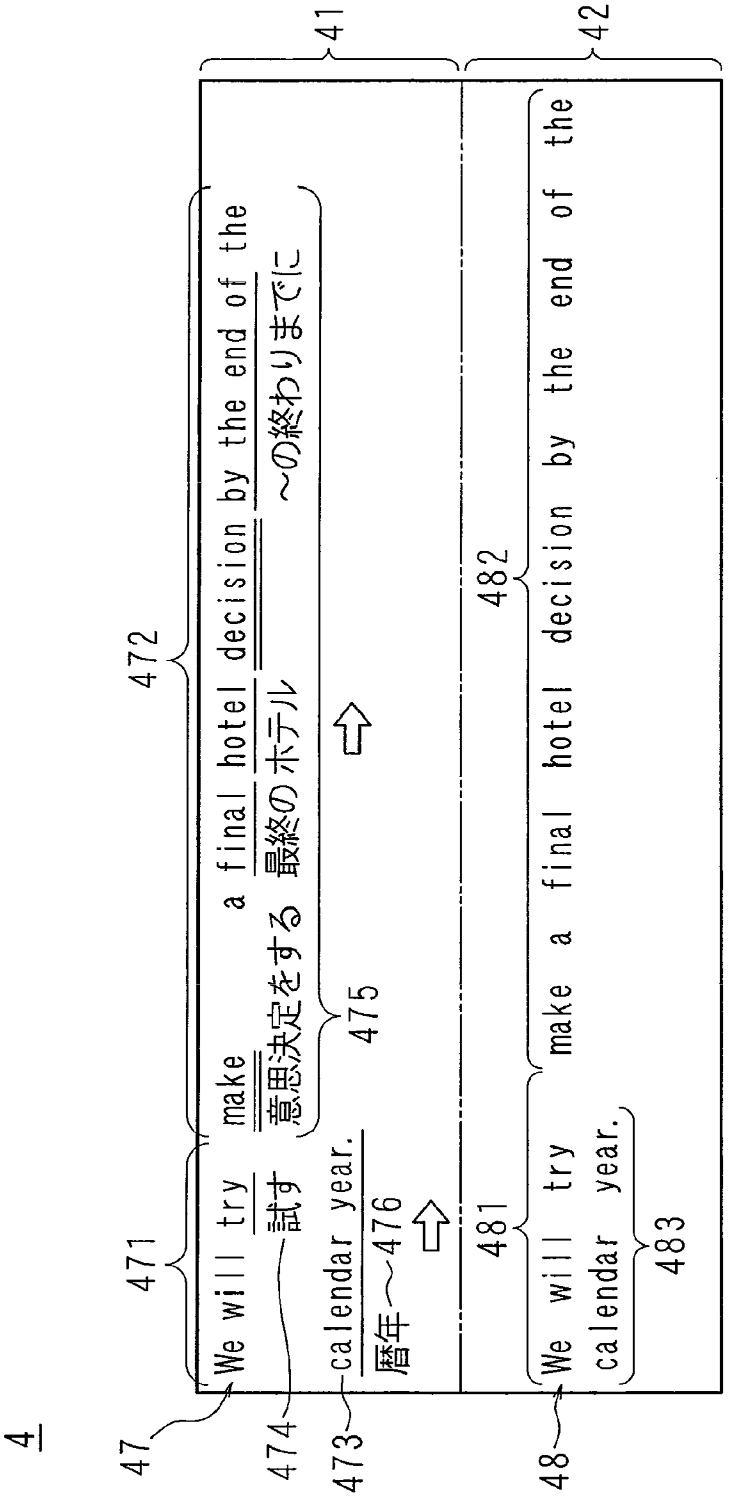
FIG. 23 is a schematic diagram illustrating still another example of the high speed parallel subtitle and high speed original subtitle displayed in the subtitle display area in the conference system of Embodiment 2 of the invention.

FIG. 23 is a schematic diagram illustrating still another example of the high speed parallel subtitle 47 and the high speed original subtitle 48 displayed in the subtitle display area 4.

Since the replaced portion "a" is the mistake, the replaced portion "a" is erased from both the high speed parallel subtitle 47 and the high speed original subtitle 48. At this point, the subtitle generation engine 112 controls the display processing section 14, so that the replaced portion "a" is faded out.

Figure 24:
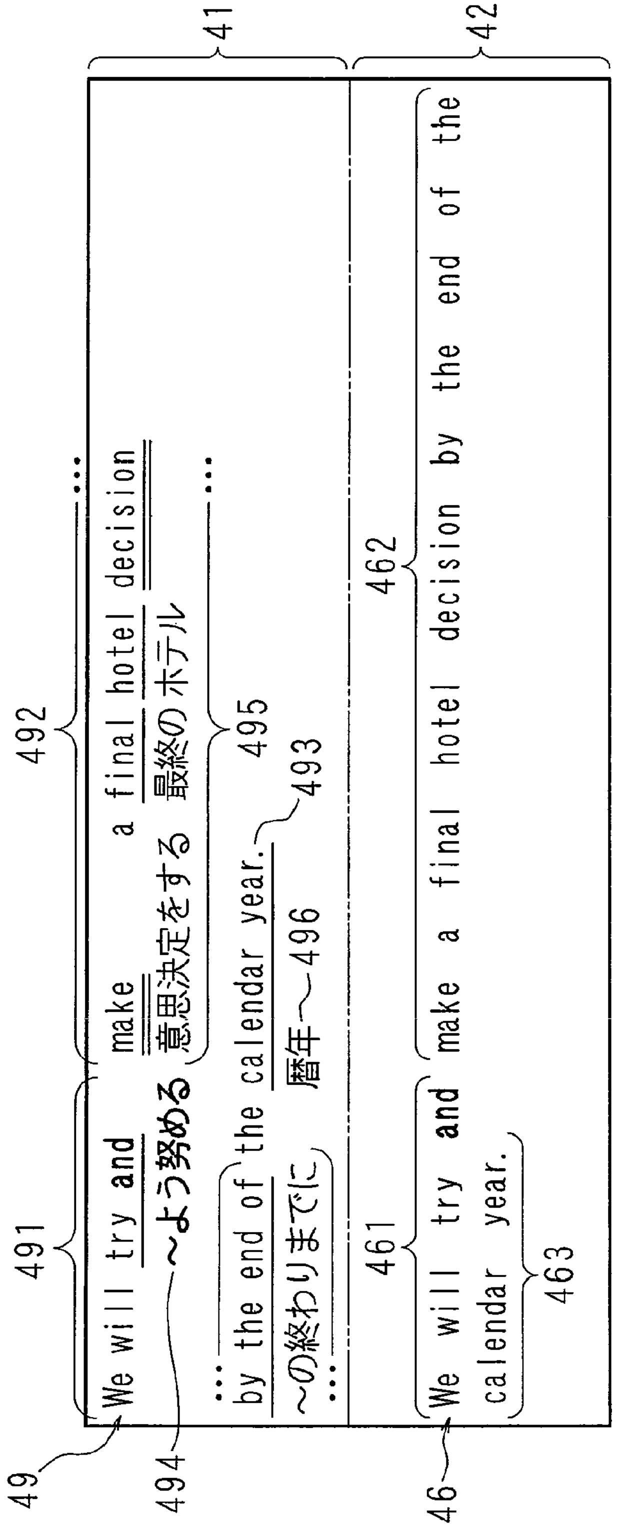
FIG. 24 is a schematic diagram illustrating an example of a high accuracy parallel subtitle and a high accuracy original subtitle displayed in the subtitle display area in the conference system of Embodiment 2 of the invention.

Thereafter, the replace portion "and" is faded in so that the replaced portion "a" is replaced, and as a result, the high speed originals 471 through 473 of the high speed parallel subtitle 47 and the high speed originals 481 through 483 of the high speed original subtitle 48 are corrected to high accuracy originals 491 through 493 of a high accuracy parallel subtitle 49 and high accuracy originals 461 through 463 of a high accuracy original subtitle 46 as illustrated in FIG. 24.

FIG. 24 is a schematic diagram illustrating an example of the high accuracy parallel subtitle 49 and the high accuracy original subtitle 46 displayed in the subtitle display area 4.

The replace portion "and" faded in is emphatically displayed with boldfaces for a prescribed period of time (of, for example, 10 seconds). It is emphatically displayed for informing the listeners Pb and Pc of the replacement of the replaced portion "a" with the replace portion "and". Accordingly, the method of emphatically displaying the replace portion "and" is not limited to the display with the boldfaces but may be display with a box, intermitting display, display in italics, display in red or display with an underline as far as the replace portion "and" is more conspicuous than the other portions of the high accuracy parallel subtitle 49 and the high accuracy original subtitle 46.

After the prescribed period of time has elapsed, the replace portion "and" is displayed in the same manner as the other portions of the high accuracy parallel subtitle 49 and the high accuracy original subtitle 46 (which display is hereinafter designated as normal display).

At this point, since the replaced portion "a" is faded out and the replace portion "and" is faded in, this replacement looks as if the replaced portion "a" is gradually replaced with the replace portion "and" to the listeners Pb and Pc. Therefore, as compared with the case where the replaced portion "a" is replaced with the replace portion "and" in a moment, the replacement of the replaced portion "a" with the replace portion "and" is emphasized.

Incidentally, the invention is not limited to the fade-out display and the fade-in display, but the replaced portion "a" may be replaced with the replace portion "and" by a display method, for example, in which the character size of the replaced portion "a" is gradually reduced with the character size of the replace portion "and" gradually increased. Alternatively, the replaced portion "a" may be erased after being displayed in a color (of, for example, gray) different from the other portion for a prescribed period of time and subsequently, the replace portion "and" may be emphatically displayed.

Since the replaced portion "a" corresponds to one character and the replace portion "and" corresponds to three characters, the replace portion "and" cannot be displayed in a blank area corresponding to one character remaining after erasing the replaced portion "a".

Therefore, when the replaced portion "a" is erased from the high speed parallel subtitle 47 and the high speed original subtitle 48, the subtitle generation engine 112 determines whether or not a displayable area capable of displaying the replace portion "and" is generated in the high speed parallel subtitle 47 and the high speed original subtitle 48. Such a subtitle generation engine 112 functions as an area determination section in embodiments of the invention.

It is necessary to provide at least one blank character each before and after the replace portion "and". Therefore, a blank area corresponding to at least five characters is a displayable area for the replace portion "and".

In the high speed original subtitle 48, the sum of the number of characters of the replaced portion "a" and the numbers of blank characters disposed before and after the replaced portion is five. Therefore, when the replaced portion "a" is erased, the displayable area is generated in the high speed original subtitle 48.

Accordingly, with respect to the high speed original subtitle 48, the replaced portion "a" is faded out to be erased, and the replace portion "and" is faded in and emphatically displayed.

As a result, although two blank characters are disposed between the adjacent English words in the high accuracy original subtitle 46, the blank characters disposed each before and after "and" are reduced to one. This is, however, not a change to extent to degrade the readability.

Incidentally, when the replaced portion "a" is replaced with the replace portion "and", the number of blank characters disposed between the other English words included in the high accuracy original subtitle 46 may be reduced to one each (namely, a pitch between the words may be reduced). In this case, when the respective English words included in the high accuracy original subtitle 46 are scrolled in the leftward direction, the pitch between the words can be reduced without sacrificing the readability of the high accuracy original subtitle 46.

On the other hand, in the high speed parallel subtitle 47, the sum of the number of characters of the replaced portion "a" and the numbers of blank characters disposed before and after the replaced portion is three. Therefore, even when the replaced portion "a" is erased, the displayable area is not generated in the high speed parallel subtitle 47.

Therefore, the subtitle generation engine 112 scrolls a portion of the subtitle displayed after the replaced portion "a", namely, the high speed originals 472 and 473 displayed on the right hand side of the replaced portion "a" and in the next line, in the rightward direction (namely, a direction illustrated with a white arrow in FIG. 23). This scroll is continued until the displayable area is generated (namely, until the blank area corresponding to five characters is generated). Specifically, the high speed originals 472 and 473 may be scrolled in the rightward direction by a distance of two characters.

Thereafter, in the high speed parallel subtitle 47, the replaced portion "a" is faded out to be erased and the replace portion "and" is faded in and emphatically displayed. It is noted that the fade-out display of the replaced portion "a" and the scroll display of the high speed originals 472 and 473 may be simultaneously carried out.

In this way, however, the positions along the lateral direction of the high speed originals 472 and 473 and the positions along the lateral direction of the high speed translations 475 and 476 are shifted from each other. Therefore, the subtitle generation engine 112 scrolls also the high speed translations 475 and 476 in the rightward direction by a distance of two characters in accordance with the scroll of the high speed originals 472 and 473 by the distance of two characters.

Procedures for correcting a high speed translation to a high accuracy translation are substantially the same as the procedures for correcting a high speed original to a high accuracy original. Specifically, the subtitle generation engine 112 having received high accuracy translation data compares the high accuracy translation data with the high speed translation data registered in the subtitle management table 1T, so as to determine whether or not there is any replaced portion of the high speed translation to be replaced with a replace portion of the high accuracy translation. In Embodiment 2, "試す" is a replaced portion and "～よう努める" is a replace portion.

Thus, the high speed translations 474 through 476 of the high speed parallel subtitle 47 are corrected to high accuracy translations 494 through 496 of high accuracy parallel subtitle 49 as illustrated in FIG. 24.

In general, English characters are half size characters and Japanese characters are full size characters. Therefore, the number of characters of the replace portion "～よう努める" is longer by 8 half size characters than the replaced portion "試す". However, there is a margin of two characters between the replaced portion "試す" and the high speed translation 475 as a result of the scroll display described above.

Accordingly, the subtitle generation engine 112 scrolls the high speed translations 475 and 476 displayed on the right hand side of the replaced portion "試す" and in the next line in the rightward direction (namely, the direction illustrated with the white arrow in FIG. 23) by a distance of six characters. Thereafter, in the high speed parallel subtitle 47, the replaced portion "試す" is faded out to be erased and the replace portion "～よう努める" is faded in and emphatically displayed.

In this way, however, the positions along the lateral direction of the high accuracy originals 492 and 493 and the positions along the lateral direction of the high accuracy translations 495 and 496 are shifted from each other. Therefore, the subtitle generation engine 112 scrolls the high accuracy originals 492 and 493 in the rightward direction by a distance of six characters, so as to adjust the positional relationship between the high accuracy originals 492 and 493 and the high accuracy translations 495 and 496 as illustrated in FIG. 24.

In the case where, for example, any expression disposed on the first line (specifically, "by the end of the" and "～の終わりまでに") can not be disposed on the first line as a result of the increase of the pitch between the words through the aforementioned scroll display, these words may be moved to the second line.

Incidentally, if "and" is the replaced portion and "a" is the replace portion on the contrary to Embodiment 2, when the replaced portion "and" is replaced with the replace portion "a", the number of blank characters disposed each before and after "a" is increased by two characters.

In such a case, the increased blank characters may be left as they are or may be erased by scrolling the respective English words included in the high accuracy original subtitle in the leftward direction. When the increased blank characters are left as they are, the words other than the replaced portion and the replace portion are not changed, and hence, a sense of discomfort occurring in the listeners Pb and Pc can be suppressed. On the other hand, when the increased blank characters are erased, the number of characters to be displayed in the original subtitle can be increased accordingly, and hence, the limited subtitle display area 4 can be effectively used.

At this point, association between high speed original data and high accuracy original data and association between high speed translation data and high accuracy translation data will be described.

For example, on the basis of first half speech data corresponding to first half speech, a first pair of high speed original data and high speed translation data is generated, and on the basis of second half speech data corresponding to second half speech, a second pair of high speed original data and high speed translation data is generated. Furthermore, on the basis of both the first half speech data and the second half speech data, high accuracy original data and high accuracy translation data is generated.

In Embodiment 2, the central unit 3 issues identification information respectively to the first half speech data and the second half speech data. Each of the first (or second) pair of high speed original data and high speed translation data is associated with the identification information of the first half speech data (or the second half speech data) and is delivered to the terminal units B1 and C1. Then, each of the high accuracy original data and the high accuracy translation data is associated with both the identification information of the first half speech data and the identification information of the second half speech data and is delivered to the terminal units B1 and C1.

In this case, each of the terminal units B1 and C1 can easily associate the high speed original data and the high accuracy original data (or the high speed translation data and the high accuracy translation data) with each other on the basis of the identification information.

Figure 25:
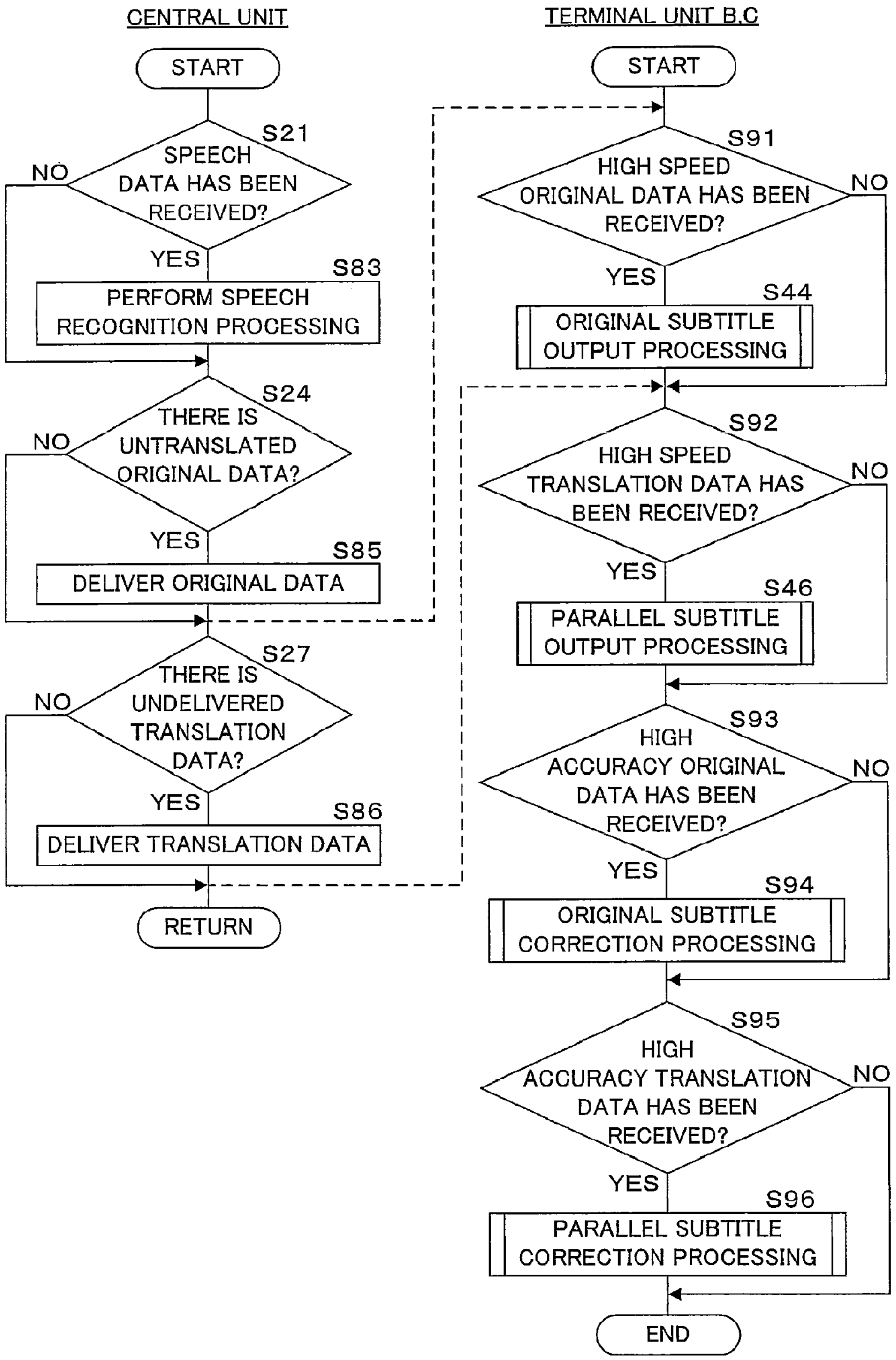
FIG. 25 is a flowchart illustrating procedures in data delivery processing and subtitle display processing executed in the conference system of Embodiment 2 of the invention.

FIG. 25 is a flowchart illustrating procedures in data delivery processing and subtitle display processing executed in the conference system 6. FIG. 25 corresponds to FIG. 13 of Embodiment 1, and speech transmission processing of Embodiment 2 is the same as that of Embodiment 1 and hence is omitted in FIG. 25. FIG. 25 illustrates procedures selected from the data delivery processing illustrated in FIG. 26 and the subtitle display processing illustrated in FIGS. 27 and 28.

Figure 26:
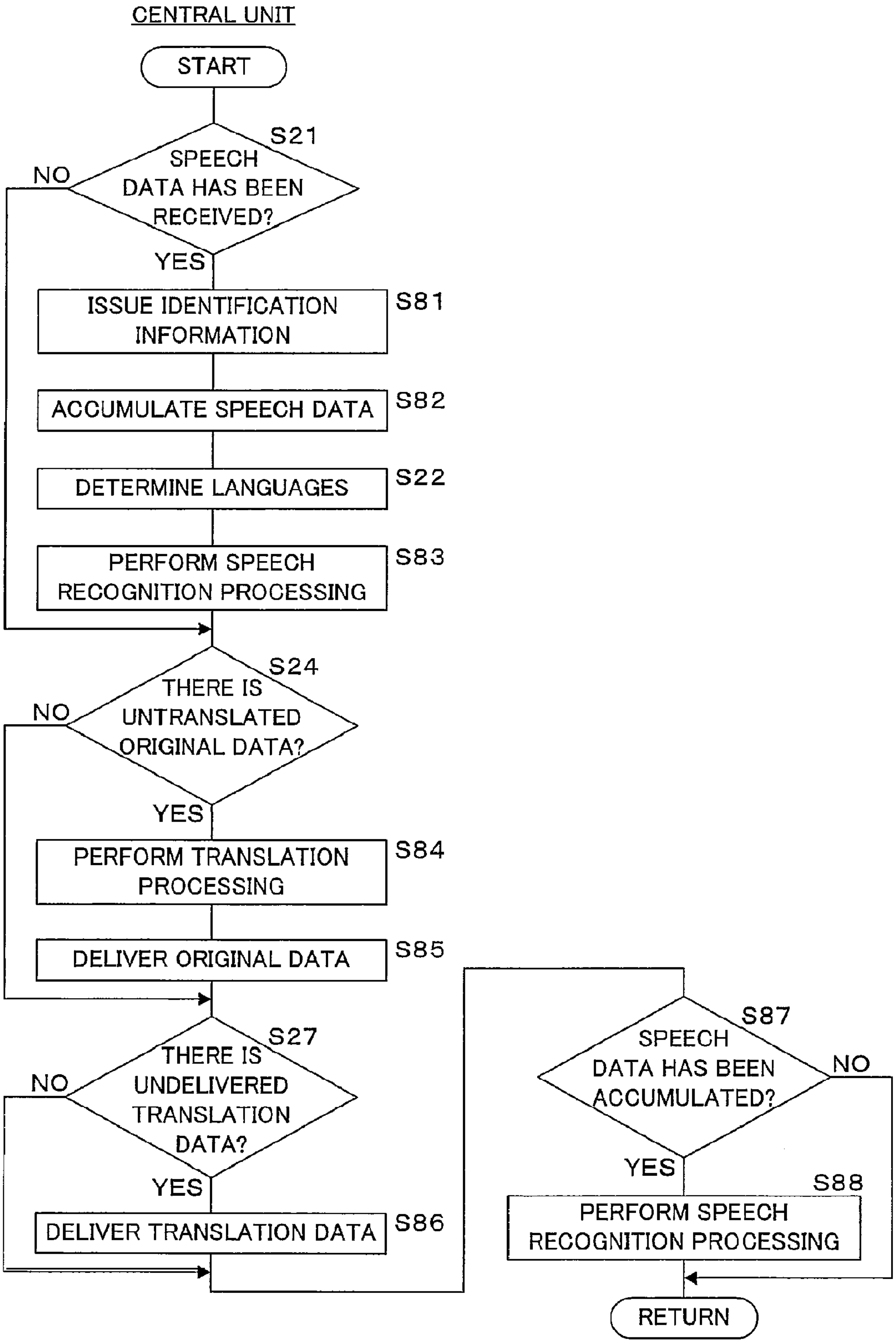
FIG. 26 is a flowchart illustrating procedures in the data delivery processing executed by a central unit included in the conference system of Embodiment 2 of the invention.
Figure 27:
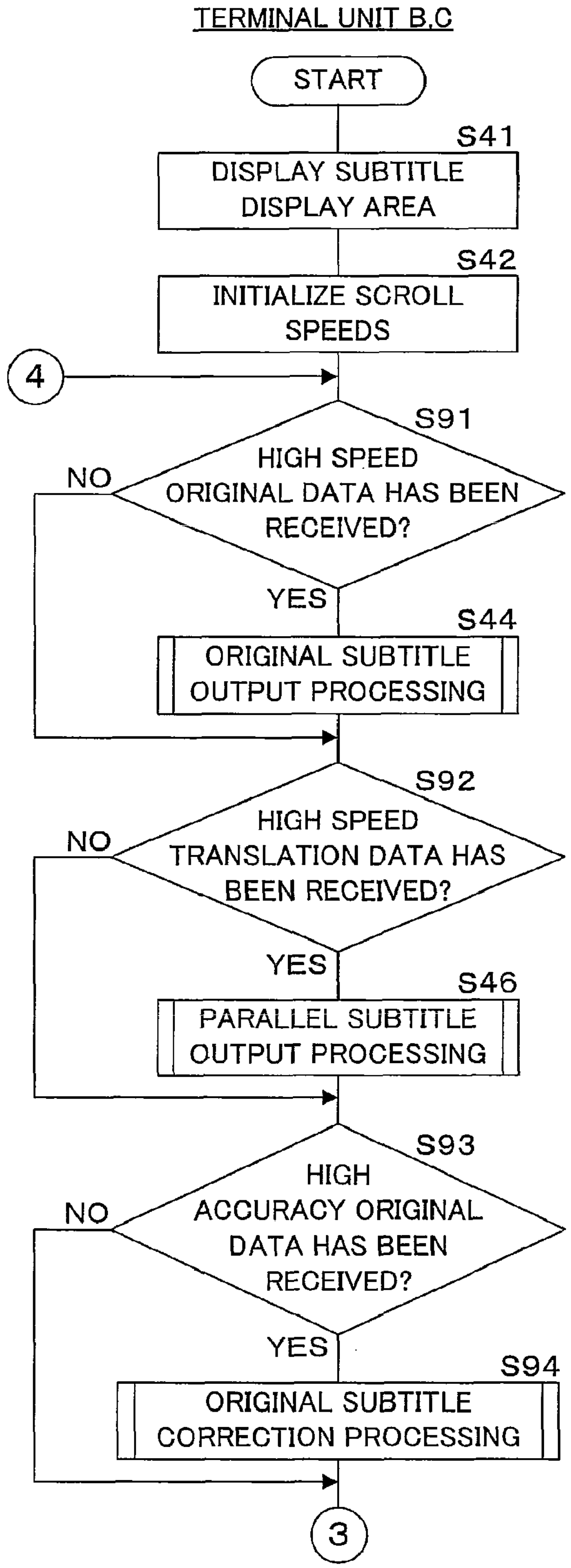
FIG. 27 is a flowchart illustrating procedures in subtitle display processing executed by each of terminal units included in the conference system of Embodiment 2 of the invention.
Figure 28:
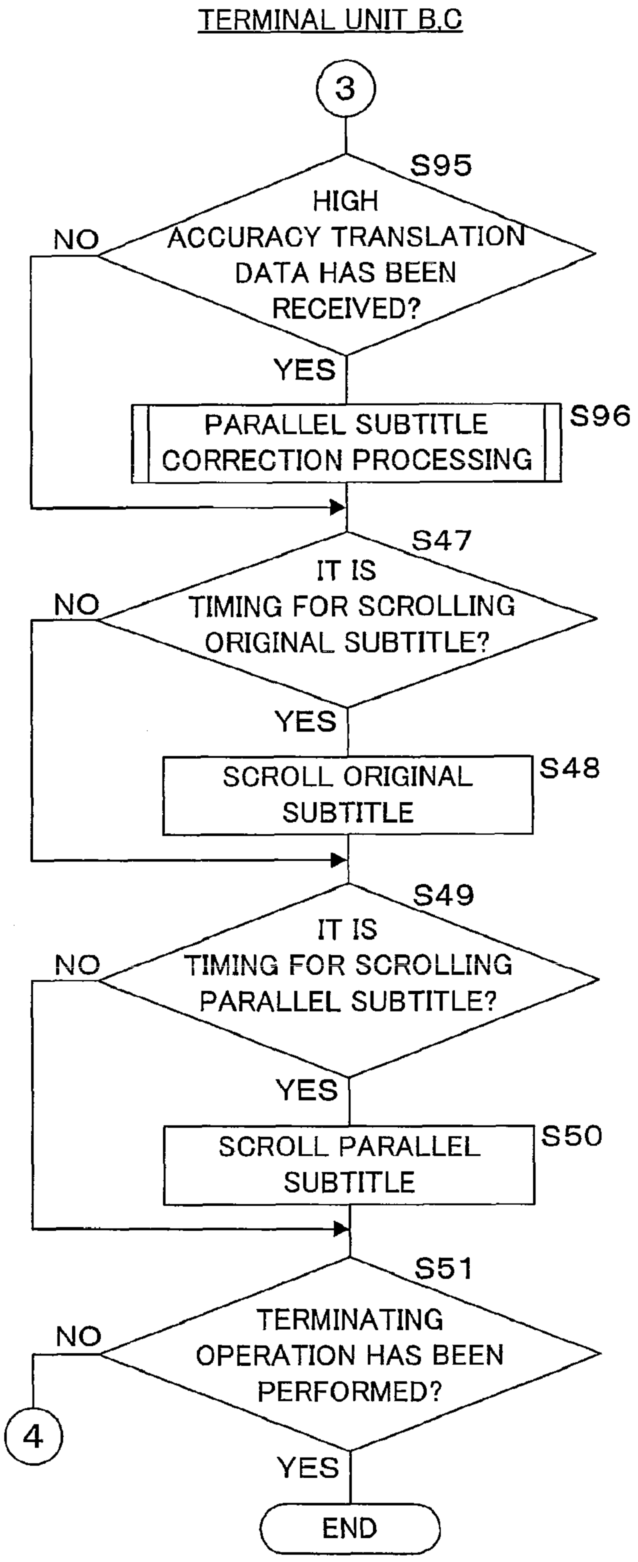
FIG. 28 is a flowchart illustrating procedures in subtitle display processing executed by each of terminal units included in the conference system of Embodiment 2 of the invention.

FIG. 26 is a flowchart illustrating procedures in the data delivery processing executed by the central unit 3. FIGS. 27 and 28 are flowcharts illustrating procedures in the subtitle display processing executed by each of the terminal units B1 and C1.

The data delivery processing illustrated in FIGS. 25 and 26 is executed by the central unit 3.

A procedure of S21 of FIGS. 25 and 26 is the same as that of S21 of Embodiment 1 illustrated in FIGS. 13 and 14, and procedures of S22, S24 and S27 of FIG. 26 are the same as those of S22, S24 and S27 of Embodiment 1 illustrated in FIG. 14.

When speech data has been received (i.e., when YES in S21), the control section 31 issues identification information for identifying the speech data (S81), and accumulates the issued identification information and the speech data received in S21 in association with each other in the HDD 32 (S82). Subsequently, the control section 31 proceeds the processing to S22.

After completing the procedure of S22, the control section 31 performs speech recognition processing on the speech data received in S21 on the basis of a determination result for a language for original determined in S22 in substantially the same manner as in S23 of Embodiment 1 (S83). In S83, the control section 31 functions as the high speed recognition engine 313. High speed original data generated at this point is associated with the identification information of the speech data received in S21.

The control section 31 proceeds the processing to S24 while executing the speech recognition processing of S83 as multitasking.

In S24, the control section 31 determines whether or not there is any untranslated original data regardless of high speed original data and high accuracy original data.

When YES in S24, the control section 31 performs the translation processing on the untranslated high speed original data (or the untranslated high accuracy original data) in substantially the same manner as in S25 of Embodiment 1 (S84). In S84, the control section 31 functions as the high speed translation engine 314 (or the high accuracy translation engine 316). High speed translation data (or high accuracy translation data) generated at this point is associated with the identification information of the original data subjected to the translation processing in S84.

The control section 31 proceeds the processing to S85 while executing the translation processing of S84 as multitasking.

The control section 31 delivers the original data having been subjected to the translation processing in S84 together with the identification information to the terminal units 1, 1 . . . in substantially the same manner as in S26 of Embodiment 1 (S85), and subsequently proceeds the processing to S27.

In S27, the control section 31 determines whether or not there is undelivered translation data regardless of high speed translation data and high accuracy translation data.

When there is no undelivered translation data (i.e., when NO in S27), the control section 31 proceeds the processing to S87 described later.

When there is undelivered translation data (i.e., when YES in S27), the control section 31 delivers the undelivered translation data together with the identification information to the terminal units 1, 1 . . . in substantially the same manner as in S28 of Embodiment 1 (S86), and subsequently proceeds the processing to S87.

The control section 31 determines whether or not speech data has been accumulated in the HDD 32 (S87). In S87, the control section 31 determines, for example, whether or not the data amount of the accumulated speech data is more than a prescribed data amount, and further determines whether or not time having passed since the storage of the speech data is more than prescribed time. When the data amount of the accumulated speech data is more than the prescribed data amount, the control section 31 determines that the speech data has been accumulated. Even when the data amount of the accumulated speech data is smaller than the prescribed data amount, however, if the time having passed since the storage of the speech data is more than the prescribed time, the control section 31 determines that the speech data has been accumulated.

When the speech data has not been accumulated (i.e., when NO in S87), the control section 31 returns the processing to S21.

When the speech data has been accumulated (i.e., YES in S87), the control section 31 performs the speech recognition processing on the speech data accumulated in the HDD 32 (S88). In S88, the control section 31 functions as the high accuracy recognition engine 315. High accuracy original data generated at this point is associated with all identification information of the speech data accumulated in the HDD 32.

The control section 31 returns the processing to S21 while executing the speech recognition processing of S88 as multitasking. When the speech recognition processing of S88 is completed, the speech data accumulated in the HDD 32 is erased or distinguished, as the speech data having been subjected to the speech recognition processing, from newly accumulated speech data.

The subtitle display processing illustrated in FIGS. 25, 27 and 28 is executed by each of the terminal units B1 and C1.

Procedures of S41 and S42 of FIG. 27 are the same as those of S41 and S42 of Embodiment 1 illustrated in FIG. 15.

Procedures of S44 and S46 of FIGS. 25 and 27 are the same as those of S44 and S46 of Embodiment 1 illustrated in FIGS. 13 and 15.

Procedures of S47 through S51 of FIG. 28 are the same as those of S47 through S51 of Embodiment 1 illustrated in FIG. 16.

As illustrated in FIGS. 25 and 27, the control section 11 determines whether or not high speed original data and identification information have been received (S91), and when the high speed original data and the identification information have not been received (i.e., when NO in S91), the control section 11 proceeds the processing to S92 described later.

When the high speed original data and the identification information have been received (i.e., when YES in S91), the control section 11 proceeds the processing to S44, and executes original subtitle output processing similar to the original subtitle output processing of Embodiment 1 illustrated in FIG. 17. In S61 and S62 of this original subtitle output processing, the control section 11 functions as the subtitle generation engine 112.

Then, the control section 11 proceeds the processing to S92 described later while executing the original subtitle output processing of S44 as multitasking.

When the original subtitle output processing of S44 is executed, the high speed original subtitle 48 is displayed in the original area 42.

Next, the control section 11 determines whether or not high speed translation data and identification information have been received (S92), and when the high speed translation data and the identification information have not been received (i.e., when NO in S92), the control section 11 proceeds the processing to S93 described later.

When the high speed translation data and the identification information have been received (i.e., when YES in S92), the control section 11 proceeds the processing to S46, and executes parallel subtitle output processing substantially similar to the parallel subtitle output processing of Embodiment 1 illustrated in FIG. 18. In this parallel subtitle output processing, however, there is no need to execute a procedure corresponding to the procedure of S72 of Embodiment 1, and in a procedure corresponding to the procedure of S73, the control section 11 may display the high speed parallel subtitle 47 in the parallel area 41 on the basis of the parallel subtitle data generated in S71. In S71 and S73, the control section 11 functions as the subtitle generation engine 112.

Then, the control section 11 proceeds the processing to S93 while executing the parallel subtitle output processing as multitasking.

When the parallel subtitle output processing of S46 is executed, the high speed parallel subtitle 47 is displayed in the parallel area 41.

Subsequently, the control section 11 determines whether or not high accuracy original data and identification information have been received (S93), and when the high accuracy original data and the identification information have not been received (i.e., when NO in S93), the control section 11 proceeds the processing to S95 described later.

When the high accuracy original data and the identification information have been received (i.e., when YES in S93), the control section 11 executes original subtitle correction processing (see FIGS. 29 and 30) described later (S94).

The control section 11 proceeds the processing to S95 while executing the original subtitle correction processing of S94 as multitasking.

Figure 29:
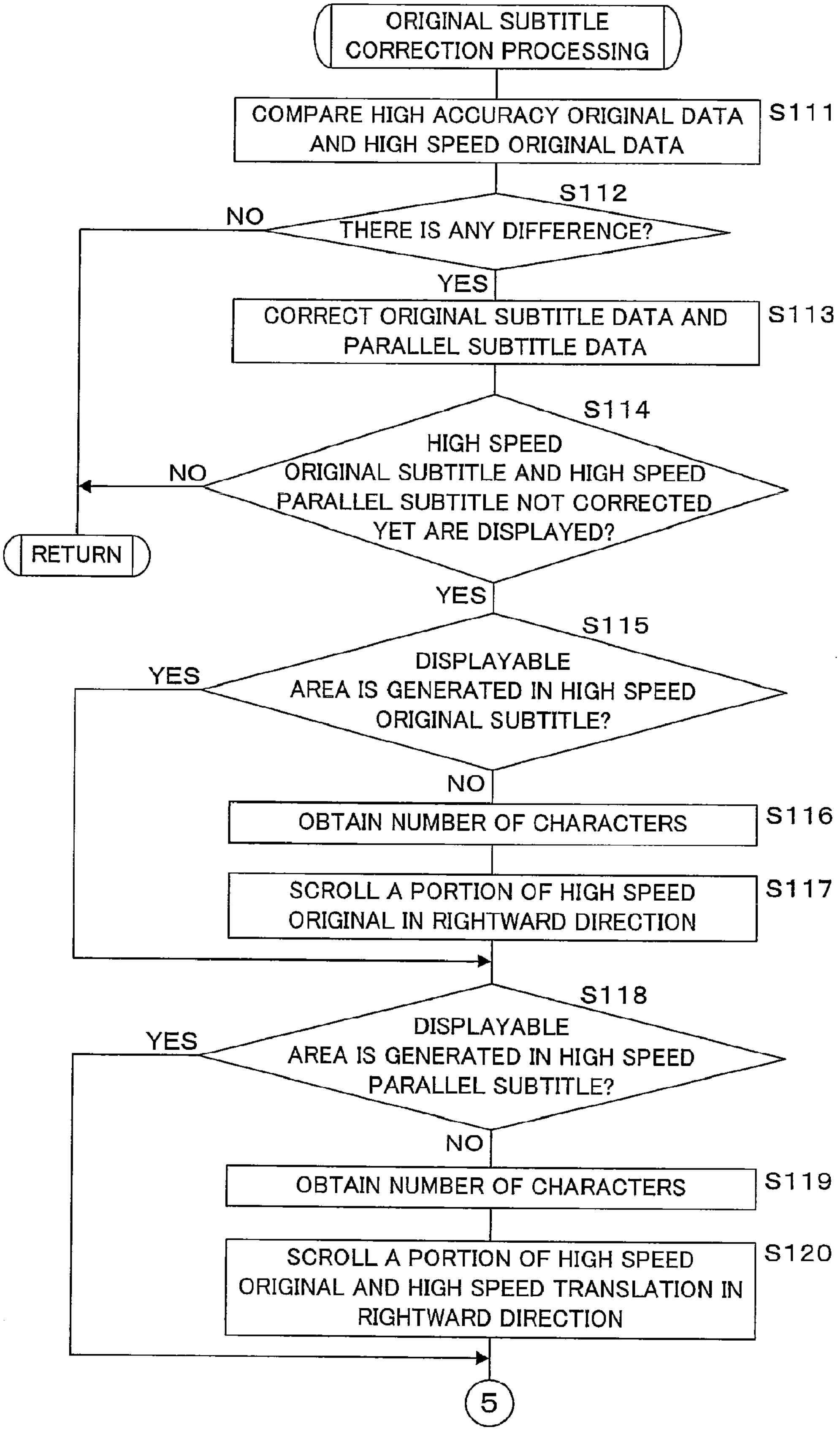
FIG. 29 is a flowchart illustrating detailed procedures in original subtitle correction processing executed by each terminal unit included in the conference system of Embodiment 2 of the invention.
Figure 30:
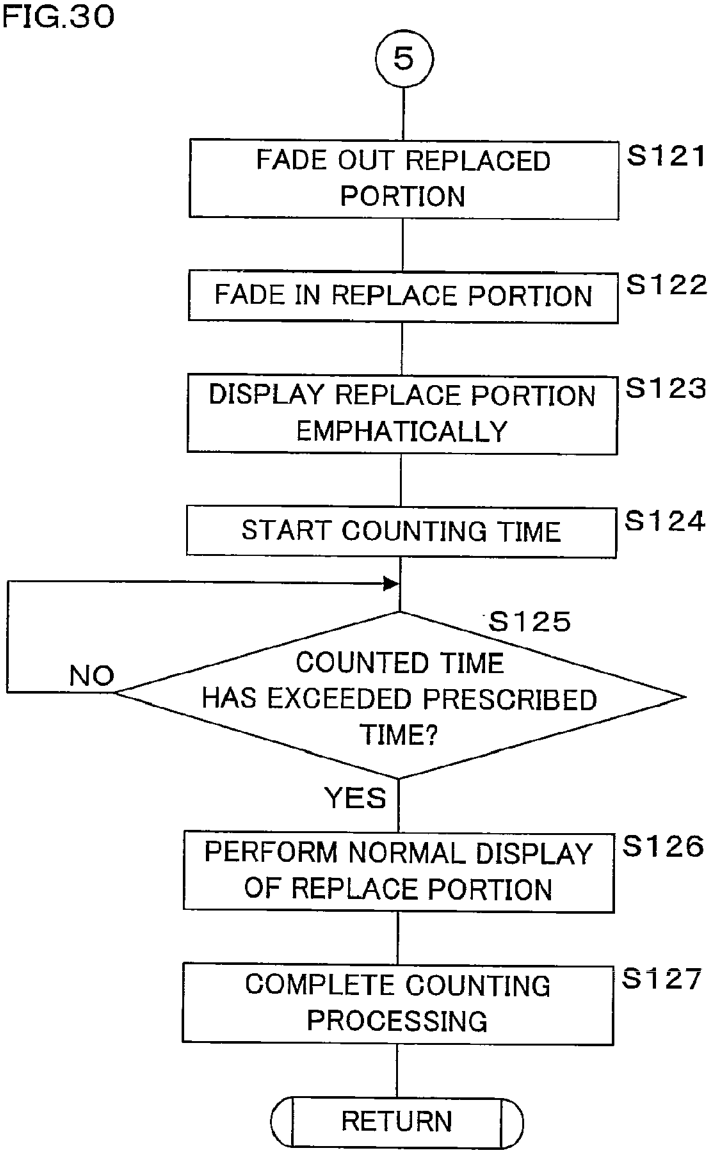
FIG. 30 is a flowchart illustrating detailed procedures in the original subtitle correction processing executed by each terminal unit included in the conference system of Embodiment 2 of the invention.

FIGS. 29 and 30 are flowcharts illustrating detailed procedures in the original subtitle correction processing executed by each terminal unit 1.

As illustrated in FIG. 29, the control section 11 compares the high accuracy original data received in S93 and the high speed original data corresponding to this high accuracy original data (namely, compares the high accuracy original data and the high speed original data associated with the same identification information with each other) (S111), and determines whether or not there is any difference between the high accuracy original data and the high speed original data, namely, there are a replaced portion in the high speed original data and a replace portion in the high accuracy original data (S112).

When the high accuracy original corresponding to the high accuracy original data accords with the high speed original corresponding to the high speed original data (i.e., when NO in S112), the control section 11 completes the original subtitle correction processing, and returns the processing to the pristine subtitle display processing.

When there are a replace portion and a replaced portion (i.e., when YES in S112), the control section 11 corrects the original subtitle data and the parallel subtitle data by replacing the replaced portion with the replace portion (S113).

Next, the control section 11 determines whether or not the high speed original subtitle and the high speed parallel subtitle obtained based on the original subtitle data and the parallel subtitle data not corrected yet are displayed in the subtitle display area 4 (S114), and when they are not displayed (i.e., when NO in S114), the control section 11 completes the original subtitle correction processing and returns the processing to the pristine subtitle display processing.

When these subtitles are displayed (i.e., when YES in S114), the control section 11 determines whether or not a displayable area is generated by erasing the replaced portion from the currently displayed high speed original subtitle (S115).

When a displayable area is not generated in the high speed original subtitle (i.e., when NO in S115), the control section 11 obtains the number of characters corresponding to the displayable area to be provided in the high speed original subtitle (S116), and scrolls a portion of the high speed original included in the high speed original subtitle following the replaced portion in the rightward direction in accordance with the obtained number of characters corresponding to the displayable area (S117).

While executing the procedure of S117 as multitasking, or when a displayable area is generated in the high speed original subtitle (i.e., when YES in S115), the control section 11 determines whether or not a displayable area is generated by erasing the replaced portion from the currently displayed high speed parallel subtitle (S118).

When a displayable area is not generated in the high speed parallel subtitle (i.e., when NO in S118), the control section 11 obtains the number of characters corresponding to a displayable area to be provided in the high speed parallel subtitle (S119). Then, the control section 11 scrolls a portion of the high speed original included in the high speed parallel subtitle following the replaced portion in the rightward direction and scrolls a portion of the high speed translation included in the high speed parallel subtitle following an expression corresponding to the replaced portion in the rightward direction in accordance with the number of characters corresponding to the displayable area obtained in S119 (S120).

In S120, the control section 11 scrolls "make a . . . ", namely, the portion following the replaced portion "a", of the high speed originals 471 through 473 included in the high speed parallel subtitle 47 in the rightward direction, and scrolls "意思決定をする . . . ", namely, the portion following the expression "試す" corresponding to the replaced portion of the high speed translations 474 through 476 in the exemplary case of FIG. 22. As a result, the position of "make a . . . " and the position of "意思決定をする . . . " are not shifted from each other but correspond to each other.

While executing the procedure of S120 as multitasking, or when a displayable area is generated in the high speed parallel subtitle (i.e., when YES in S118), as illustrated in FIG. 30, the control section 11 fades out the replaced portion (S121), fades in the replace portion (S122) and emphatically displays the replace portion (S123) in both the high speed original subtitle and the high speed parallel subtitle.

Next, the control section 11 starts counting time elapsed after emphatically displaying the replace portion (S124), and determines whether or not the counted time has exceeded prescribed time (S125), and when the counted time has not exceeded (i.e., when NO in S125), the control section 11 repeatedly executes the procedure of S125.

When the time elapsed after emphatically displaying the replace portion has exceeded the prescribed time (i.e., when YES in S125), the control section 11 performs the normal display of the replace portion (S126).

After completing the procedure of S126, the control section 11 completes the counting processing started in S124 (S127), completes the original subtitle correction processing and returns the processing to the pristine subtitle display processing.

In executing this original subtitle correction processing, the control section 11 functions as the subtitle generation engine 112.

As illustrated in FIGS. 25 and 28, the control section 11 determines whether or not high accuracy translation data and identification information have been received (S95), and when the high accuracy translation data and the identification information have not been received (i.e., when NO in S95), the control section 11 proceeds the processing to S47.

When the high accuracy translation data and the identification information have been received (i.e., when YES in S95), the control section 11 executes parallel subtitle correction processing (see FIG. 31) described later (S96).

The control section 11 proceeds the processing to S47 while executing the parallel subtitle correction processing of S96 as multitasking.

Figure 31:
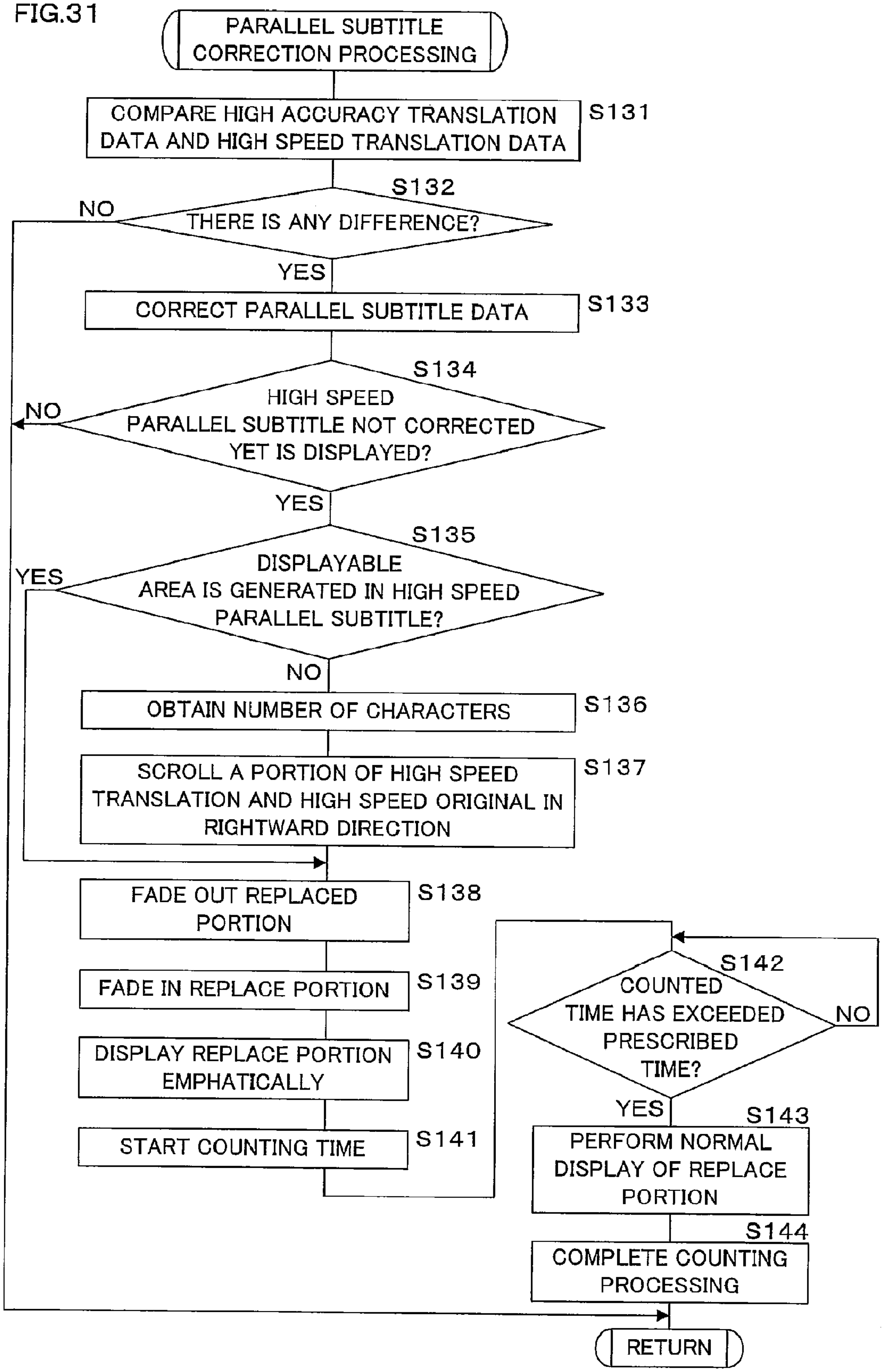
FIG. 31 is a flowchart illustrating detailed procedures in parallel subtitle correction processing executed by each terminal unit included in the conference system of Embodiment 2 of the invention.

FIG. 31 is a flowchart illustrating detailed procedures in the parallel subtitle correction processing executed by each terminal unit 1.

The control section 11 compares the high accuracy translation data received in S95 and the high speed translation data corresponding to this high accuracy translation data (namely, compares the high accuracy translation data and the high speed translation data associated with the same identification information with each other) (S131), and determines whether or not there is any difference between the high accuracy translation data and the high speed translation data, namely, there are a replaced portion in the high speed translation data and a replace portion in the high accuracy translation data (S132).

When the high accuracy translation corresponding to the high accuracy translation data accords with the high speed translation corresponding to the high speed translation data (i.e., when NO in S132), the control section 11 completes the parallel subtitle correction processing, and returns the processing to the pristine subtitle display processing.

When there are a replace portion and a replaced portion (i.e., when YES in S132), the control section 11 corrects the parallel subtitle data by replacing the replaced portion with the replace portion (S133).

Next, the control section 11 determines whether or not the high speed parallel subtitle obtained based on the parallel subtitle data not corrected yet is displayed in the subtitle display area 4 (S134), and when the subtitle is not displayed (i.e., when NO in S134), the control section 11 completes the parallel subtitle correction processing and returns the processing to the pristine subtitle display processing.

When the subtitle is displayed (i.e., when YES in S134), the control section 11 determines whether or not a displayable area is generated by erasing the replaced portion from the currently displayed high speed parallel subtitle (S135).

When a displayable area is not generated in the high speed parallel subtitle (i.e., when NO in S135), the control section 11 obtains the number of characters corresponding to the displayable area to be provided in the high speed parallel subtitle (S136). Then, the control section 11 scrolls a portion of the high speed translation included in the high speed parallel subtitle and following the replaced portion in the rightward direction and scrolls a portion of the high speed original included in the high speed parallel subtitle and following an expression corresponding to the replaced portion in the rightward direction in accordance with the obtained number of characters corresponding to the displayable area obtained in S136 (S137).

In S137, the control section 11 scrolls "意思決定をする . . . ", namely, the portion following the expression "試す" corresponding to the replaced portion of the high speed translations 474 through 476 included in the high speed parallel subtitle 47 in rightward direction and scrolls "make a . . . ", namely, the portion following the replace portion "and" of the high accuracy originals 491 through 493 (see FIG. 24) in the rightward direction in the exemplary case of FIG. 22. As a result, the position of "make a . . . " and the position of "意思決定 をする . . . " are not shifted from each other but correspond to each other.

While executing the procedure of S137 as multitasking, or when a displayable area is generated in the high speed parallel subtitle (i.e., when YES in S135), as illustrated in FIG. 31, the control section 11 fades out the replaced portion (S138), fades in the replace portion (S139) and emphatically displays the replace portion (S140) in the high speed parallel subtitle.

Next, the control section 11 starts counting time elapsed after emphatically displaying the replace portion (S141), and determines whether or not the counted time has exceeded prescribed time (S142), and when the counted time has not exceeded (i.e., when NO in S142), the control section 11 repeatedly executes the procedure of S142.

When the time elapsed after emphatically displaying the replace portion has exceeded the prescribed time (i.e., when YES in S142), the control section 11 performs the normal display of the replace portion (S143).

After completing the procedure of S143, the control section 11 completes the counting processing started in S141 (S144), completes the parallel subtitle correction processing and returns the processing to pristine subtitle display processing.

In executing this parallel subtitle correction processing, the control section 11 functions as the subtitle generation engine 112.

Incidentally, the invention is not limited to the execution of the original subtitle correction processing of S94 immediately after receiving the high accuracy original data in S93, and the original subtitle correction processing and subtitle correction processing corresponding to the parallel subtitle correction processing of S96 may be executed after receiving the high accuracy translation data in S95. In this case, the high speed original subtitle and the high speed parallel subtitle can be simultaneously corrected to the high accuracy original subtitle and the high accuracy parallel subtitle.

According to the conference system 6 described so far, the high speed processing and the high accuracy processing are simultaneously executed, so that various subtitles can be displayed in a short period of time as well as various subtitles can be accurately displayed.

Therefore, the listeners Pb and Pc are not kept waiting for a long period of time until various subtitles are displayed after the speaker Pa gives speech. Even when there is a mistake in the contents of the various subtitles, a mistaken portion alone is corrected afterward, and hence, the listeners Pb and Pc can accurately and easily understand the speech given by the speaker Pa.

It should be understood that the embodiments described above are merely illustrative and not restrictive on various points. The invention is defined by the appended claims rather than by the description preceding them, and all changes that fall within metes and bounds of the claims, or equivalence of such metes and bounds are therefore intended to embraced by the claims.

For example, although the original subtitle and the parallel subtitle are both displayed in the lateral direction in each of Embodiments 1 and 2, various subtitles may be displayed in the vertical direction. In this case, the scroll display for scrolling out the various subtitles as described in Embodiment 1 may be scroll in the rightward direction. Also, the scroll display for providing a displayable area as described in Embodiment 2 may be scroll in the downward direction.

Furthermore, in the conference system 6 of each of these embodiments of the invention, the speech recognition engine 311 and the translation engine 312 are realized in the central unit 3, and the original data and the translation data are delivered so as to realize the subtitle generation engine 111 in the terminal unit 1 of each listener. Instead, in the conference system 6, the speech recognition engine 311 may be realized in the central unit 3 (or in the terminal unit 1 of a speaker), and the original data may be delivered so as to realize the translation engine 312 and the subtitle generation engine 111 in the terminal unit 1 of each listener. Alternatively, in the conference system 6, the speech recognition engine 311, the translation engine 312 and the subtitle generation engine 111 may be realized in the central unit 3 (or the terminal unit 1 of a speaker) so as to deliver the original subtitle data and the parallel subtitle data to the terminal unit 1 of each listener.

Furthermore, in the aforementioned embodiments, the conference system 6 supports implementation of a conference by employing a client-server type communication method using the terminal units 1, 1 . . . and the central unit 3. However, the conference system 6 may be a conference system for supporting implementation of a conference by employing a peer to peer type communication method using the terminal units 1, 1 . . . alone without using the central unit 3. Alternatively, the conference system 6 may employ a point-to-point type communication method using two terminal units 1, 1 alone, or a point-to-multipoint type or a multipoint-to-point type communication method using the terminal units 1, 1 . . . and an MCU (a multipoint connection unit).

Moreover, the conference system 6 and each terminal unit 1 may include any composing element not described in Embodiments 1 and 2 as far as the effects of the invention are attained.

As this description may be embodied in several forms without departing from the spirit of essential characteristics thereof, the present embodiments are therefore illustrative and not restrictive, since the scope is defined by the appended claims rather than by the description preceding them, and all changes that fall within metes and bounds of the claims, or equivalence of such metes and bounds thereof are therefore intended to be embraced by the claims.

What is claimed is:

1. A conference system, comprising:

a recognition section for recognizing speech in a first language;

a translation section for translating a recognition result recognized by the recognition section into a second language different from the first language;

a generation section for generating a translation subtitle for displaying a translation result translated by the translation section and the recognition result corresponding to the translation result in parallel, and a recognition result subtitle for displaying the recognition result that has not been translated by the translation section; and a display section for displaying the translation subtitle and the recognition result subtitle generated by the generation section, wherein the recognition section recognizes the speech in the first language at least twice, the conference system further comprising:

a recognition determination section for determining whether or not a recognition result obtained in the first recognition by the recognition section should be replaced with a recognition result obtained in the second or later recognition; and an area determination section for determining, when it is determined by the recognition determination section that the recognition result obtained in the first recognition should be replaced, whether or not a displayable area capable of displaying a replace portion of the recognition result obtained in the second or later recognition is generated in the translation subtitle by erasing a replaced portion of the recognition result obtained in the first recognition in the translation subtitle displayed in the display section, wherein the generation section corrects, when it is determined by the recognition determination section that the recognition result obtained in the first recognition should be replaced, the translation subtitle to a translation subtitle in which the recognition result obtained in the second or later recognition and a translation result translated from the recognition result obtained in the second or later recognition by the translation section are displayed, wherein the display section includes:

an erase section for erasing the replaced portion when it is determined by the recognition determination section that the recognition result obtained in the first recognition should be replaced;

a scroll display section for scrolling, when it is determined by the area determination section that a displayable area is not generated, a portion of the translation subtitle following the replaced portion in a direction toward an end for providing the displayable area; and a replace portion display section for displaying the replace portion in the displayable area.

2. The conference system according to claim 1, wherein each word or each phrase included in the recognition result is displayed in the translation subtitle in parallel to an expression included in the translation result and corresponding to the word or the phrase.

3. The conference system according to claim 1, wherein the display section performs scroll display of the recognition result subtitle and the translation subtitle.

4. The conference system according to claim 1, wherein the display section displays the replace portion emphatically as compared with the other portion of the translation subtitle for prescribed time in displaying the replace portion in the displayable area.

5. The conference system according to claim 1, wherein a central unit is connected to a plurality of terminal units in such a manner as to be able to communicate with each other, wherein each of the terminal units includes the display section and the generation section, wherein the central unit includes:

the recognition section;

the translation section; and a delivery section for delivering data corresponding to the recognition result recognized by the recognition section and the translation result translated by the translation section to each of the terminal units, wherein the generation section of each of the terminal units executes generation processing on the basis of the received data.

6. An information processor, comprising:

a receiving section for receiving data corresponding to an original in a first language and a translation of the original in a second language different from the first language;

a generation section for generating, on the basis of the data received by the receiving section, a translation subtitle in which the translation and the original corresponding to the translation are displayed in parallel, and an original subtitle in which the original that has not been translated is displayed; and a display section for displaying the translation subtitle and the original subtitle generated by the generation section, wherein the receiving section receives recognition results of the speech in the first language at least twice, the information processor further comprising:

a recognition determination section for determining whether or not a recognition result obtained in the first recognition by the receiving section should be replaced with a recognition result obtained in the second or later recognition; and an area determination section for determining, when it is determined by the recognition determination section that the recognition result obtained in the first recognition should be replaced, whether or not a displayable area capable of displaying a replace portion of the recognition result obtained in the second or later recognition is generated in the translation subtitle by erasing a replaced portion of the recognition result obtained in the first recognition in the translation subtitle displayed in the display section, wherein the generation section corrects, when it is determined by the recognition determination section that the recognition result obtained in the first recognition should be replaced, the translation subtitle to a translation subtitle in which the recognition result obtained in the second or later recognition and a translation result translated from the recognition result obtained in the second or later recognition by the translation section are displayed, wherein the display section includes:

an erase section for erasing the replaced portion when it is determined by the recognition determination section that the recognition result obtained in the first recognition should be replaced;

a scroll display section for scrolling, when it is determined by the area determination section that a displayable area is not generated, a portion of the translation subtitle following the replaced portion in a direction toward an end for providing the displayable area; and a replace portion display section for displaying the replace portion in the displayable area.

7. A conference supporting method for supporting implementation of a conference by using a conference system including a display section, comprising steps of:

recognizing speech in a first language;

translating a recognition result obtained by recognizing the speech into a second language different from the first language;

generating a translation subtitle in which a translation result obtained by translating the recognition result and the recognition result corresponding to the translation result are displayed in parallel, and a recognition result subtitle in which the recognition result that has not been translated is displayed; and displaying the generated translation subtitle and the generated recognition result subtitle in the display section, wherein the recognizing recognizes the speech in the first language at least twice, the conference supporting method further comprising:

determining whether or not a recognition result obtained in the first recognition should be replaced with a recognition result obtained in the second or later recognition; and determining, when it is determined that the recognition result obtained in the first recognition should be replaced, whether or not a displayable area capable of displaying a replace portion of the recognition result obtained in the second or later recognition is generated in the translation subtitle by erasing a replaced portion of the recognition result obtained in the first recognition in the translation subtitle displayed in the display section, wherein the generating corrects, when it is determined that the recognition result obtained in the first recognition should be replaced, the translation subtitle to a translation subtitle in which the recognition result obtained in the second or later recognition and a translation result translated from the recognition result obtained in the second or later recognition by the translation section are displayed, wherein the display section includes:

an erase section for erasing the replaced portion when it is determined by the recognition determination section that the recognition result obtained in the first recognition should be replaced;

a scroll display section for scrolling, when it is determined by the area determination section that a displayable area is not generated, a portion of the translation subtitle following the replaced portion in a direction toward an end for providing the displayable area; and a replace portion display section for displaying the replace portion in the displayable area.

8. An information processing method for processing information by using an information processor including a display section, comprising steps of:

receiving data corresponding to an original in a first language and a translation of the original in a second language different from the first language;

generating, on the basis of the received data, a translation subtitle in which the translation and the original corresponding to the translation are displayed in parallel, and an original subtitle in which the original that has not been translated is displayed; and displaying the generated translation subtitle and the generated original subtitle in the display section, wherein the receiving receives recognition results of the speech in the first language at least twice, the information processing method further comprising:

determining whether or not a recognition result obtained in the first recognition by the recognition section should be replaced with a recognition result obtained in the second or later recognition; and determining by an area determination section, when it is determined that the recognition result obtained in the first recognition should be replaced, whether or not a displayable area capable of displaying a replace portion of the recognition result obtained in the second or later recognition is generated in the translation subtitle by erasing a replaced portion of the recognition result obtained in the first recognition in the translation subtitle displayed in the display section, wherein the generating corrects, when it is determined that the recognition result obtained in the first recognition should be replaced, the translation subtitle to a translation subtitle in which the recognition result obtained in the second or later recognition and a translation result translated from the recognition result obtained in the second or later recognition are displayed, wherein the display section includes:

an erase section for erasing the replaced portion when it is determined by the recognition determination section that the recognition result obtained in the first recognition should be replaced;

a scroll display section for scrolling, when it is determined by the area determination section that a displayable area is not generated, a portion of the translation subtitle following the replaced portion in a direction toward an end for providing the displayable area; and a replace portion display section for displaying the replace portion in the displayable area.

9. A non-transitory recording medium which is readable by a computer including a display section and stores a computer program, the computer program comprising a step of:

causing the computer to generate, on the basis of data corresponding to an original in a first language and a translation of the original in a second language different from the first language, a translation subtitle in which the translation and the original corresponding to the translation are displayed in parallel, and an original subtitle in which the original that has not been translated is displayed; and causing the computer to display the generated translation subtitle and the generated original subtitle in the display section, wherein the causing the computer to generate causes the computer to generate the translation subtitle on the basis of the speech in the first language at least twice, the computer program further comprising:

causing the computer to determine whether or not a recognition result obtained in the first recognition should be replaced with a recognition result obtained in the second or later recognition; and causing the computer to determine, when it is determined that the recognition result obtained in the first recognition should be replaced, whether or not a displayable area capable of displaying a replace portion of the recognition result obtained in the second or later recognition is generated in the translation subtitle by erasing a replaced portion of the recognition result obtained in the first recognition in the translation subtitle displayed in the display section, wherein causing the computer to generate causing the computer to correct, when it is determined that the recognition result obtained in the first recognition should be replaced, the translation subtitle to a translation subtitle in which the recognition result obtained in the second or later recognition and a translation result translated from the recognition result obtained in the second or later recognition are displayed, wherein the display section includes:

an erase section for erasing the replaced portion when it is determined by the recognition determination section that the recognition result obtained in the first recognition should be replaced;

a scroll display section for scrolling, when it is determined by the area determination section that a displayable area is not generated, a portion of the translation subtitle following the replaced portion in a direction toward an end for providing the displayable area; and a replace portion display section for displaying the replace portion in the displayable area.

* * * * *